(12) United States Patent
Togawa

(10) Patent No.: US 6,182,156 B1
(45) Date of Patent: *Jan. 30, 2001

(54) OBJECT-ORIENTED DATA PROCESSING SYSTEM ALLOWING DYNAMIC CHANGE OF ONE OR MORE ANCESTORS AND/OR DESCENDENTS OF ONE OR MORE CLASSES OF OBJECTS

(75) Inventor: Yoshifusa Togawa, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/616,429

(22) Filed: Mar. 15, 1996

(30) Foreign Application Priority Data

Mar. 15, 1995 (JP) .................................................... 7-055528

(51) Int. Cl.[7] ........................................................ G06F 9/00
(52) U.S. Cl. ............................................................. 709/316
(58) Field of Search ................................... 395/702, 703, 395/704, 705; 709/303, 310–332; 717/1–10

(56) References Cited

U.S. PATENT DOCUMENTS

| 5,313,630 | * | 5/1994 | Namioka et al. | 395/712 |
| 5,313,633 | * | 5/1994 | Tomita et al. | 395/705 |
| 5,481,718 | * | 1/1996 | Ryu et al. | 709/303 |
| 5,561,803 | * | 10/1996 | Kilis | 395/707 |
| 5,564,048 | * | 10/1996 | Eick et al. | 395/600 |

FOREIGN PATENT DOCUMENTS

| 62-273136 | 11/1988 | (JP) . |
| 1-240936 | 9/1989 | (JP) . |
| 2-002426 | 1/1990 | (JP) . |

OTHER PUBLICATIONS

Ege, Raimund K., "Programming in an Object–Oriented Environment, " *AP Professional*, 1992, Chapters 1–3, pp. 11–79.

* cited by examiner

Primary Examiner—Alvin E. Oberley
Assistant Examiner—St. John Courtenay III
(74) Attorney, Agent, or Firm—Staas & Halsey, LLP

(57) ABSTRACT

A data processing system at least a portion of which operates under control of an object-oriented program. The data processing system contains an object-oriented system, in which a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. An inheritance coupling information setting unit receives a first request, and sets at least one piece of the inheritance coupling information in a data storage area, in response to the first request. The inheritance coupling information held in the inheritance coupling information indicating unit can be referred to by at least one of the above plurality of objects.

33 Claims, 49 Drawing Sheets

| FLAG | ATTRIBUTE | NUMBER | OBJECT NAME | POINTER | ------ | UPWARD |
|------|-----------|--------|-------------|---------|--------|--------|
|      |           | NUMBER | OBJECT NAME | POINTER | ------ | DOWNWARD |
| FLAG | ATTRIBUTE | NUMBER | OBJECT NAME | POINTER | ------ |        |
|      |           | NUMBER | OBJECT NAME | POINTER | ------ |        |
|      |           |        |             |         |        |        |

FIG. 38

| | | | | UPWARD |
|---|---|---|---|---|
| 1 | 2 | MAIN SWITCH | POINTER TO "MAIN SWITCH" | POINTER TO "RIGHT SIGNAL" |
| | 2 | RIGHT SIGNAL | POINTER TO "RIGHT SIGNAL" | RIGHT SIGNAL |
| | | | | DOWNWARD |
| | 2 | MAIN SWITCH | POINTER TO "MAIN SWITCH" | POINTER TO "SIGNAL" |
| 0 | 2 | LEFT SIGNAL | POINTER TO "LEFT SIGNAL" | LEFT SIGNAL |
| | 2 | MAIN SWITCH | POINTER TO "MAIN SWITCH" | POINTER TO "SIGNAL" |
| 0 | 2 | BOTH SIGNALS | POINTER TO "BOTH SIGNALS" | BOTH SIGNALS |
| | | | | POINTER TO "SIGNAL" |

FIG. 39

OBJECT-ORIENTED DATA PROCESSING SYSTEM ALLOWING DYNAMIC CHANGE OF ONE OR MORE ANCESTORS AND/OR DESCENDENTS OF ONE OR MORE CLASSES OF OBJECTS

BACKGROUND OF THE INVENTION (1) Field of the Invention

The present invention relates to a data processing system at least a portion of which operates under control of an object-oriented program (a program constructed in the manner of object-oriented programming), and to a process and an apparatus for setting inheritance coupling information in a data processing system containing an object-oriented system. in addition, the present invention relates to a process for executing a function in a data processing system containing an object-oriented system. Further, the present invention relates to an article of manufacture which, when used with a computer, directs the computer to execute a process for setting inheritance coupling information in a data processing system containing an object-oriented system.

(2) Description of the Related Art

Operations of an object-oriented system, i.e., a data processing system which operates under control of an object-oriented program, are performed by a plurality of objects, and each object is created from a class as an instance of the class. A plurality of classes are defined in an object-oriented system, and one or more objects can be created from each class. At least one member field (variable) and at least one member function (method) are defined as features of each class. An inheritance relationship can be established between two of the plurality of classes, where one of the two classes is called an ancestor or a parent, and the other is called a descendent or a child. The ancestor can further has its ancestor, and the above descendent can further has its descendent. Thus, an inheritance hierarchy can be established among the plurality of classes of in the object-oriented system. In the above inheritance hierarchy, each descendent may have one or more ancestors. When a descendent has only one ancestor, the inheritance relationship is called a single inheritance, and when a descendent has more than one ancestor, the inheritance relationship is called a multiple inheritance. Each descendent inherits all of the features of its ancestor(s).

When an object as an instance of one of the classes in the inheritance hierarchy receives a message requesting an execution of a member function, and the member function is not defined for the class to which the object belongs to, the object looks up the methods of the ancestors of the class to which the object belongs to, and delegates the execution of the member function to one of the ancestors where the member function requested by the message is defined.

Conventionally, the inheritance hierarchy is a fixed structure, i.e., the inheritance relationships in the inheritance hierarchy cannot be changed unless the object-oriented program per se, in which the inheritance relationships are defined, is changed.

Generally, the environment of the object-oriented system will vary. However, the above conventional object-oriented system cannot be dynamically changed corresponding to the variation in the environment.

SUMMARY OF THE INVENTION

A first object of the present invention is to provide a data processing system at least a portion of which operates under control of an object-oriented program, wherein one or more inheritance relationships in at least one inheritance hierarchy can be dynamically changed in response to a request from outside of the inheritance hierarchy.

A second object of the present invention is to provide a process and an apparatus for setting inheritance coupling information in a data processing system containing an object-oriented system, whereby one or more inheritance relationships in at least one inheritance hierarchy can be dynamically changed in response to a request from outside of the inheritance hierarchy.

A third object of the present invention is to provide a process for executing a function in a data processing system containing an object-oriented system, whereby one or more inheritance relationships in at least one inheritance hierarchy can be dynamically changed in response to a request from outside of the inheritance hierarchy when a request for executing a function is sent to the object-oriented system.

A fourth object of the present invention is to provide an article of manufacture which, when used with a computer, directs the computer to execute a process for setting inheritance coupling information in a data processing system containing an object-oriented system, whereby one or more inheritance relationships in at least one inheritance hierarchy in the object-oriented system can be dynamically changed in response to a request from outside of the inheritance hierarchy.

(1) According to the first aspect of the present invention, there is provided a data processing system at least a portion of which operates under control of an object-oriented program. The data processing system contains an object-oriented system, in which a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information; an inheritance coupling information indicating unit for holding therein and indicating the above inheritance coupling information, where the inheritance coupling information held in the inheritance coupling information indicating unit can be referred to by at least one of the above plurality of objects; and an inheritance coupling information setting unit for receiving a first request, and setting at least one piece of the inheritance coupling information in the inheritance coupling information indicating unit, in response to the first request.

(2) According to the second aspect of the present invention, there is provided a data processing system containing an object-oriented system and an inheritance coupling information setting system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information.

The above inheritance coupling information setting system contains an inheritance coupling information indicating unit for holding therein and indicating the above inheritance coupling information, where the inheritance coupling information held in the inheritance coupling information indicating unit can be referred to by at least one of the above plurality of objects; and an inheritance coupling information setting unit for receiving a first request, and setting at least one piece of the inheritance coupling information in the inheritance coupling information indicating unit, in response to the first request.

(3) According to the third aspect of the present invention, there is provided a data processing system containing an object-oriented system and an inheritance coupling information setting system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information.

The above inheritance coupling information setting system contains a data holding area for holding therein and indicating the above inheritance coupling information, where the inheritance coupling information held in the inheritance coupling information indicating unit can be referred to by at least one of the above plurality of objects; and a programmed logic circuit for receiving a first request, and setting at least one piece of the inheritance coupling information in the inheritance coupling information indicating unit, in response to the first request.

(4) According to the fourth aspect of the present invention, there is provided a data processing system containing an object-oriented system and an inheritance coupling information setting system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information.

The above inheritance coupling information setting system contains a data holding area for holding therein and indicating the above inheritance coupling information, where the inheritance coupling information held in the inheritance coupling information indicating unit can be referred to by at least one of the above plurality of objects; and an inheritance coupling information setting unit, configured to execute a program which is stored in the at least one computer-usable memory, so that the inheritance coupling information setting unit receives a first request, and sets at least one piece of the inheritance coupling information in the inheritance coupling information indicating unit, in response to the first request.

(5) According to the fifth aspect of the present invention, there is provided a process for setting inheritance coupling information in a data processing system containing an object-oriented system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information.

The above data processing system further contains a data storage area which can be accessed by at least one of the above plurality of objects.

The above process contains the steps of (a) receiving a first request for setting at least one piece of the inheritance coupling information in the above data storage area; and (b) setting the above at least one piece of the inheritance coupling information in the above data storage area, in response to the first request.

(6) According to the sixth aspect of the present invention, there is provided an apparatus for setting inheritance coupling information in a data processing system containing an object-oriented system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. The above apparatus contains a data storage area which can be accessed by at least one of the above plurality of objects; a request receiving unit for receiving a first request for setting at least one piece of the inheritance coupling information in the above data storage area; and an information setting unit for setting the above at least one piece of the inheritance coupling information in the above data storage area, in response to the first request.

(7) According to the seventh aspect of the present invention, there is provided an article of manufacture which, when used with a computer, directs the computer to execute a process for setting inheritance coupling information in a data processing system containing an object-oriented system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. The above data processing system further contains a data storage area which can be accessed by at least one of the above plurality of objects. The above process contains the steps of: (a) receiving a first request for setting at least one piece of the inheritance coupling information in the above data storage area; and (b) setting the above at least one piece of the inheritance coupling information in the above data storage area, in response to the first request.

(8) In the above constructions of the first to seventh aspects of the present invention, each of the plurality of objects may contain, as program units realized by the object-oriented program, a message receiving unit for receiving a message which contains a second request for an execution of a function, and a message executing unit for executing the function requested by the second request when the function is defined in one of the plurality of classes to which the above each of the plurality of objects belongs.

(9) In the above constructions of (8), the operation of the inheritance coupling information setting unit may be defined in the above one of the plurality of classes by the object-oriented program, as a function which can be performed by instances of the one of the plurality of classes.

(10) In the above constructions of (8), when the above one of the plurality of classes is the descendent of another of the plurality of classes, the above one of the plurality of classes may further contain a function lookup unit for looking up functions defined in one or more classes which are coupled to the above one of the plurality of classes on the ancestor side of the above one of the plurality of classes, based on the inheritance coupling information indicated in the inheritance coupling information indicating unit (or in the data storage area), and delegating the execution of the function requested by the second request, to one of the one or more classes which are coupled on the ancestor side when the function requested by the second request is defined in this one of the one or more classes which are coupled on the ancestor side.

(11) In the above constructions of (8), the above message can contain both the first and second requests.

(12) In the above constructions of (11), the data processing system may further contain a request separating unit for receiving the above message containing both the first and second requests, and separating the first request from the second request to supply the first request to the above inheritance coupling information setting unit.

(13) In the above constructions of the first to seventh aspects of the present invention, the above massage receiving unit can receive a message which contains the above first request.

(14) In the above constructions of the first to seventh aspects of the present invention, the above inheritance coupling information indicating unit may contain an ancestor information indicating unit for holding therein and indicating the inheritance coupling information with regard to ancestors of each class, and a descendent information indicating unit for holding therein and indicating the inheritance coupling information with regard to descendents of each class.

(15) In the above constructions of (14), may further contain a correspondence confirming unit for confirming that there is no contradiction between the inheritance coupling information for the ancestors held in the ancestor information indicating unit and the inheritance coupling information for the descendents held in the descendent information indicating unit.

(16) In the above constructions of (15), the above correspondence confirming unit may operate when one of the plurality of objects receives the above first request, and may return a result of the confirmation to the one of the plurality of objects.

(17) In the above constructions of the first to seventh aspects of the present invention, the above inheritance coupling information setting unit can receive the above first request independently from the plurality of objects.

(18) In the above constructions of (8), the above inheritance coupling information setting unit can receive the above first request independently from one the plurality of objects which receives the above message.

(19) In the constructions of the first to seventh aspects of the present invention, the above inheritance coupling information indicating unit may contain a coupled class indicating unit for holding coupled class information which indicates, for each of the plurality of classes, one of the plurality of classes as a coupled class to which the above each of the plurality of classes is to be coupled based on an inheritance relationship, and a pointer indicating unit for indicating pointers to predetermined classes among the plurality of classes which are candidates of the coupled class of the above each of the plurality of classes, so that one of the pointers which points to the above coupled class can be determined based on the above coupled class information.

(20) In the construction of (19), the above first request may contain the above coupled class information, and the above at least one piece of inheritance coupling information may be the coupled class information.

(21) In the construction of (19), the above coupled class information may comprise flag indications provided for the options, respectively.

(22) In the constructions of the first to seventh aspects of the present invention, the above inheritance coupling information indicating unit may be provided outside of the plurality of objects.

(23) In the constructions of the first to seventh aspects of the present invention, the above inheritance coupling information indicating unit may be provided outside of the plurality of objects.

(24) In the constructions of the first to seventh aspects of the present invention, the above inheritance coupling information indicating unit may comprise a plurality of sub-units corresponding to the plurality of classes, respectively, and the plurality of sub-units may be contained in the respective objects which are instances of the corresponding classes, respectively.

(25) In the construction of (19), the above coupled class indicating unit may comprise a plurality of sub-units corresponding to the plurality of classes, respectively, and the plurality of sub-units may be contained in the respective objects which are instances of the corresponding classes, respectively.

(26) In the construction of (25), the above first request may contain the above coupled class information, and the above at least one piece of inheritance coupling information may be the coupled class information. In addition, each of the plurality of objects may further contain a correspondence confirming unit for communicating with another of the plurality of objects which is an instance of the coupled class, and confirming whether or not the sub-unit, in the coupled class, of the coupled class indicating unit indicates the above each of the plurality of objects as a coupled class.

(27) According to the eighth aspect of the present invention, there is provided a data processing system at least a portion of which operates under control of an object-oriented program, the above data processing system contains an object-oriented system, in which a plurality of objects are defined by the above object-oriented program,, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. In the data processing system, each of the plurality of objects contains, as program units realized by the object-oriented program; a message receiving unit for receiving a message which contains a request for an execution of a function, and at least one piece of the inheritance coupling information which indicates a first class among the plurality of classes as a parent class among the plurality of classes of a second class among the plurality of classes which the above each of the plurality of objects belongs to; a message executing unit for executing the function requested by the request when the function is defined in the above second class; and a function delegating unit for looking up functions defined in one or more third classes including the above first class, where the above one or more third classes are coupled to the above second class on the ancestor side thereof, when the function requested by the request is not defined in the above second class, and delegating the execution of the function requested by the request, to one of the above one or more third classes when the function requested by the request is defined in the above one of the one or more third classes.

(28) in the construction of the eighth aspect of the present invention, the data processing system may further contains a pointer indicating unit for indicating pointers to predetermined options of the parent class of the second class, so that the above each object can refer to one of the pointers which points to the above first class based on the above at least one piece of the inheritance coupling information.

(29) In the construction of the eighth aspect of the present invention, the above at least one piece of inheritance coupling information may indicate a pointer to the first class.

(30) According to the ninth aspect of the present invention, there is provided a data processing system containing an object-oriented system and an inheritance coupling information setting system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. In the data processing system, each of the plurality of objects contains, as program units realized by the object-oriented program; a message receiving unit for receiving a message which contains a request for an execution of a function, and at least one piece of the inheritance coupling information which indicates a first class among the plurality of classes as a parent class of a second class among the plurality of classes which the above each of the plurality of objects belongs to; a message executing unit for executing the function requested by the request when the function is defined in the above second class; and a function delegating unit for looking up functions defined in one or more third classes including the above first class, where the above one or more third classes are coupled to the above second class on the ancestor side thereof, when the function requested by the request is not defined in the above second class, and delegating the execution of the function requested by the request, to one of the above one or more third classes when the function requested by the request is defined in the above one of the one or more third classes.

(31) According to the tenth aspect of the present invention, there is provided a process for executing a function in a data processing system containing an object-oriented system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. The above process contains the steps of: (a) receiving, by one of the plurality of objects, a message which contains a request for an execution of a function, and at least one piece of the inheritance coupling information which indicates a first class among the plurality of classes as a parent class of a second class among the plurality of classes which the above one of the plurality of objects belongs to; (b) executing the function requested by the request, in the above one of the plurality of objects, when the function is defined in the above second class; (c) looking up functions defined in one or more third classes including the above first class, where the above one or more third classes are coupled to the above second class on the ancestor side thereof, when the function requested by the request is not defined in the above second class; and (d) delegating the execution of the function requested by the request, to one of the above one or more third classes when the function requested by the request is defined in the above one of the one or more third classes.

(32) According to the eleventh aspect of the present invention, there is provided an article of manufacture which, when used with a computer, directs the computer to execute a process for setting inheritance coupling information in a data processing system containing an object-oriented system, wherein the above object-oriented system is configured to execute an object-oriented program which is stored in at least one computer-usable memory, and in the object-oriented system a plurality of objects are defined by the above object-oriented program, each of the plurality of objects belongs to a corresponding one of a plurality of classes as an instance of the corresponding one of the plurality of classes, and one or more inheritance relationships are defined between at least one pair of classes among the plurality of classes based on inheritance coupling information. The above process contains the steps of: (a) receiving, by one of the plurality of objects, a message which contains a request for an execution of a function, and at least one piece of the inheritance coupling information which indicates a first class among the plurality of classes as a parent class of a second class among the plurality of classes which the above one of the plurality of objects belongs to; (b) executing the function requested by the request, in the above one of the plurality of objects, when the function is defined in the above second classy (c) looking up functions defined in one or more third classes including the above first class, where the above one or more third classes are coupled to the above second class on the ancestor side thereof, when the function requested by the request is not defined in the above second class; and (d) delegating the execution of the function requested by the request, to one of the above one or more third classes when the function requested by the request is defined in the above one of the one or more third classes.

(33) According to the twelfth aspect of the present invention, there is provided a data processing system at least a portion of which operates under control of an object-oriented program. The above data processing system contains an object-oriented system, in which at least one object is defined by the above object-oriented program; a plurality of data units, where each of at least one object can be coupled to one of the plurality of data units, and the above each of at least one object can access the coupled one of the plurality of data units based on coupling information; a coupling information indicating unit for holding therein and indicating the above coupling information, where the coupling information held in the coupling information indicating unit can be referred to by at least one of the above at least one object; and a coupling information setting unit for receiving a first request, and setting at least one piece of the coupling information in the coupling information indicating unit, in response to the first request.

BRIEF DESCRIPTION OF THE DRAWINGS

In the drawings:

FIG. 38 is diagram illustrating the data structure of the table 173 in the construction of FIG. 37;

FIG. 39 is diagram illustrating the details of the contents of the table 173 in the construction of FIG. 37;

DESCRIPTION OF THE PREFERRED EMBODIMENTS

Figure 1:
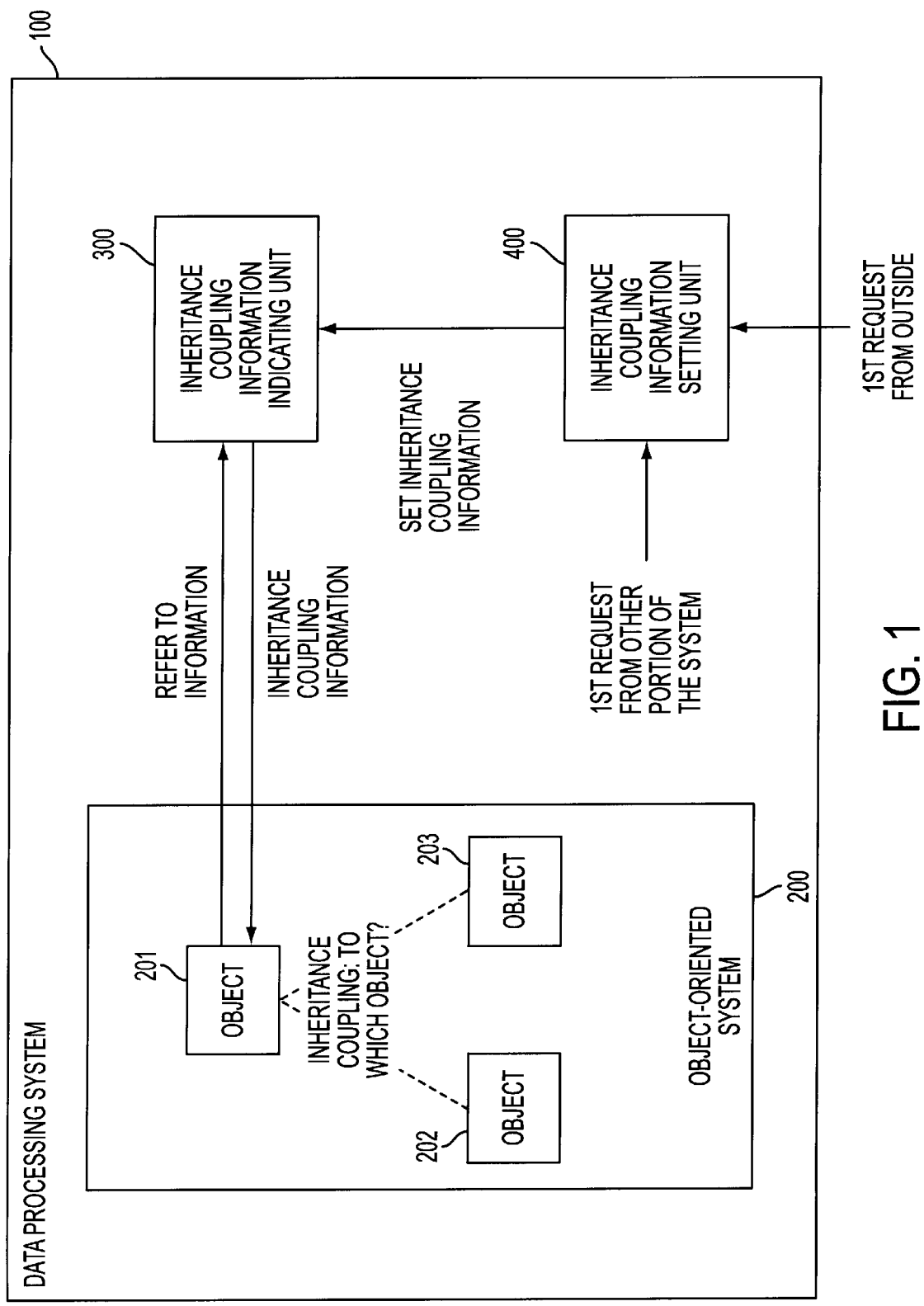
FIG. 1 is a block diagram illustrating the basic construction of the data processing systems according to the first to fourth aspects of the present invention.

Basic Construction of Invention (FIG. 1)

FIG. 1 is a block diagram illustrating the basic construction of the data processing systems according to the first to fourth aspects of the present invention. In FIG. 1, reference numeral 100 denotes a data processing system, 200 denotes an object-oriented system, 300 denotes an inheritance coupling information indicating unit, and 400 denotes an inheritance coupling information setting unit. In the object-oriented system 200, reference numeral 201, 202, and 202 each denote an object defined by an object-oriented program in the object-oriented system 200. Although not shown, the data processing system 100 may contain another object-oriented system and another non-object-oriented system. In the object-oriented system 200, a plurality of objects may be defined by an object-oriented program other than the indicated objects 201 to 203. Each of the plurality of objects belongs to a corresponding one of a plurality of classes as an instance of the corresponding one of the plurality of classes, and one or more inheritance relationships are defined between at least one pair of classes among the plurality of classes based on inheritance coupling information.

The inheritance coupling information indicating unit 300 holds therein and indicates the above inheritance coupling information, where the inheritance coupling information held in the inheritance coupling information indicating unit 300 can be referred to by at least one of the above plurality of objects in the object-oriented system 200. The inheritance coupling information setting unit 400 can receive a request (indicated in FIG. 1 as "1st request") for setting at least one piece of the inheritance coupling information in the inheritance coupling information indicating unit 300. The request may be sent from another processing unit (not shown) inside or outside of the data processing system 100.

When the inheritance coupling information setting unit 400 receives the request, the inheritance coupling information setting unit 400 sets at least one piece of the inheritance coupling information, which is for example, attached to the request, in the inheritance coupling information indicating unit 300, in response to the first request. At least one of the plurality of objects in the object-oriented system 200 can refer to the inheritance coupling information indicated in the inheritance coupling information indicating unit 300. In the situation of FIG. 1, the object 201 determines one of the objects 202 and 203 as an instance in its child class. However, often, an object may determine one or more of a plurality of objects as an instance in its parent class. This is the case when an object receives a request of an execution of a function which is not defined in the object, and therefore the objects need to look up functions in other objects in another class which is coupled to the class of the object which receives the request, with an inheritance relationship. in this case, the object which receives the request, refers to the inheritance coupling information indicating unit 300 to obtain a pointer to the parent class.

As explained later, the inheritance coupling information indicating unit 300 may comprise a coupled class indicating unit and a pointer indicating unit. The coupled class indicating unit holds coupled class information which indicates, for each of the plurality of classes, one of the plurality of classes as a coupled class to which the above each of the plurality of classes is to be coupled based on an inheritance relationship. The pointer indicating unit indicates pointers to predetermined classes among the plurality of classes which are candidates of the coupled class of the above each of the plurality of classes, so that one of the pointers which points to the above coupled class can be determined based on the above coupled class information. In the construction of FIG. 1, for example, the object 201 first refers to the coupled class information in the coupled class indicating unit in the inheritance coupling information indicating unit 300 to recognize the coupled class to which the class of the object 201 is coupled with an inheritance relationship. Then, the object 201 refers to the above one of the pointers which points to the above coupled class, based on the recognized coupled class.

Figure 2:
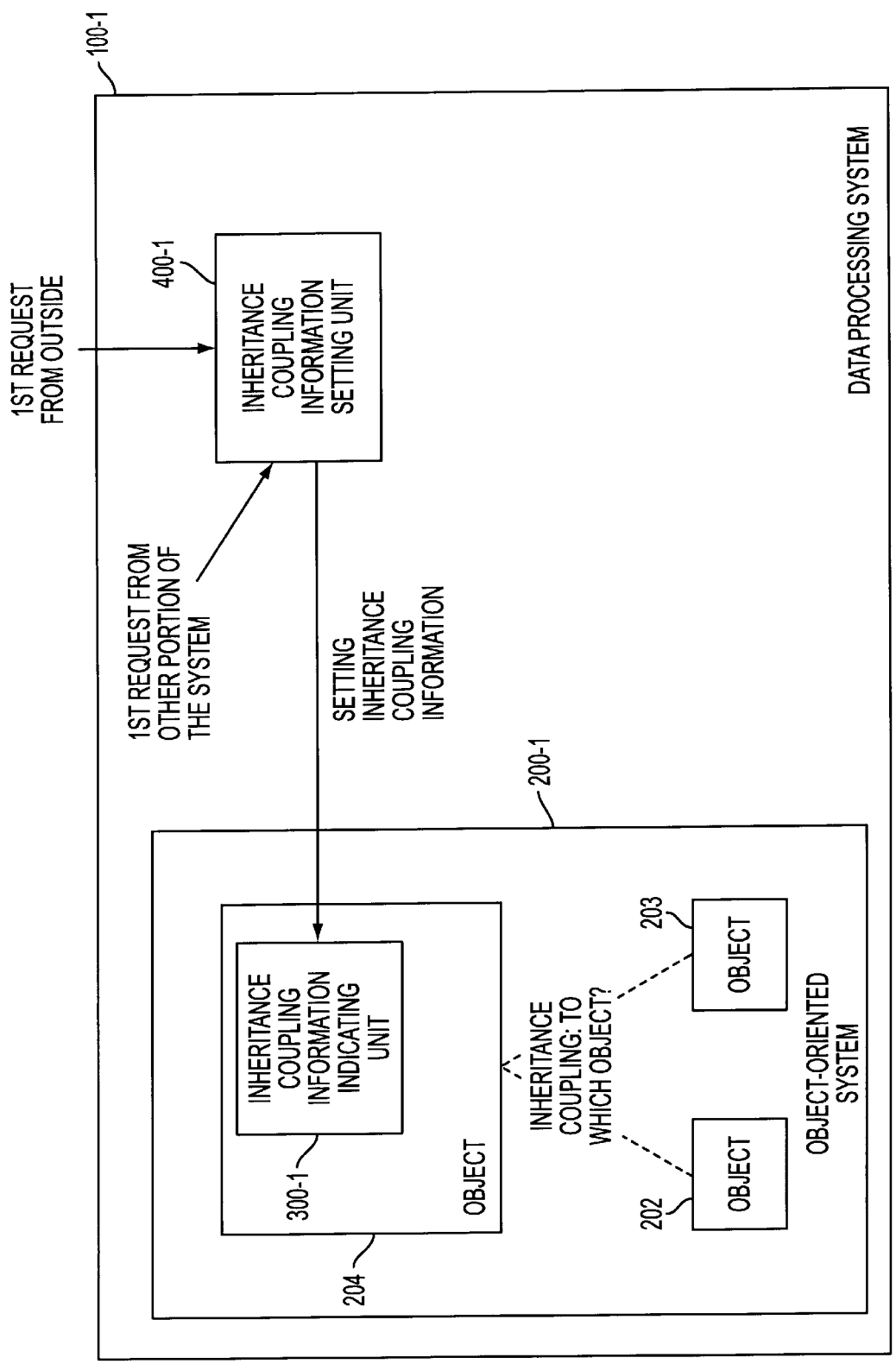
FIG. 2 is a diagram illustrating a first variation of the basic construction of the data processing systems according to the first to fourth aspects of the present invention.

First Variation of Basic Construction (FIG. 2)

FIG. 2 is a diagram illustrating a first variation of the basic construction of the data processing systems according to the first to fourth aspects of the present invention. In FIG. 2, reference numeral 100-1 denotes a data processing system, 200-1 denotes an object-oriented system, 300-1 denotes an inheritance coupling information indicating unit, and 400-1 denotes an inheritance coupling information setting unit. In the object-oriented system 200-1, reference numeral 202, 203, and 204 each denote an object defined by an object-oriented program in the object-oriented system 200-1.

As indicated in FIG. 2, the object 204 contains the inheritance coupling information indicating unit 300-1. The inheritance coupling information indicating unit 300-1 in the object 204 contains inheritance coupling information relating to the class to which the object 204 belongs to, i. e., inheritance coupling information which indicates which coupled class(es) is coupled to the class to which the object 204 belongs to, and pointer(s) to the coupled class(es). Also, in FIG. 2, the inheritance coupling information setting unit 400-1 can set at least one piece of inheritance coupling information such as the above coupled class(es) and the pointer(s), in the inheritance coupling information indicating unit 300-1 in the object 204. Although not shown, another object in the object-oriented system 200-1 may also contain an inheritance coupling information indicating unit therein, as the object 204 does.

Figure 3:
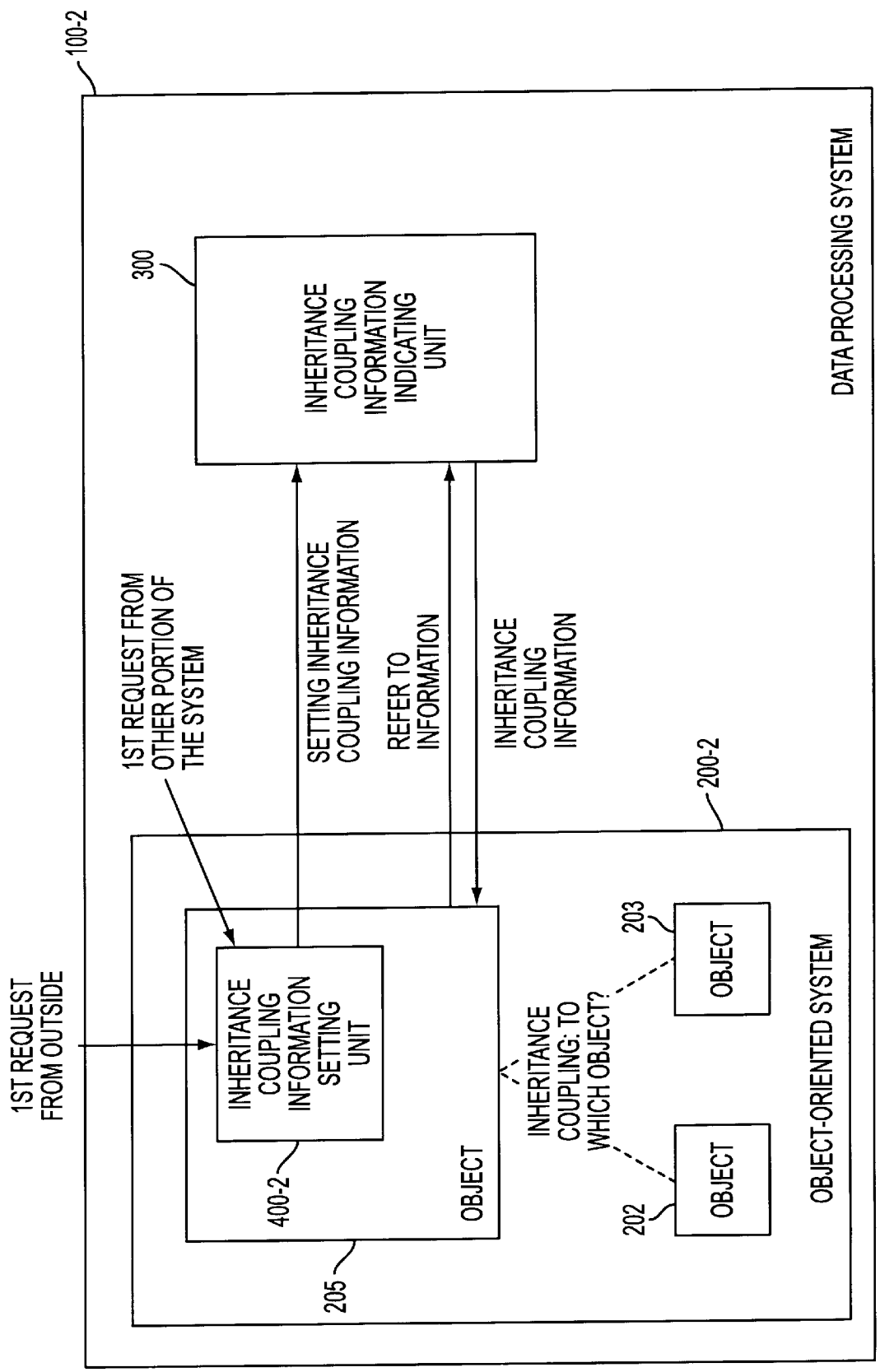
FIG. 3 is a block diagram illustrating a second variation of the basic construction of the data processing systems according to the first to fourth aspects of the present invention.

Second Variation of Basic Construction (FIG. 3)

FIG. 3 is a block diagram illustrating a second variation of the basic construction of the data processing systems according to the first to fourth aspects of the present invention. In FIG. 3, reference numeral 100-2 denotes a data processing system, 200-2 denotes an object-oriented system, 300 denotes the same inheritance coupling information indicating unit as the corresponding element 300 in the construction of FIG. 1, and 400-2 denotes an inheritance coupling information setting unit. In the object-oriented system 200-3, reference numeral 202, 203, and 205 each denote an object defined by an object-oriented program in the object-oriented system 200-2.

In the construction of FIG. 3, the inheritance coupling information setting unit 400-2 is contained in the object 205. The inheritance coupling information setting unit 400-2 in the object 205 is realized as a function defined in the object 205 (class). Therefore, the inheritance coupling information setting unit 400-2 can operate in response to a message to the object 205, which message requests an execution of the function of the inheritance coupling information setting unit 400-2. The function of the inheritance coupling information setting unit 400-2 is the same as the corresponding elements 400 and 400-1 in the constructions of FIGS. 1 and 2. In addition, the inheritance coupling information indicating unit 300 in the construction of FIG. 3 operates in the same manner as in the construction of FIG. 1.

Figure 4:
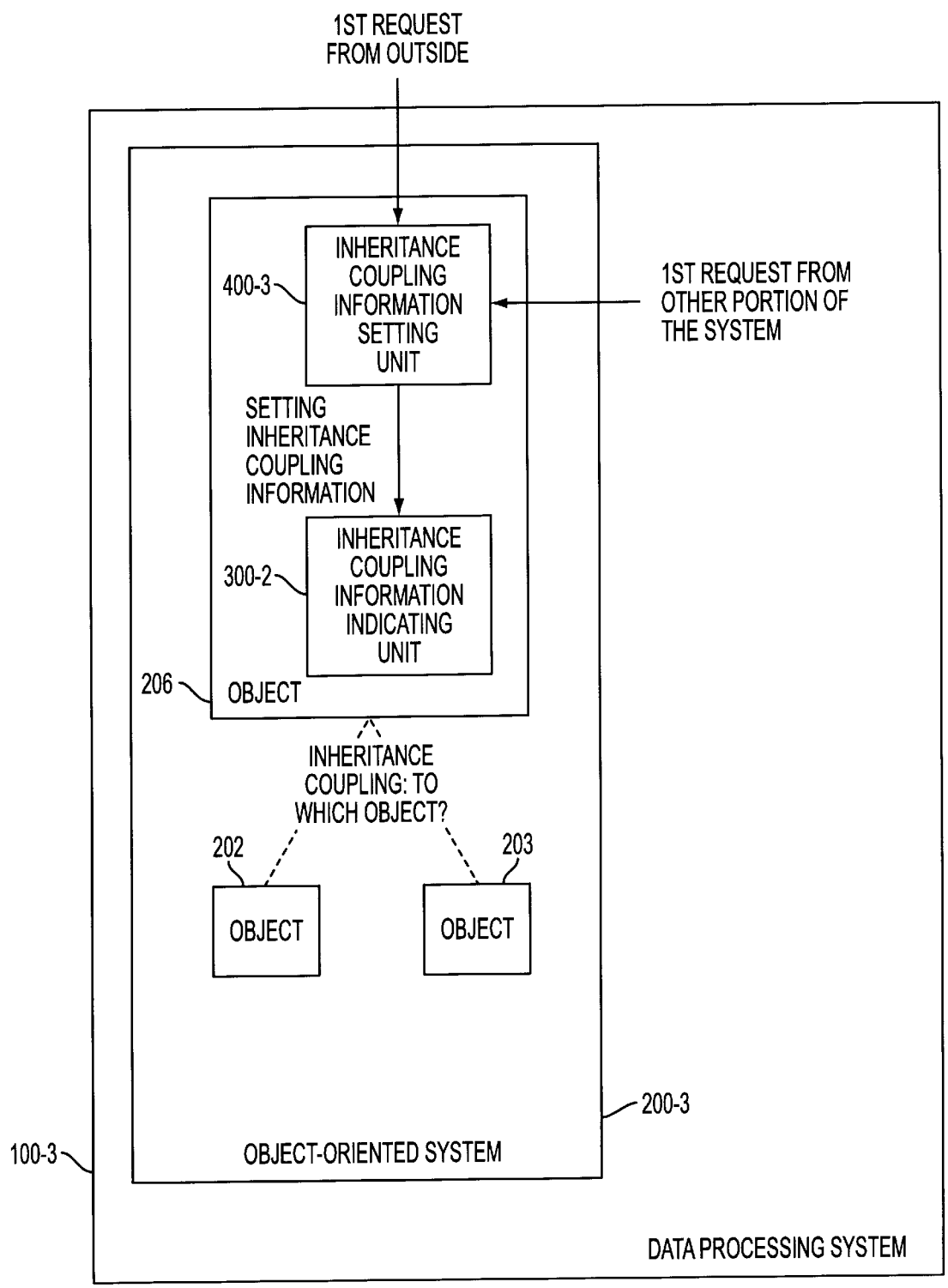
FIG. 4 is a diagram illustrating a third variation of the basic construction of the data processing systems according to the first to fourth aspects of the present invention.

Third Variation of Basic Construction (FIG. 4)

FIG. 4 is a diagram illustrating a third variation of the basic construction of the data processing systems according to the first to fourth aspects of the present invention. In FIG. 4, reference numeral 100-3 denotes a data processing system, 200-3 denotes an object-oriented system, 300-2 denotes an inheritance coupling information indicating unit, and 400-3 denotes an inheritance coupling information setting unit. In the object-oriented system 200-3, reference numeral 202, 203, and 206 each denote an object defined by an object-oriented program in the object-oriented system 200-3.

In the construction of FIG. 4, both the inheritance coupling information indicating unit 300-2 and the inheritance coupling information setting unit 400-3 are contained in the object 206. The inheritance coupling information indicating unit 300-2 in the object 206 in the construction of FIG. 4 operates in the same manner as the inheritance coupling information indicating unit 300-1 in the object 204 in the construction of FIG. 2, and the inheritance coupling information setting unit 400-3 in the object 206 in the construction of FIG. 4 operates basically in the same manner as the inheritance coupling information setting unit 400-2 in the object 205 in the construction of FIG. 3. The only difference is that the inheritance coupling information setting unit 400-2 in the object 205 in the construction of FIG. 3 can set only the inheritance coupling information which is directly related to the object 206, while the inheritance coupling information setting unit 400-2 in the object 205 in the construction of FIG. 3 may set inheritance coupling information which is not directly related to the object 205.

Alternatively, when the data processing system of FIG. 4 operates according to the eighth to tenth aspects of the present invention, the inheritance coupling information indicating unit 300-2 may be dispensed with since, in the operations of the eighth to tenth aspects of the present invention, the inheritance coupling information is supplied to the object, together with a request for an execution of a function, and may be temporarily used just for looking up functions in the classes on the ancestor side. Such operations will be explained later with reference to FIGS. 10, 13, 16, 19, and others.

Figure 5:
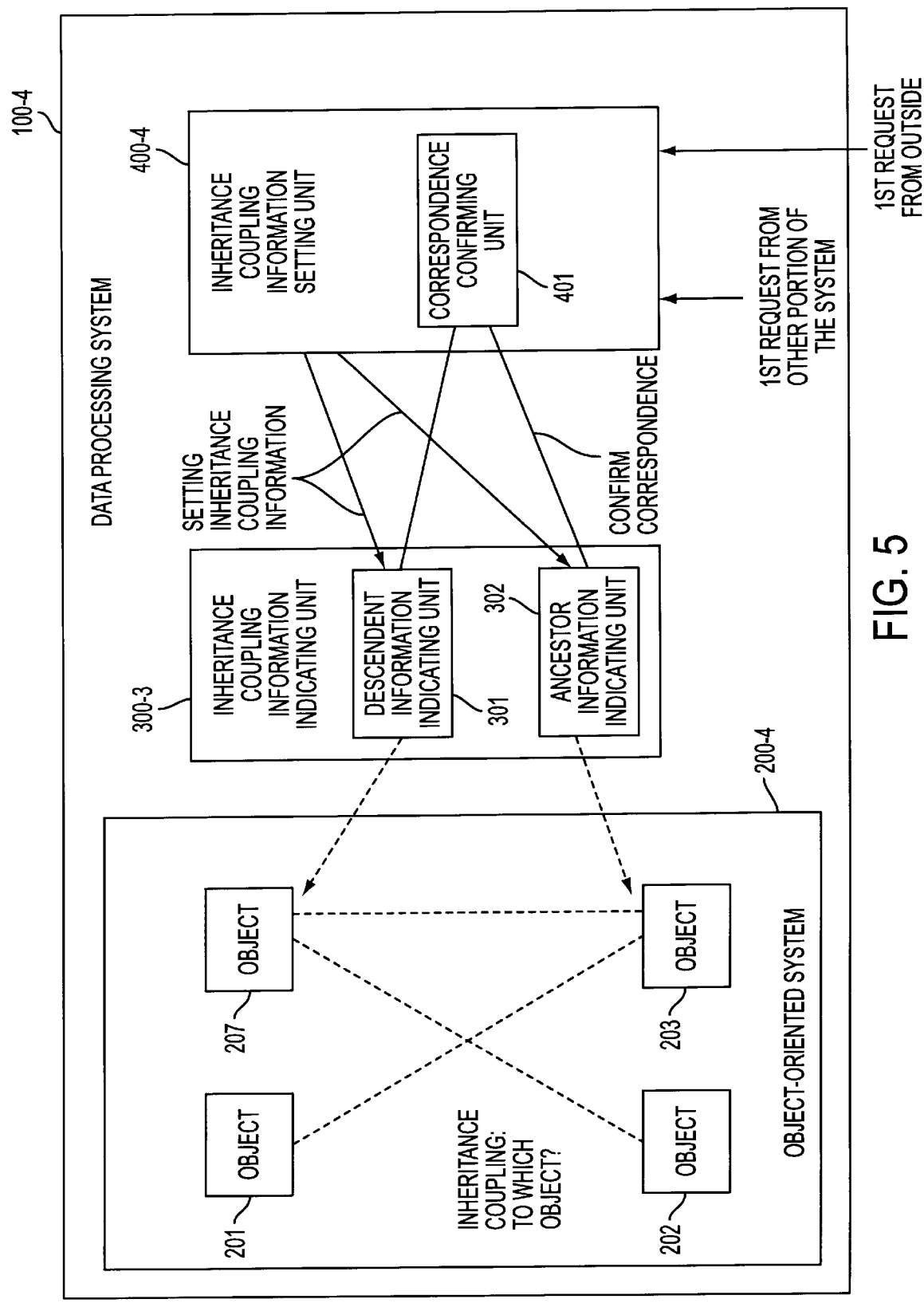
FIG. 5 is a diagram illustrating a fourth variation of the basic construction of the data processing systems according to the first to fourth aspects of the present invention.

Fourth Variation of Basic Construction (FIG. 5)

FIG. 5 is a diagram illustrating a fourth variation of the basic construction of the data processing systems according to the first to fourth aspects of the present invention, in FIG. 5, reference numeral 100-4 denotes a data processing system, 200-4 denotes an object-oriented system, 300-3 denotes an inheritance coupling information indicating unit, and 400-4 denotes an inheritance coupling information setting unit. In the object-oriented system 200-4, reference numeral 201, 202, 203, and 207 each denote an object defined by an object-oriented program in the object-oriented system 200-4.

The inheritance coupling information indicating unit 300-3 contains the descendent information indicating unit 301 and the ancestor information indicating unit 302. The descendent information indicating unit 301 holds therein and indicates the inheritance coupling information with regard to descendents of each class, and the ancestor information indicating unit 302 holds therein and indicates the inheritance coupling information with regard to ancestors of each class. For example, when the object 207 determines one of the objects 202 and 203 as an instance of a child class of the class to which the object 207 belongs to, the object 207 refers to the inheritance coupling information held in the descendent information indicating unit 301, while, when the object 203 determines one of the objects 201 and 207 as an instance of a parent class of the class to which the object 203 belongs to, the object 203 refers to the inheritance coupling information held in the ancestor information indicating unit 302.

In addition, the inheritance coupling information setting unit 400-4 in FIG. 5 may contain the correspondence confirming unit 401, which confirms that there is no contradiction between the inheritance coupling information for the ancestors held in the ancestor information indicating unit and the inheritance coupling information for the descendents held in the descendent information indicating unit. This confirmation may be performed for a specific one inheritance coupling such as an inheritance coupling between the objects 203 and 207 in FIG. 5 when the inheritance coupling information setting unit 400-4 receives a request for establishing an inheritance coupling between the objects 203 and 207, or when one of the objects 203 and 207 receives a request for executing a function, and needs to confirm the inheritance coupling between the objects 203 and 207.

Figure 6:
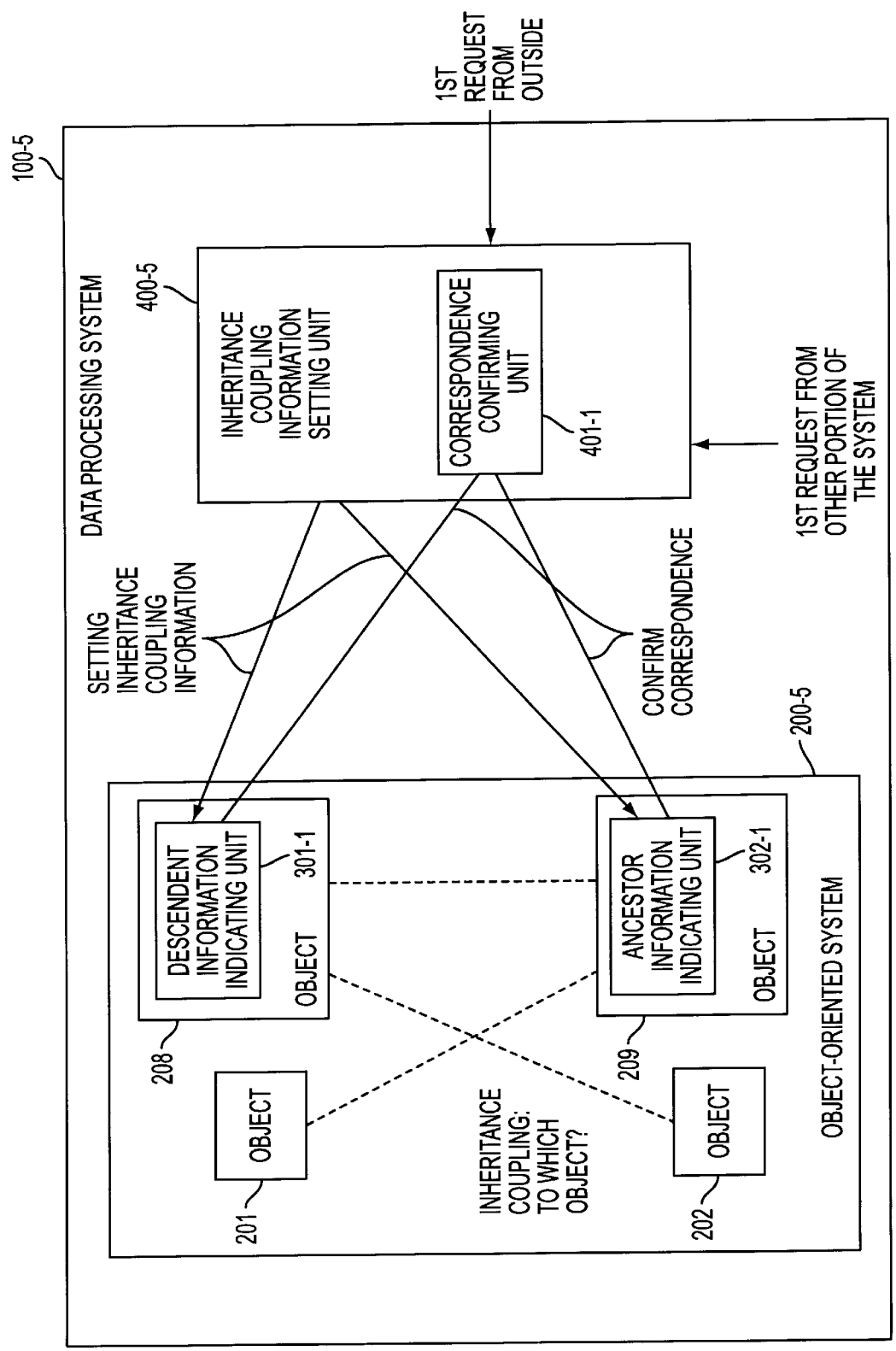
FIG. 6 is a diagram illustrating a fifth variation of the basic construction of the data processing systems according to the first to fourth aspects of the present invention.

Fifth Variation of Basic Construction (FIG. 6)

FIG. 6 is a diagram illustrating a fifth variation of the basic construction of the data processing systems according to the first to fourth aspects of the present invention. In FIG. 6, reference numeral 100-5 denotes a data processing system, 200-5 denotes an object-oriented system, and 400-5 denotes an inheritance coupling information setting unit. In the object-oriented system 200-5, reference numeral 201, 202, 208, and 209 each denote an object defined by an object-oriented program in the object-oriented system 200-5.

The difference in the construction of FIG. 6 form the construction of FIG. 5 is that the inheritance coupling information indicating unit 300-3 in FIG. 5 is contained in the respective objects in the construction of FIG. 6. Since the interest lies in the inheritance coupling between the objects 208 and 209 in the example of FIG. 6, only the descendent information indicating unit 301-1 is indicated in the object 208, and only the ancestor information indicating unit 302-1 is indicated in the object 209. In this case, the inheritance coupling information indicating unit 400-5 in FIG. 6 operates in the same manner as the corresponding element 400-4 in FIG. 5, and the correspondence confirming unit 401-1 in FIG. 6 operates in the same manner as the corresponding element 401 in FIG. S.

Figure 7:
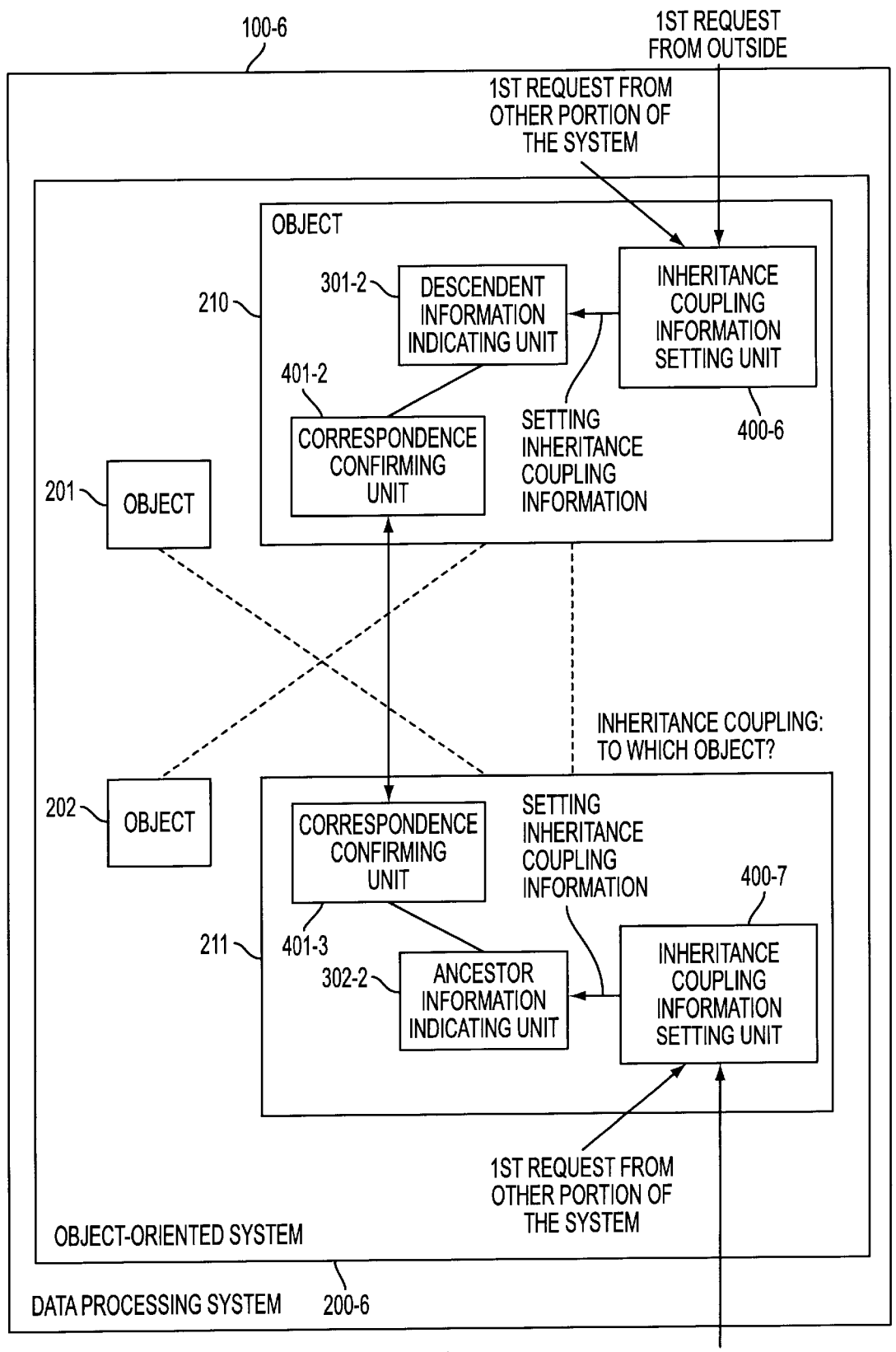
FIG. 7 is a diagram illustrating a sixth variation of the basic construction of the data processing systems according to the first to fourth aspects of the present invention.

Sixth Variation of Basic Construction (FIG. 7)

FIG. 7 is a diagram illustrating a sixth variation of the basic construction of the data processing systems according to the first to fourth aspects of the present invention. In FIG. 7, reference numeral 100-6 denotes a data processing system, and 200-6 denotes an object-oriented system. In the object-oriented system 200-6, reference numeral 201, 202, 210, and 211 each denote an object defined by an object-oriented program in the object-oriented system 200-6.

In the construction of FIG. 7, the object 210 contains the inheritance coupling information setting unit 400-6, in addition to the descendent information indicating unit 301-2, and the object 211 contains the inheritance coupling information setting unit 400-7, in addition to the ancestor information indicating unit 302-2. Since the interest lies in the inheritance coupling between the objects 210 and 211 in the example of FIG. 7, only the descendent information indicating unit 301-2 is indicated in the object 210, and only the ancestor information indicating unit 302-2 is indicated in the object 211. Therefore, each of the objects 210 and 211 has a construction similar to the object 206 in FIG. 4.

Further, the object 210 may contain the correspondence confirming unit 401-2, and the object 211 may contain the correspondence confirming unit 401-3. Due to the provision of the correspondence confirming units 401-2 and 401-3 in the objects 211 and 210, respectively, it is possible to communicate between the correspondence confirming units 401-2 and 401-3 and interchange inheritance coupling information to confirm that there is no contradiction in the inheritance coupling information in the objects 210 and 211 for the inheritance coupling between the objects 210 and 211.

Figure 8:
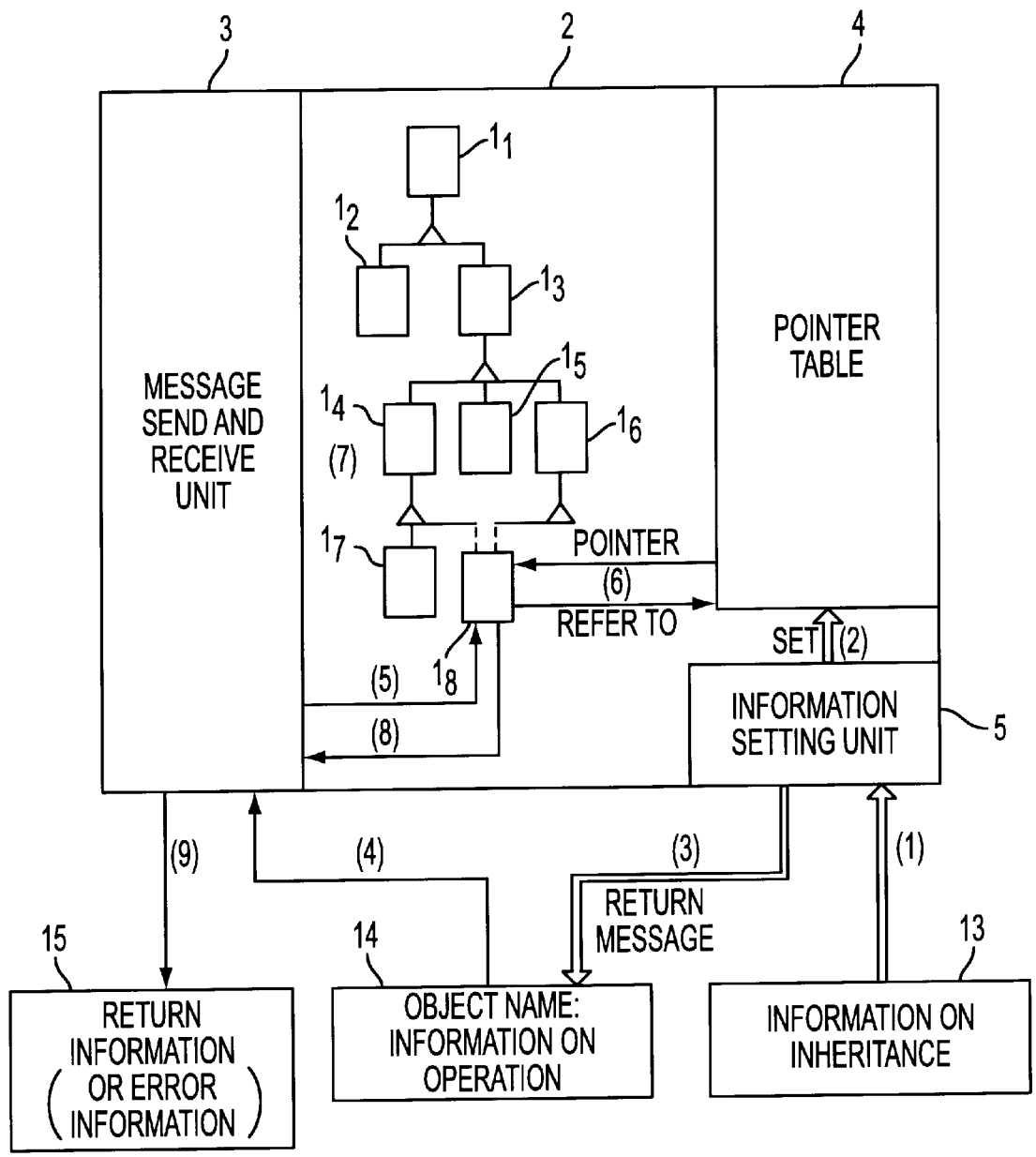
FIG. 8 is diagram illustrating the first embodiment of the present invention.

First Embodiment (FIG. 8)

FIG. 8 is diagram illustrating the first embodiment of the present invention. In FIG. 8, reference numeral $1_1$, $1_2$, ... $1_8$ a each denote an object, 2 denotes a set of objects, 3 denotes a message send and receive unit, 4 denotes a pointer table, 5 denotes an information setting unit. In addition, reference numerals 13 denotes an instruction or request to be supplied to the information setting unit 5, and 14 and 15 each denote a message.

In the construction of FIG. 8, the set 2 of objects $1_1$, $1_2$, ... $1_8$ is provided for realizing a predetermined application program unit in a program at least a portion of which is constructed in the manner of object-oriented programming, and which is executed in a data processing (computer) system. In FIG. a, the inheritance relationships among classes to which the objects $1_1$, $1_2$, ... $1_8$ respectively belong, are indicated an if the relationship between the objects $1_1$, $1_2$, ... $1_8$. The set 2 realizes, for example, an application for word processing, a spread sheet, or the like. Each object in the set 2 can receive and send a message through the message send and receive unit 3. The pointer table 4 corresponds to the inheritance coupling information indicating unit 300 in FIG. 1, and the information setting unit 5 corresponds to the inheritance coupling information setting unit 400 in FIG. 1.

The request 13 corresponds to the first request in FIG. 1, originating outside the data processing system or another unit in the data processing system. The request 13 may contain the coupled class information and/or the pointer(s) to predetermined candidates of the parent and/or child classes, which are explained with reference to FIG. 1. When the request 13 is supplied to the information setting unit 5 (step (1)), the information setting unit 5 sets the information contained in the request 13, in the pointer b le 4 (step (2)). When the operation of the information setting unit 5 is completed, the information setting unit 5 may return a message to outside the data processing system or the above other unit in the data processing system, at which the above request 13 is originated (step (3)).

Then, the message 14 is sent to the message send and receive unit 3 from the above other unit in the data processing system or a further other unit (step (4)). The message 14 may be generated in response to an input event to the data processing system. The message 14 contains an object name which indicates a destination object of the message 14, and information on an operation or function which the message requests the destination object to execute. When the message send and receive unit 3 receives the message 14, the message send and receive unit 3 transfers the message 14 to the destination object, for example, the object $1_8$ (step (5)).

When the object $1_8$ receives the message 14, the object $1_8$ looks up functions defined in the object $1_8$ for the function requested by the message 14. When the requested function is defined in the object $1_8$, the object $1_8$ executes the requested function, and returns a return message to the origin of the message 14 through the message send and receive unit 3 (steps (8) and (9)). When the requested function is not defined in the object $1_8$, the object $1_8$ looks up functions defined in the ancestor class(es). For looking up the ancestor class(es), the object $1_8$ refers to the pointer to its parent class, in the pointer table 4 (step (6)). When the requested function is found in one of the ancestor class(es) of the class of the object $1_8$, for example, in the class to which the object $1_4$ belongs, the execution of the requested function is delegated to the object $1_4$ (step (7)). When the execution of the requested function is completed, the object $1_8$ returns the return message 15 through the message send and receive unit 3 to the origin of the above message 14 (steps (8) and (9)). The return message 15 contains return information, which indicates the result of the executed function. When the above requested function is not found in the class of the object $1_8$ and its ancestor class(es), the object $1_8$ returns the return message containing error information.

Figure 9:
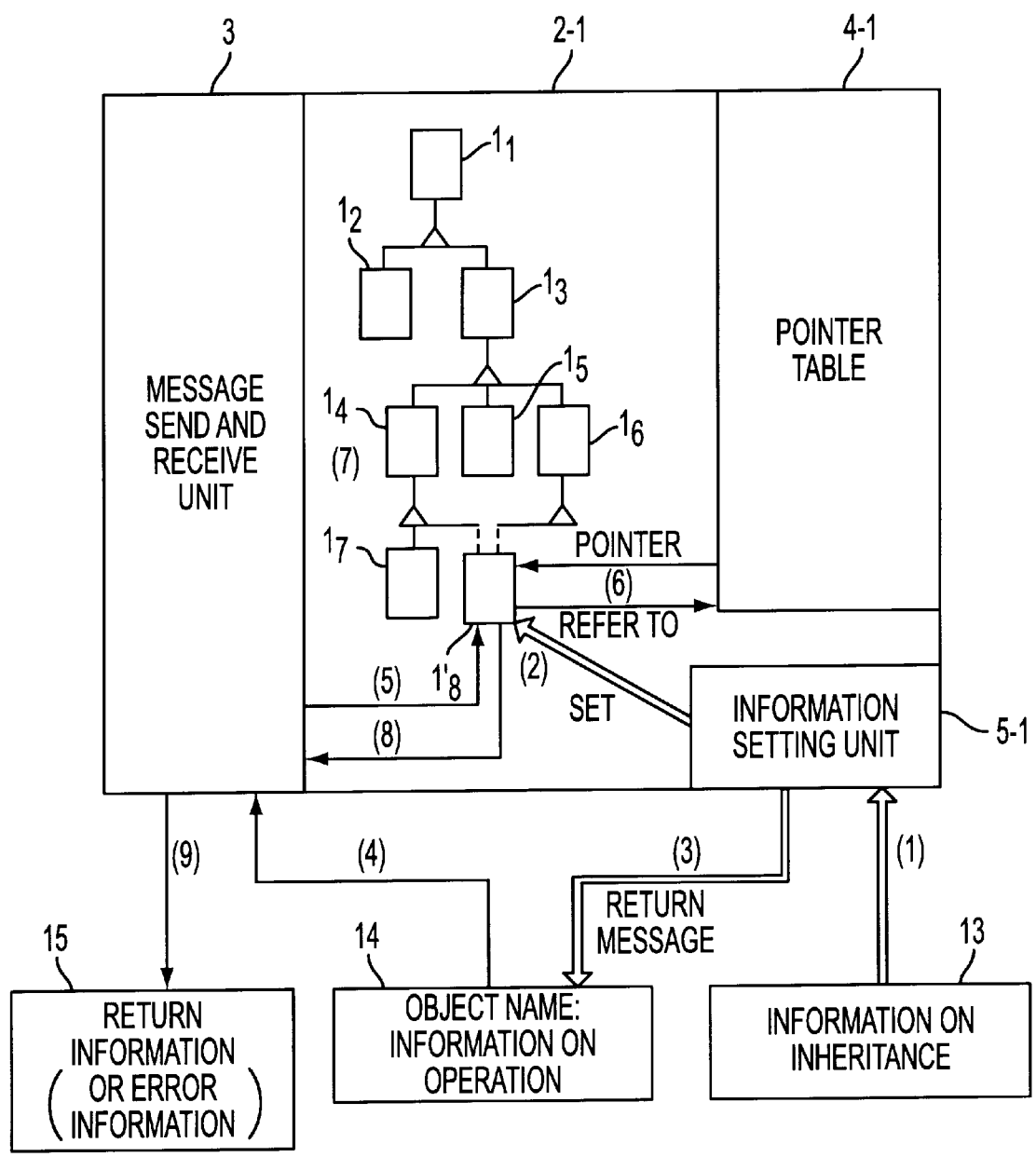
FIG. 9 is diagram illustrating the second embodiment of the present invention.

Second Embodiment (FIG. 9)

FIG. 9 is diagram illustrating the second embodiment of the present invention. The construction of FIG. 9 is different from the construction of FIG. 8, in that the pointer table 4-1 contains the pointers only, and at least one object $1_8'$ contains the coupled class information as explained with reference to FIGS. 1 and 2.

In the embodiment of FIG. 9, the request 13 contains the coupled class information. When the request 13 is supplied to the information setting unit 5-s (step (1)), the information setting unit 5-1 sets the coupled class information contained in the request 13, in the object $1_8'$ (step (2)). When the operation of the information setting unit 5-1 is completed, the information setting unit 5-1 may return a message to the origin of the above request 13 (step (3)).

Then, the message 14 is sent to the massage send and receive unit 3 from the above other unit in the data processing system or a further other unit (step (4)). When the object $1_8$ receives the message 14, the object $1_8'$ looks up functions defined in the object $1_8'$ for the function requested by the message 14. When the requested function is defined in the object $1_8'$, the object $1_8'$ executes the requested function, and returns a return message to the origin of the message 14 through the message send and receive unit 3 (steps (8) and (9)). When the requested function is not defined in the object $1_8'$, the object $1_8'$ looks up functions defined in the ancestor class(es). For looking up the ancestor class(es), the object $1_8'$ refers to the coupled class information which is set therein, and to the pointer to its parent class, in an entry for the coupled class in the pointer table 4-1 (step (6)). The other operations in the embodiment of FIG. 9 are the same as those in the embodiment of FIG. 8.

Figure 10:
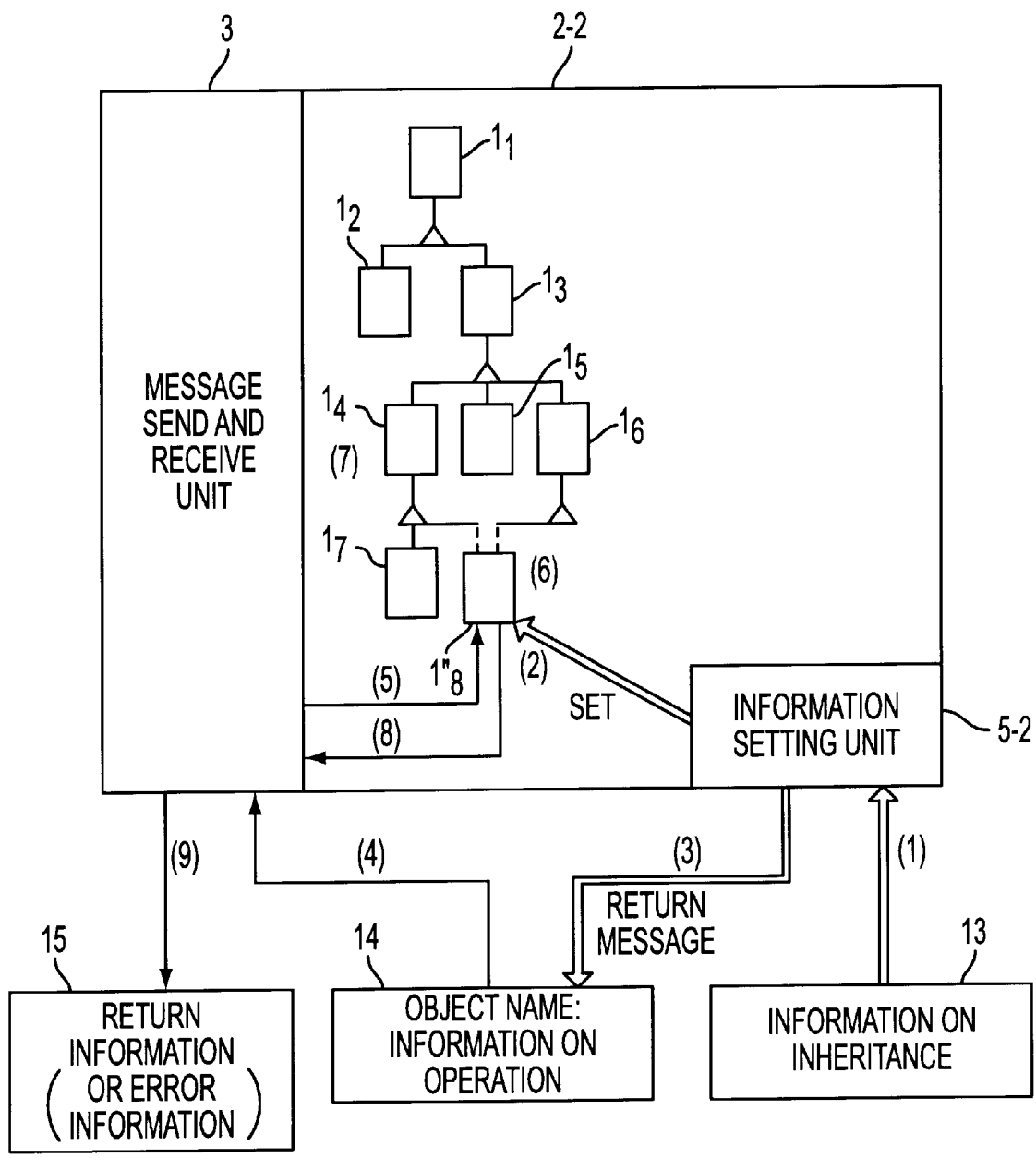
FIG. 10 is diagram illustrating the third embodiment of the present invention.

Third Embodiment (FIG. 10)

FIG. 10 is diagram illustrating the third embodiment of the present invention. The construction of FIG. 10 is different from the construction of FIG. 8, in that there is no pointer table, and the information in the pointer table 4 of FIG. 8 is contained in at least one object. For example, the respective objects may contain the pointers to its parent and/or child classes. Namely, the embodiment of FIG. 10 corresponds to the construction of FIG. 2.

In the embodiment of FIG. 10, the request 13 contains the coupled class information and/or the pointer(s) to predetermined candidates of the parent and/or child classes. When the request 13 is supplied to the information setting unit 5-2 (step (1)), the information setting unit 5-2 sets the inheritance coupling information contained in the request 13, in the object $1_8''$ (step (2)). When the operation of the information setting unit 5-2 is completed, the information setting unit 5-2 may return a message to the origin of the above request 13 (step (3)).

Then, the message 14 is sent to the message send and receive unit 3 from the above other unit in the data processing system or a further other unit (step (4)). When the object $1_8$ receives the message 14, the object $1_8''$ looks up functions defined in the object $1_8''$ for the function requested by the message 14. When the requested function is defined in the object $1_8''$, the object $1_8''$ executes the requested function, and returns a return message to the origin of the message 14 through the message send and receive unit 3 (steps (8) and (9)). When the requested function is not defined in the object $1_8''$, the object $1_s''$ looks up functions defined in the ancestor class(es). For looking up the ancestor class(es), the object $1_8''$ refers to the above inheritance coupling information which is set therein for the pointer to its parent class (step (6)). The other operations in the embodiment of FIG. 9 are the same as those in the embodiment of FIG. 8.

According to the above operations of FIGS. 8 to 10, the origins of the request 13 and the message 14 may be different units, and the request 13 and the message 14 may be generated and sent independently.

Figure 11:
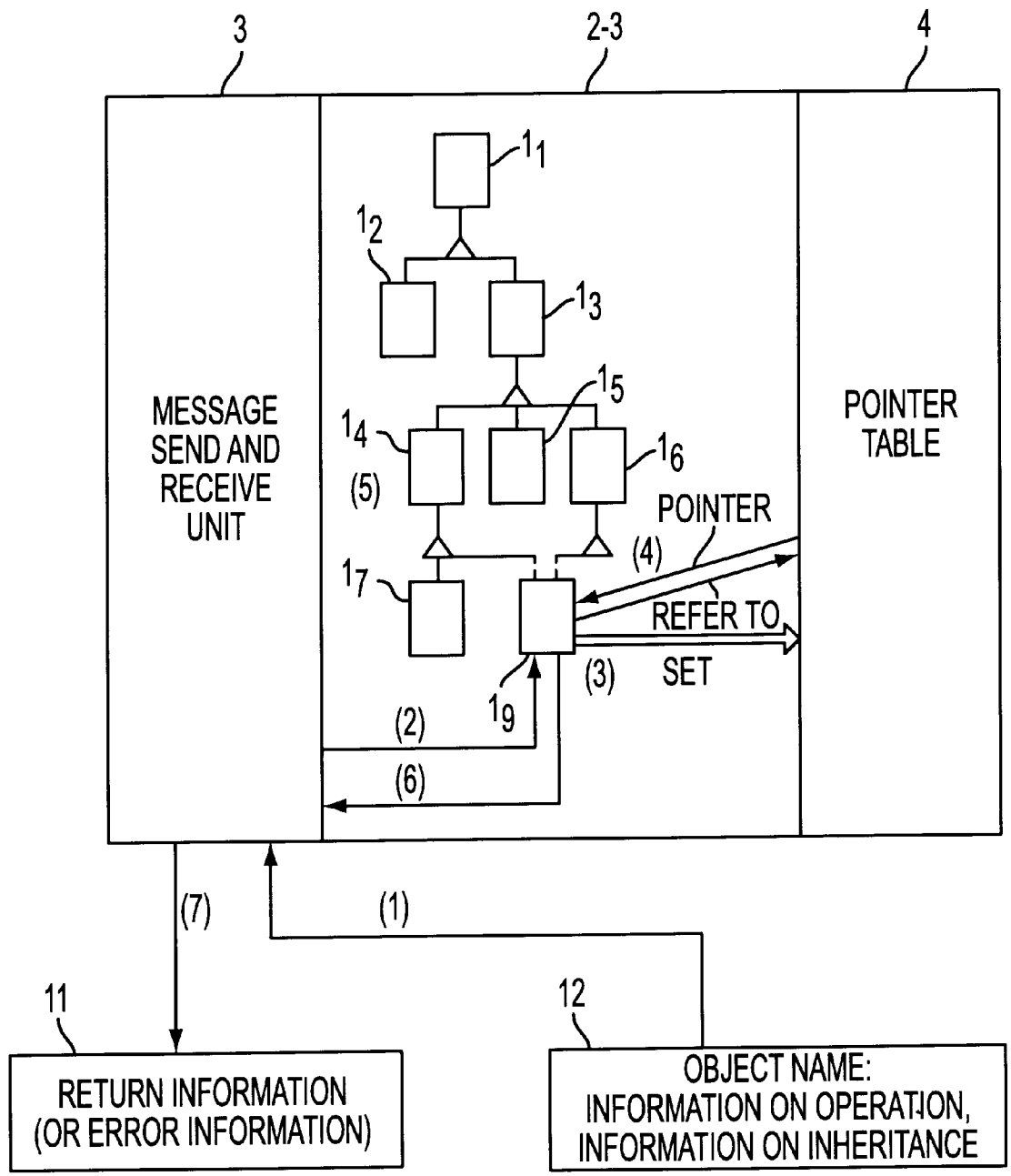
FIG. 11 is diagram illustrating the fourth embodiment of the present invention.

Fourth Embodiment (FIG. 11)

FIG. 11 is diagram illustrating the fourth embodiment of the present invention. The construction of FIG. 11 is different from the construction of FIG. 8, in that the information contained in the above request 13, is contained in the message 12 which is sent to an object through the message send and receive unit 3, and the function of the information setting unit is realized in the object, as one of functions defined in the class of the object. The embodiment of FIG. 11 corresponds to the construction of FIG. 3. The pointer table 4 in FIG. 11 is the same as the pointer table 4 in FIG. 8.

When the message 12 is sent to the message send and receive unit 3 from the above other unit in the data processing system or a further other unit (step (1)), the message 12 is transferred to the destination object $1_9$ (step (2)).

When the object $1_9$ receives the message 12, the object $1_9$ first executes the function of the above information setting unit. Namely, the object $1_9$ sets the information on inheritance (inheritance coupling information) contained in the message 12, in the pointer table 4 (stop (3)). When the operation of the information setting unit is completed, the object $1_9$ looks up functions defined in the object $1_9$ for the function requested by the message 12. When the requested function is defined in the object $1_9$ the object $1_9$ executes the requested function, and returns a return message to the origin of the message 12 through the message send and receive unit 3 (steps (6) and (7)). When the requested function is not defined in the object $1_9$, the object $1_9$ looks up functions defined in the ancestor class(es). For looking up the ancestor class(es), the object $1_9$ refers to the pointer to its parent class, in the pointer table 4 (step (4)). When the requested function is found in one of the ancestor class(es) of the class of the object $1_9$, for example, in the class to which the object $1_4$ belongs, the execution of the requested function is delegated to the object $1_4$ (step (5)). When the execution of the requested function is completed, the object $1_9$ returns the return message 11 through the message send and receive unit 3 to the origin of the above message 12 (steps (6) and (7)). The return message 11 contains return information, which indicates the result of the executed function. When the above requested function is not found in the class of the object $1_9$ and its ancestor class(es), the object $1_9$ returns the return message containing error information.

Figure 12:
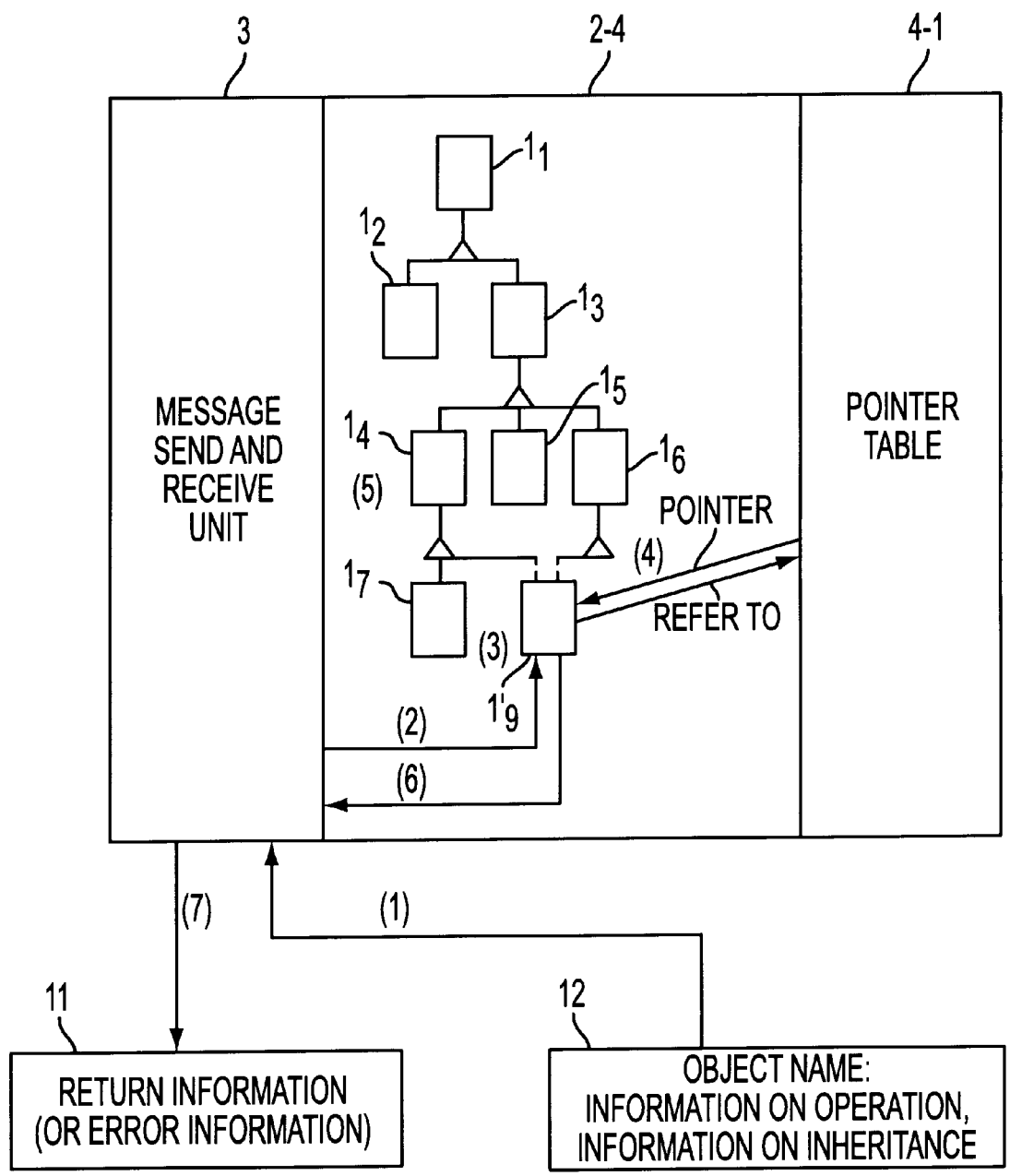
FIG. 12 is diagram illustrating the fifth embodiment of the present invention.

Fifth Embodiment (FIG. 12)

FIG. 12 is diagram illustrating the fifth embodiment of the present invention. The construction of FIG. 12 is different from the construction of FIG. 11, in that the pointer table 4-1 contains the pointers only, and at least one object $1_9'$ contains the coupled class information as explained with reference to FIGS. 1 and 2.

In the embodiment of FIG. 12, the inheritance coupling information contained in the message 12 contains the coupled class information. When the message 12 is supplied to the object $1_9'$ (steps (1) and (2)), the function of the information setting unit, which is defined in the class of the object $1_9'$, sets the coupled class information contained in the message 12, in the object $1_9'$ (step (3)). When the operation of the information setting unit is completed, the object $1_9'$ looks up functions defined in the object $1_9'$ for the function requested by the message 12. When the requested function is defined in the object $1_9'$, the object $1_9'$ executes the requested function, and returns a return message to the origin of the message 12 through the message send and receive unit 3 (steps (6) and (7)). When the requested function is not defined in the object $1_9'$, the object $1_9'$ looks up functions defined in the ancestor class(es). For looking up the ancestor class(es), the object $1_9'$ refers to the coupled class information which is set therein, and to the pointer to its parent class, in an entry for the coupled class in the pointer table 4-1 (step (4)). The other operations in the embodiment of FIG. 12 are the same as those in the embodiment of FIG. 11.

Figure 13:
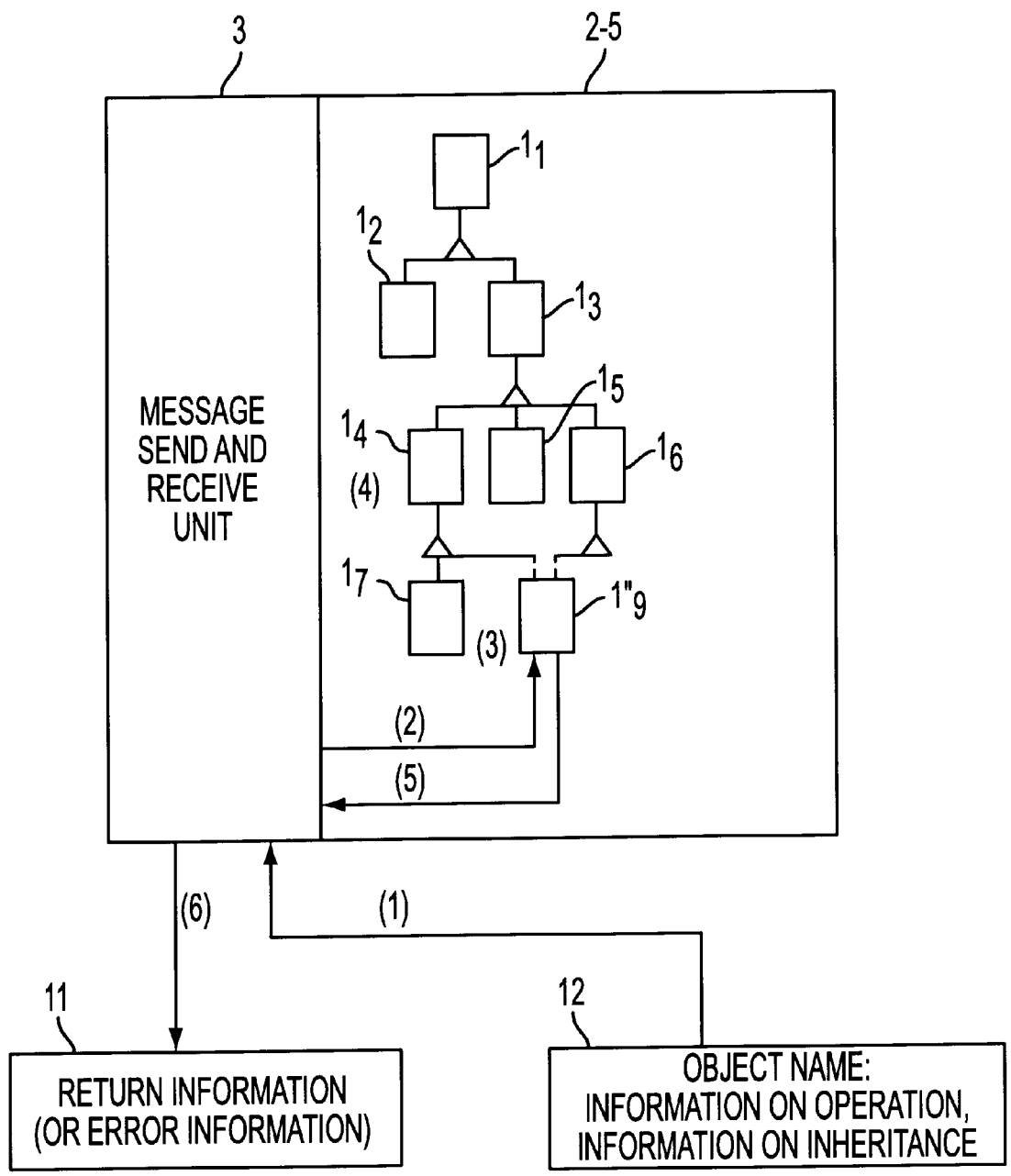
FIG. 13 is diagram illustrating the sixth embodiment of the present invention.

Sixth Embodiment (FIG. 13)

FIG. 13 is diagram illustrating the sixth embodiment of the present invention. The construction of FIG. 13 is different from the construction of FIG. 11, in that there is no pointer table, and the information in the pointer table 4 of FIG. 11 is contained in at least one object. For example, the respective objects may contain the pointers to its parent and/or child classes. Namely, the embodiment of FIG. 13 corresponds to the construction of FIG. 2.

In the embodiment of FIG. 13, the message 12 contains the coupled class information and/or the pointer(s) to predetermined candidates of the parent and/or child classes. When the message 12 is supplied to the object $1_9''$ (steps (1) and (2)), the function of information setting unit, which is defined in the object $1_9''$, sets the inheritance coupling information contained in the message 12, in the object $1_9''$ (step (3)). When the operation of the information setting unit is completed, the object $1_9'$ looks up functions defined in the object $1_9''$ for the function requested by the message 12. When the requested function is defined in the object $1_9''$, the object $1_9''$ executes the requested function, and returns a return message to the origin of the message 12 through the message send and receive unit 3 (steps (5) and (6)). When the requested function is not defined in the object $1_9''$, the object $1_9''$ looks up functions defined in the ancestor class (es). For looking up the ancestor class(es), the object $1_9''$ refers to the above inheritance coupling information which is set therein for the pointer to its parent class (step (3)). The other operations in the embodiment of FIG. 13 are the same as those in the embodiment of FIG. 11.

As explained with reference to FIG. 4, the inheritance coupling information indicating unit 300-2 may not be provided in the object $1_9''$. Namely, the inheritance coupling information contained in the message 12 may not be held in the object $1_9''$, and may be temporarily used for looking up the ancestor class(es). In this case, the embodiment of FIG. 13 realizes the eighth aspect of the present invention.

Figure 14:
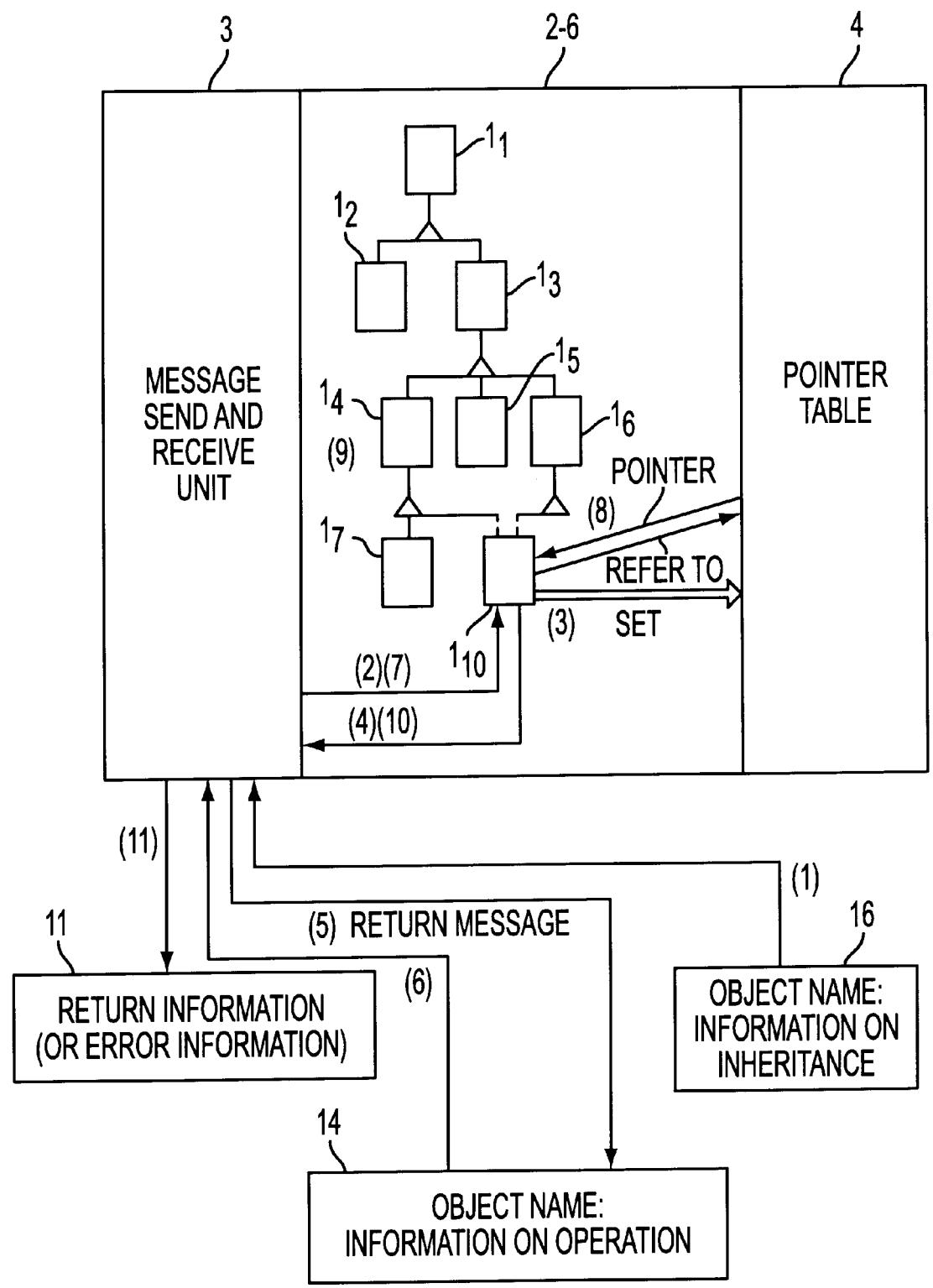
FIG. 14 is diagram illustrating the seventh embodiment of the present invention.

Seventh Embodiment (FIG. 14)

FIG. 14 is diagram illustrating the seventh embodiment of the present invention. The construction of FIG. 14 is different from the constructions of FIGS. 8 and 11, in that the information contained in the above request 13 in the embodiment of FIG. 8, is contained in a first message 16 which is sent to an object through the message send and receive unit 3, before a second message containing a request for an execution of a function is sent to the object. The function of the information setting unit is also realized in the object, as one of functions defined in the class of the object. The embodiment of FIG. 14 also corresponds to the construction of FIG. 3. The pointer table 4 in FIG. 14 is the same as the pointer table 4 in FIGS. 8 and 11.

When the first message 16 is sent to the message send and receive unit 3 from the above other unit in the data processing system or a further other unit (stop (1)), the first message 16 is transferred to the destination object $1_{10}$ (step (2)).

When the object $1_{10}$ receives the first message 16, the object $1_{10}$ first executes the function of the above information setting unit. Namely, the object $1_{10}$ sets the information on inheritance (inheritance coupling information) contained in the first message 16, in the pointer table 4 (step (3)). When the operation of the information setting unit is completed, the information setting unit may return a message to the origin of the first message 16 through the message send and receive unit 3 (steps (4) and (5)).

Then, the second message 14, which is the same as the message 14 in the embodiment of FIG. 8, is sent to the message send and receive unit 3 to the object $1_{10}$ (steps (6) and (7)). When the object $1_{10}$ receives the second message 14, the object $1_{10}$ looks up functions defined in the object $1_{10}$ for the function requested by the second message 14. When the requested function is defined in the object $1_{10}$, the object $1_{10}$ executes the requested function, and returns a return message to the origin of the second message 14 through the message send and receive unit 3 (steps (10) and (11)). When the requested function is not defined in the object $1_{10}$, the object $1_{10}$ looks up functions defined in the ancestor class (es). For looking up the ancestor class(es), the object $1_{10}$ refers to the pointer to its parent class, in the pointer table 4 (steps (8)). When the requested function is found in one of the ancestor class(es) of the class of the object $1_{10}$, for example, in the class to which the object $1_4$ belongs, the execution of the requested function is delegated to the object $1_4$ (step (9)). When the execution of the requested function is completed, the object $1_{10}$ returns the return message 11 through the message send and receive unit 3 to the origin of the above message 14 (steps (11)). The return message 11 contains return information, which indicates the result of the executed function. When the above requested function is not found in the class of the object $1_{10}$ and its ancestor class(es), the object $1_{10}$ returns the return message containing error information.

Figure 15:
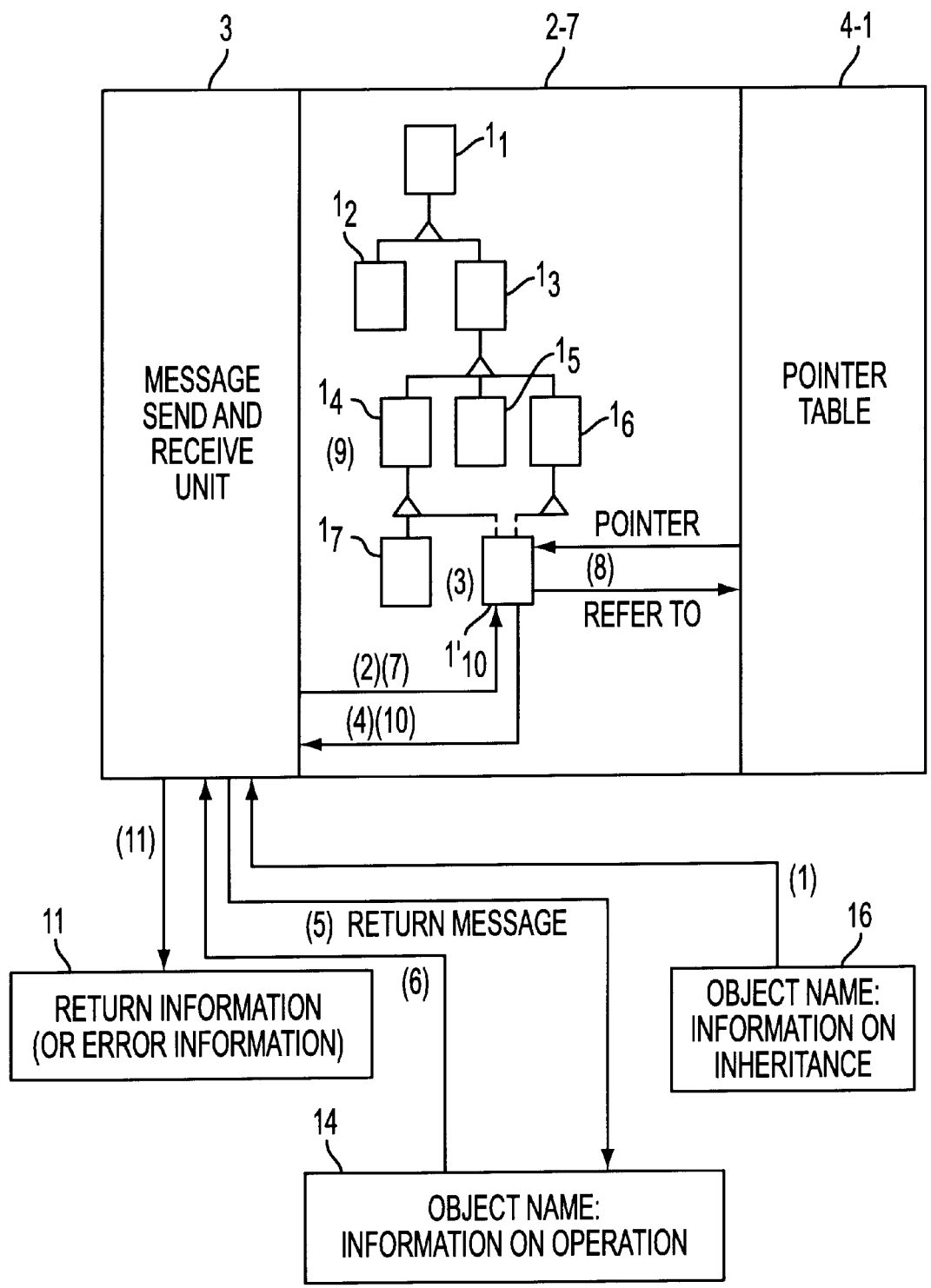
FIG. 15 is diagram illustrating the eighth embodiment of the present invention.

Eighth Embodiment (FIG. 15)

FIG. 15 is diagram illustrating the eighth embodiment of the present invention. The construction of FIG. 15 is different from the construction of FIG. 14, in that the pointer table 4-1 contains the pointers only, and at least one object $1_{10}'$ contains the coupled class information as explained with reference to FIGS. 1 and 2.

In the embodiment of FIG. 15, the inheritance coupling information contained in the first message 16 contains the coupled class information. When the first message 16 is supplied to the object $1_{10}'$ (steps (1) and (2)), the function of the information setting unit, which is defined in the class of the object $1_{10}'$, sets the coupled class information contained in the first message 16, in the object $1_{10}'$ (steps (3)). When the operation of the information setting unit is completed, the information setting unit may return a message to the origin of the first message 16 through the message send and receive unit 3 (steps (4) and (5)).

Then, the second message 14, which is the same as the message 14 in the embodiment of FIG. 8, is sent to the message send and receive unit 3 to the object $1_{10}'$ (steps (6) and (7)). When the object $1_{10}$ receives the second message 14, the object $1_{10}'$ looks up functions defined in the object $1_{10}'$ for the function requested by the second message 14. When the requested function is defined in the object $1_{10}'$, the object $1_{10}'$ executes the requested function, and returns a return message to the origin of the second message 14 through the message send and receive unit 3 (steps (10) and (11)). when the requested function is not defined in the object $1_{10}'$, the object $1_{10}'$ looks up functions defined in the ancestor class(es). For looking up the ancestor class(es), the object $1_{10}'$ refers to the coupled class information which is set therein, and to the pointer to its parent class, in an entry for the coupled class in the pointer table 4-1 (steps (8)). The other operations in the embodiment of FIG. 15 are the same as those in the embodiment of FIG. 14.

Figure 16:
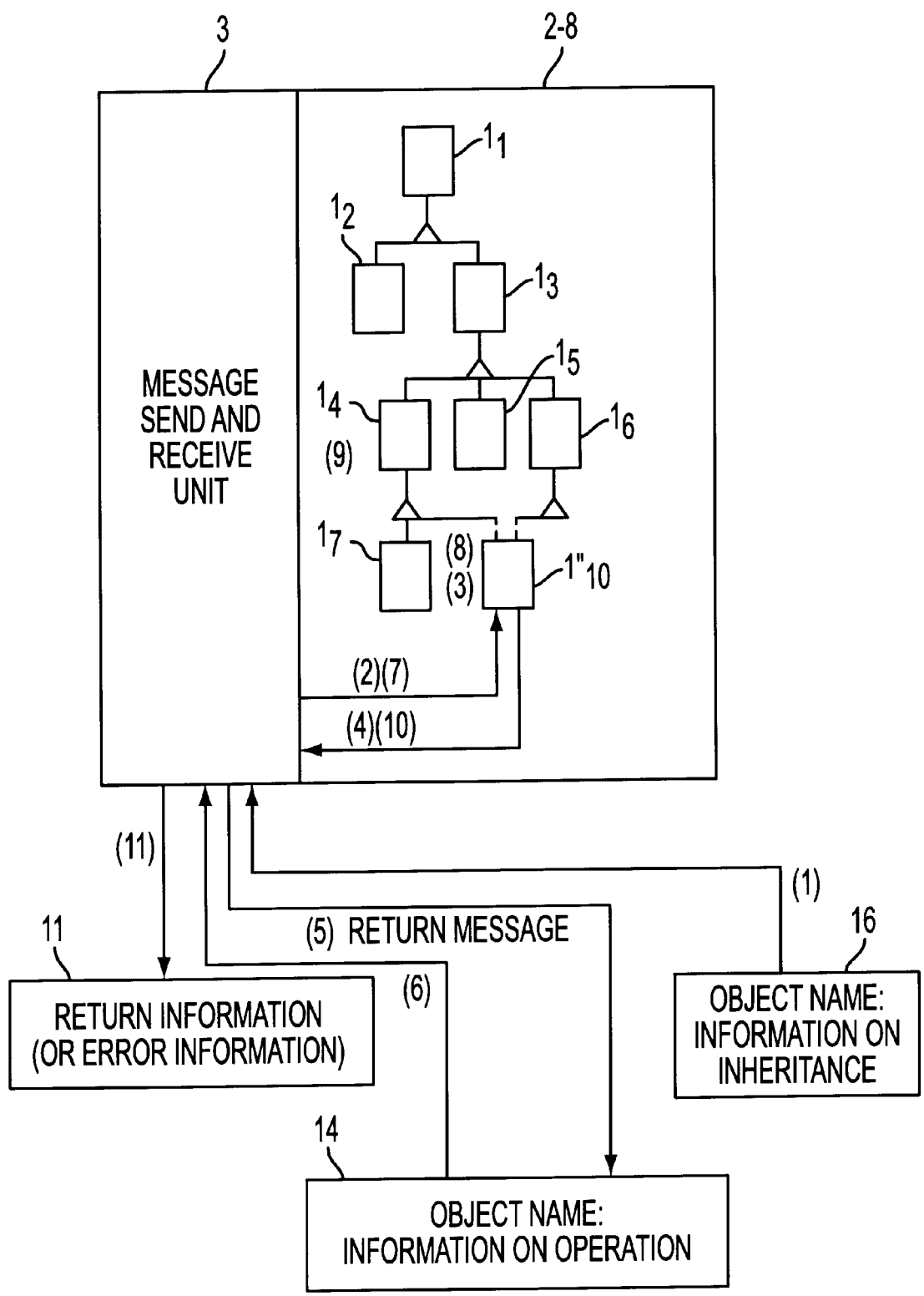
FIG. 16 is diagram illustrating the ninth embodiment of the present invention.

Ninth Embodiment (FIG. 16)

FIG. 16 is diagram illustrating the ninth embodiment of the present invention. The construction of FIG. 16 is different from the construction of FIG. 14, n that there is no pointer table, and the information in the pointer table 4 of FIG. 14 is contained in at least one object. For example, the respective objects may contain the pointers to its parent and/or child classes. Namely, the embodiment of FIG. 16 corresponds to the construction of FIG. 2.

In the embodiment of FIG. 16, the first message 16 contains the coupled class information and/or the pointer(s) to predetermined candidates of the parent and/or child classes. When the first message 16 is supplied to the object $1_{10}"$ (steps (1) and (2)), the function of information setting unit, which is defined in the object $1_{10}"$, sets the inheritance coupling information contained in the first message 16, in the object $1_{10}"$ (steps (3)). When the operation of the information setting unit is completed, the information setting unit may return a message to the origin of the first message 16 through the message send and receive unit 3 (steps (4) and (5)).

Then, the second message 14, which is the same as the message 14 in the embodiment of FIG. 8, is sent to the message send and receive unit 3 to the object $1_{10}"$ (steps (6) and (7)). When the object $1_{10}"$ receives the second message 14, the object $1_{10}"$ looks up functions defined in the object $1_{10}"$ for the function requested by the second message 14. When the requested function is defined in the object $1_{10}"$, the object $1_{10}"$ executes the requested function, and returns a return message to the origin of the second message 14 through the message send and receive unit 3 (steps (5) and (6)). When the requested function is not defined in the object $1_{10}"$ the object $1_{10}"$ looks up functions defined in the ancestor class(es). For looking up the ancestor class(es), the object $1_{10}"$ refers to the above inheritance coupling information which is set therein for the pointer to its parent class (steps (8)). The other operations in the embodiment of FIG. 16 are the same as those in the embodiment of FIG. 14.

As explained with reference to FIG. 4, the inheritance coupling information indicating unit 300-2 may not be provided in the object $1_{10}"$. Namely, the inheritance coupling information contained in the first message 16 may not be held in the object $1_{10}"$, and may be temporarily used for looking up the ancestor class(es). In this case, the embodiment of FIG. 16 realizes the eighth aspect of the present invention.

According to the above operations of FIGS. 14 to 16, the origins of the first message 16 and the second message 14 may be different units, and the first message is 16 and the second message 14 may be generated and sent independently.

Figure 17:
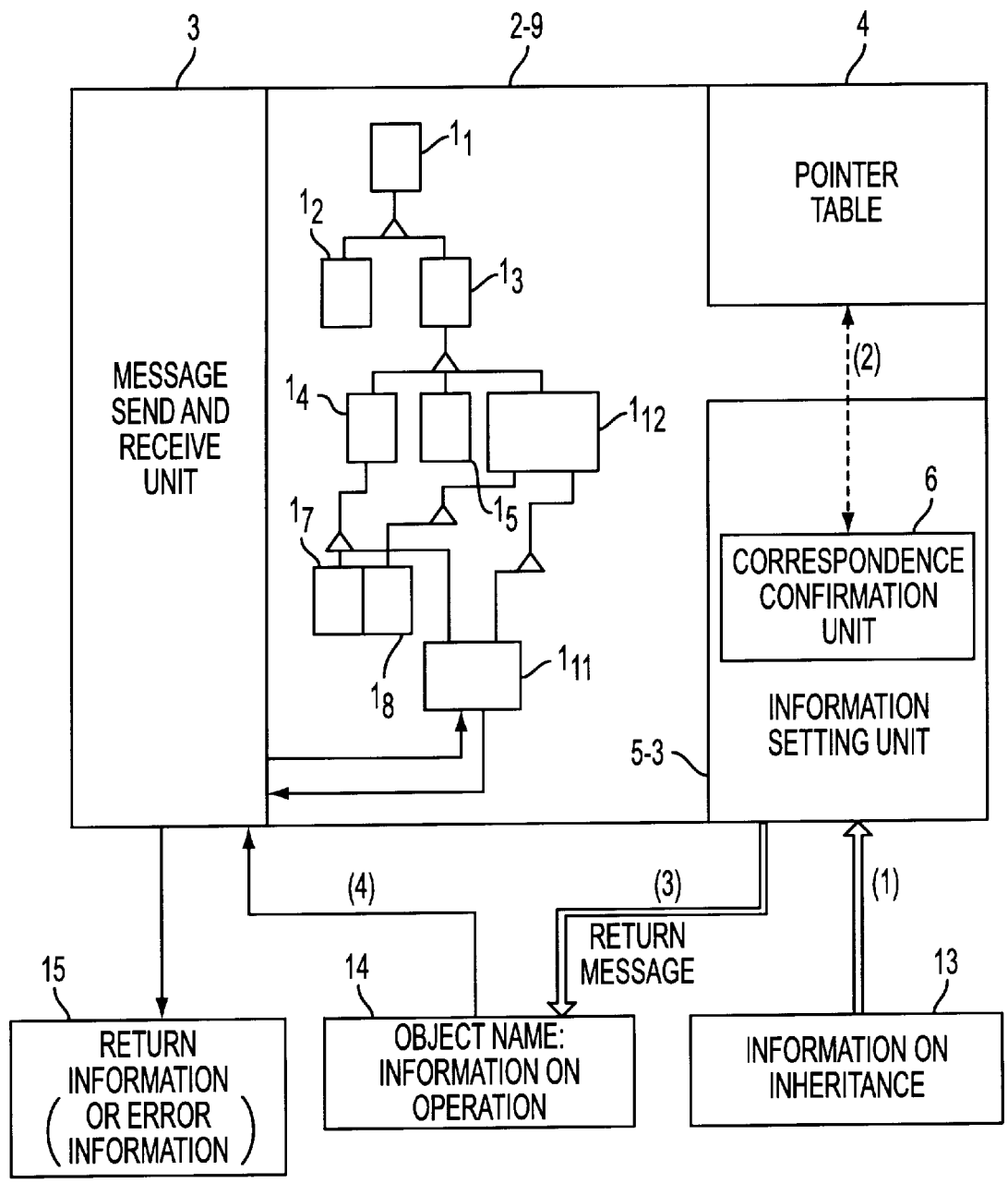
FIG. 17 is diagram illustrating the tenth embodiment of the present invention.

Tenth Embodiment (FIG. 17)

FIG. 17 is diagram illustrating the tenth embodiment of the present invention. The embodiment of FIG. 17 corresponds to the construction of FIG. S. The construction of FIG. 17 is different from the construction of FIG. 8, in that the information setting unit 5-3 contains a correspondence confirmation unit 6, which corresponds to the correspondence confirming unit 401 in the construction of FIG. 5. The pointer table 4 in FIG. 17 is the same as the pointer table 4 in FIGS. 8, 11, and 14.

When the request 13 is supplied to the information setting unit 5-3 (steps (1)), the correspondence confirmation unit 6 in the inheritance coupling information setting unit 5-3 confirms that no contradiction occurs between the inheritance coupling information for the ancestors held in the pointer table 4 and the inheritance coupling information for the descendents held in the pointer table 4, by setting the inheritance coupling information contained in the request 13, in the pointer table 4. When no contradiction is confirmed, the information setting unit 5-3 sets the inheritance coupling information contained in the request 13, in the pointer table 4 (steps (2)). When the operation of the information setting unit 5-3 is completed, the information setting unit 5-3 may return a message to the origin of the request 13 (step (3)). When the correspondence confirmation unit 6 has determined that at least one contradiction occurs by setting the above inheritance coupling information contained in the request 13, the correspondence confirmation unit 6 returns an error message to the origin of the request 13.

The other operations in the embodiment of FIG. 17 are the same as the operations in the embodiment of FIG. 8.

Figure 18:
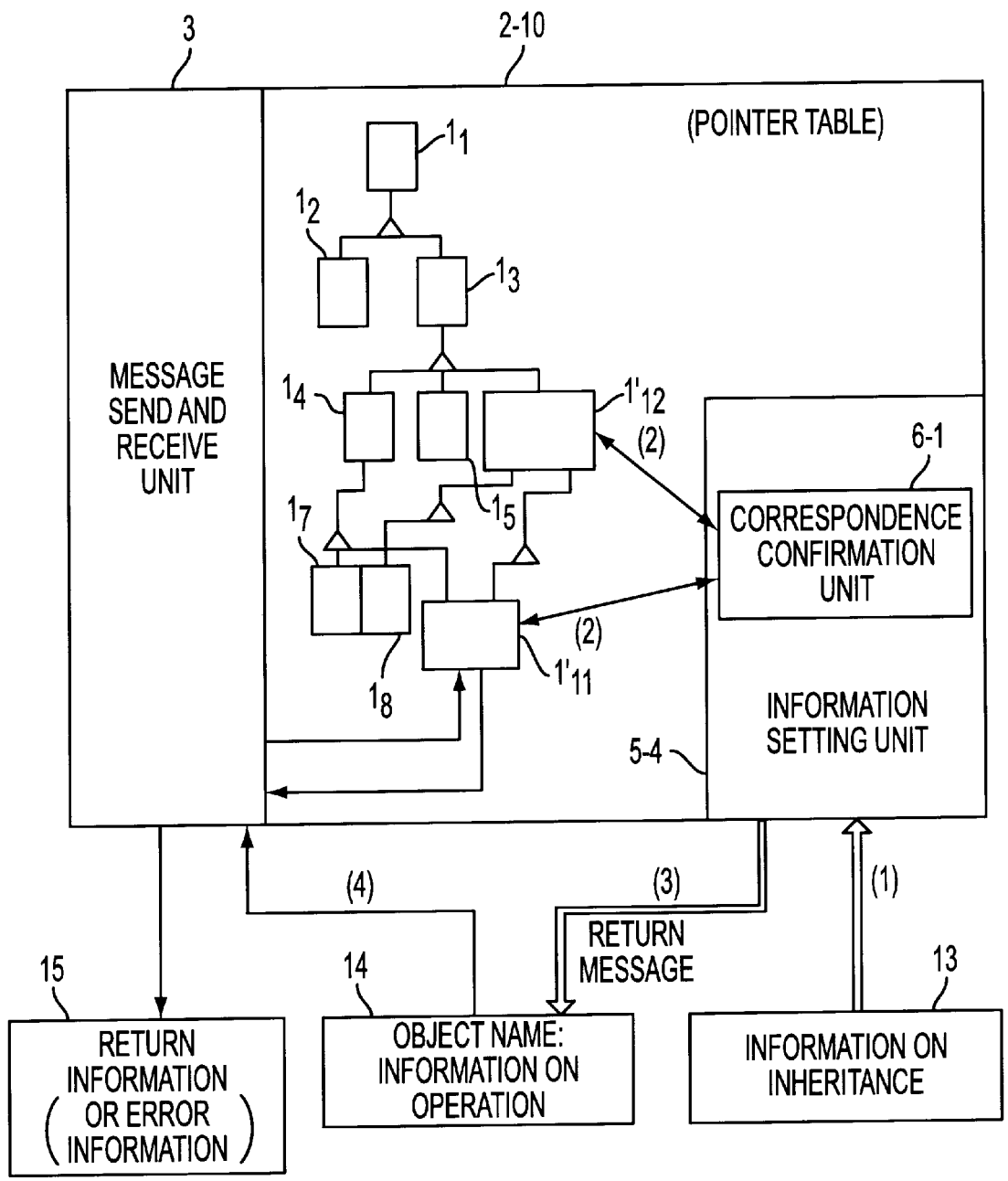
FIG. 18 is diagram illustrating the eleventh and twelfth embodiments of the present invention.

Eleventh and Twelfth Embodiments (FIG. 18)

FIG. 18 is diagram illustrating the eleventh and twelfth embodiments of the present invention.

The construction of the eleventh embodiment is different from the construction of FIG. 17, in that the pointer table contains the pointers only, at least one object $1_{11}$' contains the coupled class information as explained with reference to FIGS. 1 and 2, and the confirmation by the correspondence confirmation unit 6-1 is carried out with regard to the coupled class information set or to be set in a pair of parent and child objects (i.e., objects of a pair of parent and child classes).

In the eleventh embodiment, the request 13 contains the coupled class information. When the request 13 is supplied to the information setting unit 5-4 (steps (1)), the correspondence confirmation unit 6-1 in the inheritance coupling information setting unit 5-4 confirms that no contradiction occurs between the coupled class information for parent class(es) of the class of the object $1_{11}$' hold in the object $1_{11}$' and the coupled class information for the child class(es) of the class of the object $1_{12}$' held in the object $1_{12}$', by setting the inheritance coupling information contained in the request 13, in the objects $1_{11}$' and $1_{12}$', respectively (steps (2)). When no contradiction is confirmed, the information setting unit 5-4 sets the inheritance coupling information contained in the request 13, in the objects $1_{11}$' and $1_{12}$' and/or the pointer table, respectively. When the operation of the information setting unit 5-4 is completed, the information setting unit 5-4 may return a message to the origin of the request 13 (steps (3)). When the correspondence confirmation unit 6-1 determined that at least one contradiction occurs by setting the above inheritance coupling information contained in the request 13, the correspondence confirmation unit 6-1 returns an error message to the origin of the request 13.

The other operations in the eleventh embodiment are the same as the operations in the embodiment of FIG. 9.

The construction of the twelfth embodiment is different from the construction of FIG. 17, in that there is no pointer table, the information in the pointer table 4 of FIG. 17 is contained in at least one object, and the confirmation by the correspondence confirmation unit 6-1 is carried out with regard to the inheritance coupling information set in a pair of parent and child objects (i. e., objects of a pair of parent and child classes). For example, the respective objects may contain the pointers to its parent and/or child classes. Namely, the twelfth embodiment corresponds to the construction of FIG. 6.

In the twelfth embodiment, the request 13 contains, as the inheritance coupling information, the coupled class information and/or the pointer(s) to predetermined candidates of the parent and/or child classes. When the request 13 is supplied to the information setting unit 5 (steps (1)), the correspondence confirmation unit 6-1 in the inheritance coupling information setting unit 5-4 confirms that no contradiction occurs between the inheritance coupling information for parent class(es) of the class of the object $1_{11}$' held in the object $1_{11}$' and the inheritance coupling information for the child class(es) of the class of the object $1_{12}$' held in the object $1_{12}$', by setting the inheritance coupling information contained in the request 13, in the objects $1_{11}$' and $1_{12}$', respectively (steps (2)). When no contradiction is confirmed, the information setting unit 5-4 sets the inheritance coupling information contained in the request 13, in the objects $1_{11}$' and $1_{12}$', respectively. When the operation of the information setting unit 5-4 is completed, the information setting unit 5-4 may return a message to the origin of the request 13 (steps (3)). When the correspondence confirmation unit 6-1 determines that at least one contradiction occurs by setting the above inheritance coupling information contained in the request 13, the correspondence confirmation unit 6-1 returns an error message to the origin of the request 13.

The other operations in the twelfth embodiment are the same as the operations in the embodiment of FIG. 10.

According to the above operations of the tenth to twelfth embodiments, the origins of the request 13 and the message 14 may be different units, and the request 13 and the message 14 may be generated and sent independently.

Figure 19:
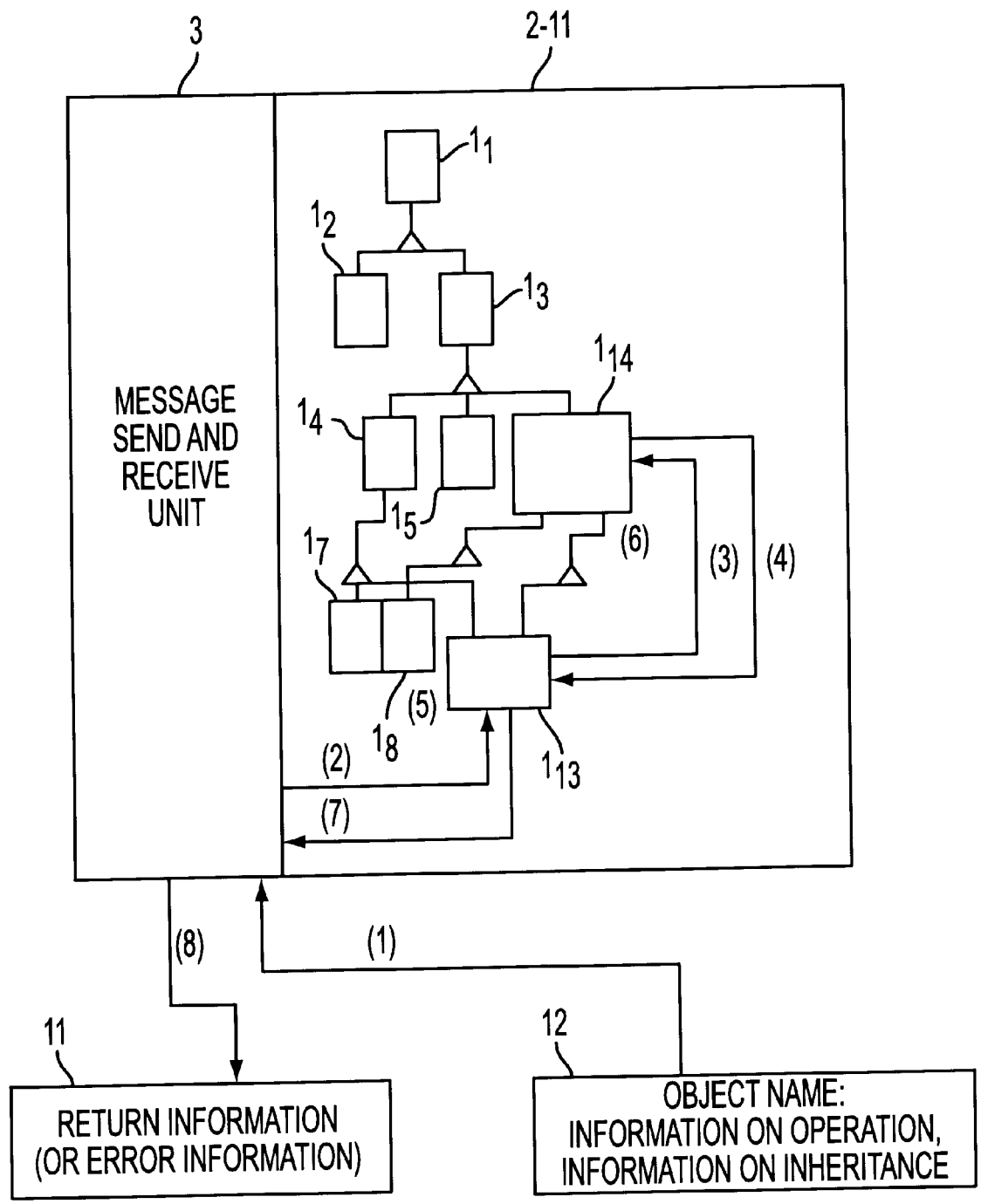
FIG. 19 is diagram illustrating the thirteenth embodiment of the present invention.

Thirteenth Embodiment (FIG. 19)

FIG. 19 is diagram illustrating the thirteenth embodiment of the present invention. The thirteenth embodiment corresponds to the construction of FIG. 7. The construction of the thirteenth embodiment is different from the sixth embodiments of FIG. 13, in that objects (which are to be) in a pair of parent and child classes in the construction of the thirteenth embodiment further comprises the correspondence confirming units 401-2 and 401-3, as indicated in FIG. 7.

As explained with reference to FIG. 7, according to the provision of the correspondence confirming units 401-2 and 401-3 in the objects (which are to be) in a pair of parent and child classes in the construction of FIG. 19, when one of these objects receives inheritance coupling information, (i.e., when the object $1_{13}$ receives the inheritance coupling information for parent class(es) of the class of the object $1_{13}$, or when the object $1_{14}$ receives the inheritance coupling information for the child class(es) of the class of the object $1_{14}$), operations are carried out for confirming that no contradiction occurs between the inheritance coupling information for parent class(es) of the class of the object $1_{13}$ held in the object $1_{13}$ and the inheritance coupling information for the child class(es) of the class of the object $1_{14}$ held in the object $1_{14}$, by setting the received inheritance coupling information in the object which receives the inheritance coupling information. These operations can be performed by communication between the correspondence confirming units 401-2 and 401-3 in the objects $1_{13}$ and $1_{14}$.

When no contradiction is confirmed, the function of the information setting unit, which is defined in the object which receives the inheritance coupling information, sets the inheritance coupling information contained in the request 13, in the objects $1_{13}$ and $1_{14}$, respectively. When the operation of the function of the information setting unit is completed, the object may return a message to the origin of the message which contains the inheritance coupling information (step (3)). When the correspondence confirming units 401-2 and 401-3 determine that at least one contradiction occurs by setting the above inheritance coupling information in the object, one of the correspondence confirming units 401-2 and 401-3 in the object which receives the inheritance coupling information, returns an error message to the origin of the message containing the inheritance coupling information.

The other operations in the thirteenth embodiment are the same as the operations in the embodiment of the sixth embodiments of FIG. 13. Apparently, the above provision can be applied to the ninth embodiment of FIG. 16.

The above operations for confirming the correspondence between the inheritance coupling information for parent class(es) of the class of the object $1_{13}$ held in the object $1_{13}$ and the inheritance coupling information for the child class (es) of the class of the object $1_{14}$ held in the object $1_{14}$, may be replaced with operations for confirming the correspondence between the inheritance coupling information for parent class(es) of the class of the object $1_{13}$ held in the pointer table as indicated in FIGS. 11, 12, 14, and 15 (corresponding to the inheritance coupling information indicating unit 300-3 in FIG. 5) and the inheritance coupling information for the child class(es) of the class of the object $1_{14}$ held in the pointer table, when at least a portion of the inheritance coupling information is held outside the objects $1_{13}$ and $1_{14}$.

Figure 20:
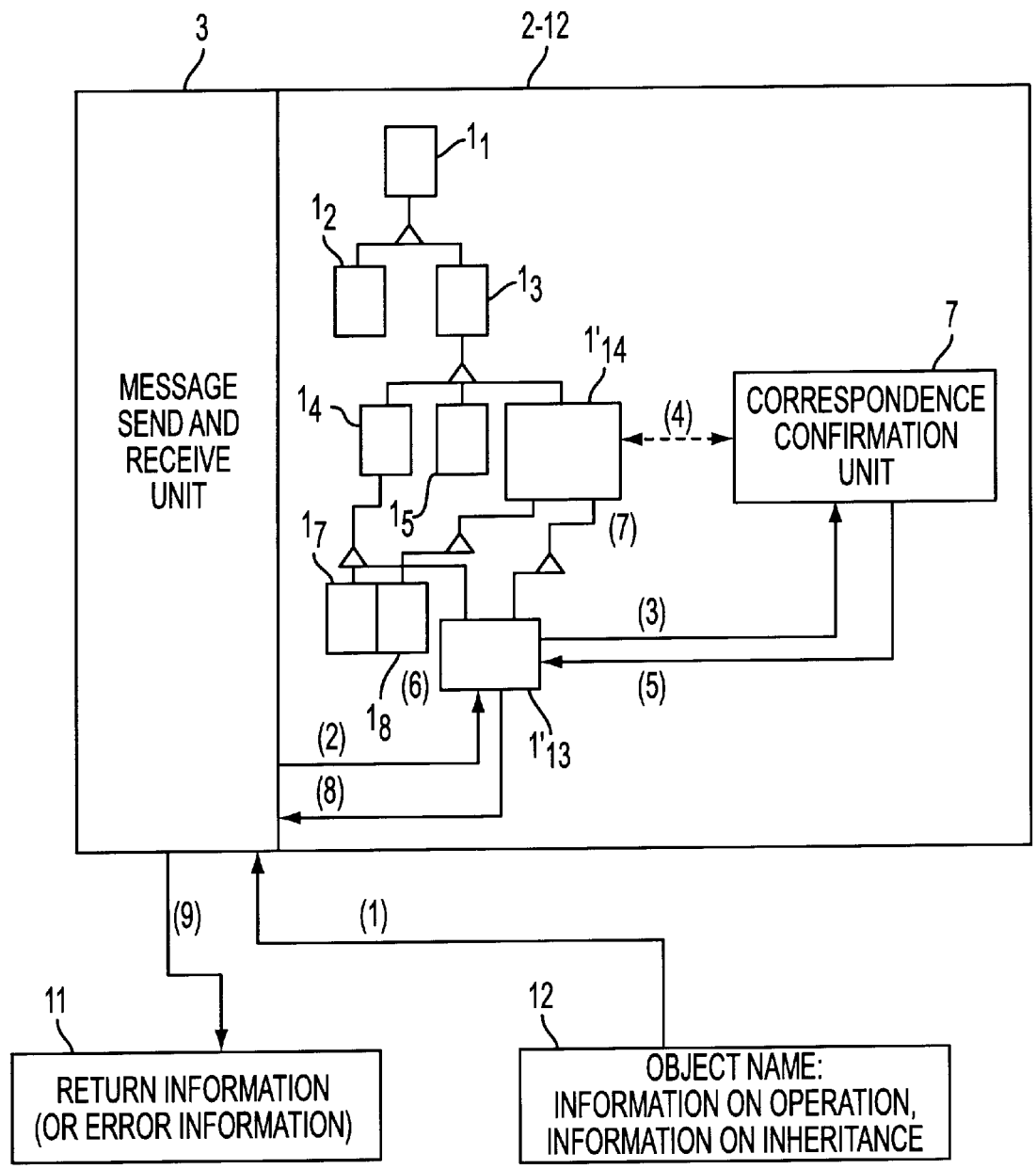
FIG. 20 is diagram illustrating the fourteenth embodiment of the present invention.

Fourteenth Embodiment (FIG. 20)

FIG. 20 is diagram illustrating the fourteenth embodiment of the present invention. In the construction of FIG. 20, the function of the confirmation in the above operations in the thirteenth embodiment is commonly provided for all of the objects $1_1, 1_2, \ldots 1_8, 1_{11}{'}$, and $1_{14}{'}$ in the set 2-12. in the construction of FIG. 20, when one of these objects receives inheritance coupling information, (i.e., when the object $1_{13}{'}$ receives the inheritance coupling information for parent class(es) of the class of the object $1_{13}{'}$, or when the object $1_{14}{'}$ receives the inheritance coupling information for the child class(es) of the class of the object $1_{14}{'}$), operations are carried out for confirming that no contradiction occurs between the inheritance coupling information for parent class(es) of the class of the object $1_{13}{'}$ held in the object $1_{13}{'}$ and the inheritance coupling information for the child class (es) of the class of the object $1_{14}{'}$ held in the object $1_{14}{'}$, by setting the received inheritance coupling information in the object which receives the inheritance coupling information. These operations can be performed by communication between the correspondence confirming unit 401-2 in the object $1_{14}{'}$ and the common correspondence confirmation unit 7, and communication between the common correspondence confirmation unit 7 and the correspondence confirming unit 401-3 in the object $1_{13}{'}$, and the confirmation by the common correspondence confirmation unit 7. Namely, the common correspondence confirmation unit 7 receives the above inheritance coupling information for parent class(es) of the class of the object $1_{13}{'}$ held in the object $1_{13}{'}$ and the inheritance coupling information for the child class(es) of the class of the object $1_{14}{'}$ held in the object $1_{14}{'}$, and determines the correspondence between them (steps (3), (4), and (5)).

When no contradiction is confirmed, the function of the information setting unit, which is defined in the object which receives the inheritance coupling information, sets the inheritance coupling information contained in the request 13, in the objects $1_{13}{'}$ and $1_{14}{'}$, respectively, when the common correspondence confirmation unit 7 determines that at least one contradiction occurs by setting the above inheritance coupling information in the object, the common correspondence confirmation unit 7 returns an error message through one of the correspondence confirming units 401-2 and 401-3 in the object which receives the inheritance coupling information, to the origin of the message containing the inheritance coupling information.

The other operations in the thirteenth embodiment are the same as the operations in the embodiment of the sixth embodiments of FIG. 13. Apparently, the above provision can be applied to the ninth embodiment of FIG. 16.

Figure 21:
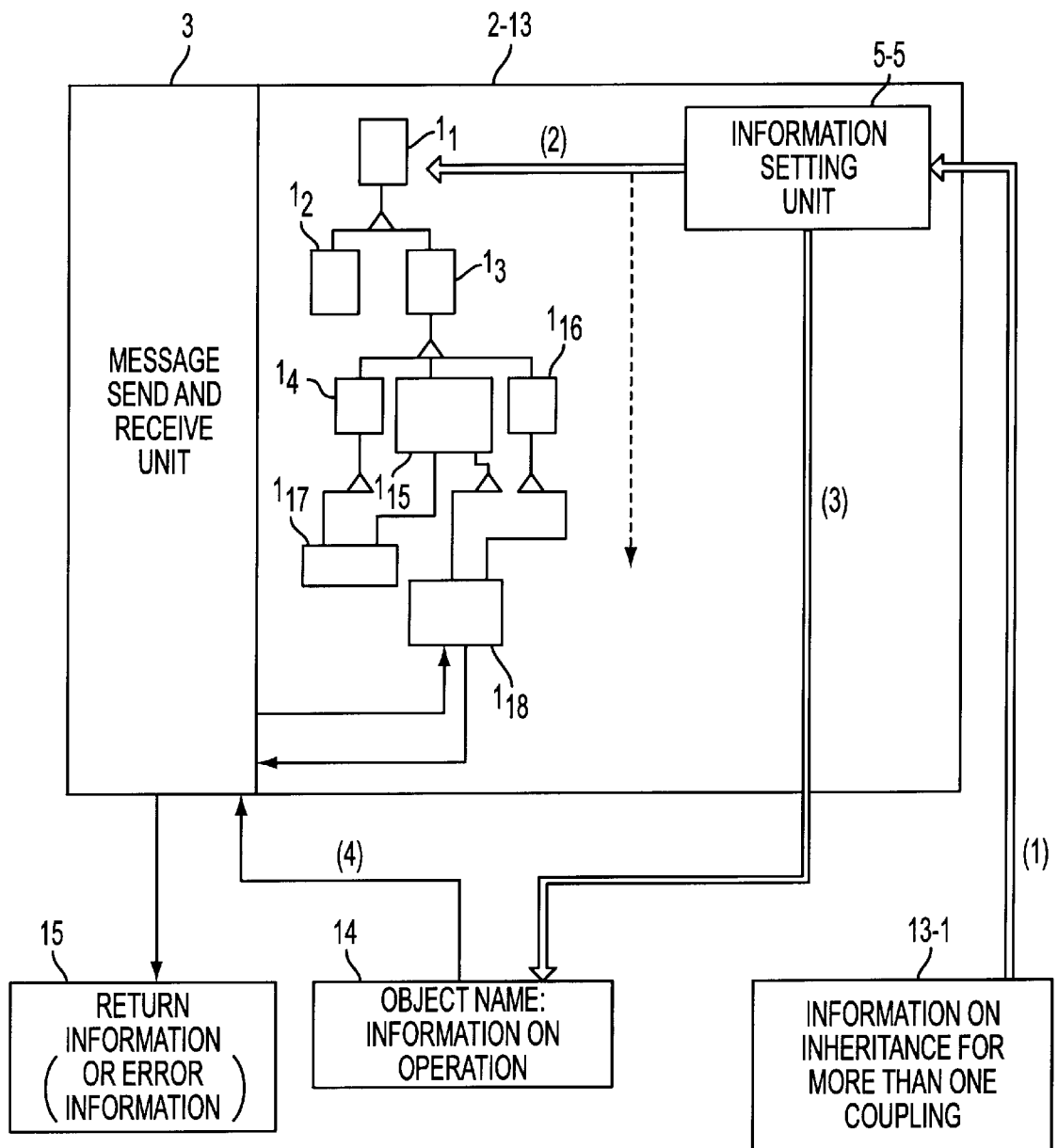
FIG. 21 is diagram illustrating the fifteenth embodiment of the present invention.

Fifteenth Embodiment (FIG. 21)

FIG. 21 is diagram illustrating the fifteenth embodiment of the present invention. The embodiment of FIG. 21, is useful, in particular, in the case wherein the information setting unit 5-5 receives inheritance coupling information for more than one inheritance coupling by a request 13-1. The construction indicated in FIG. 21 is a variation of the construction of FIG. 10.

The request 13-1 may contain inheritance coupling information for more than one inheritance coupling. When the information setting unit 5-5 receives the request 13-1, the information setting unit 5-5 scans the set of the objects in an inheritance hierarchy from the highest level to the lowest level one object by one object, along the inheritance relationships. When the scanned location reaches one of the inheritance couplings of which the information setting unit 5-5 receives the inheritance coupling information by the request, the information setting unit 5-5 sets the inheritance coupling information in the objects. Thus, the inheritance coupling information for all of the inheritance couplings can be set in the corresponding objects, respectively.

Alternatively, the above operations can be modified to be applicable to the constructions of FIGS. 8 and 9. In the construction in which all of the inheritance coupling information is held in the pointer table 4, which is provided outside of the objects, as in the construction of FIG. 8, the above scanning and setting operations can be performed on the contents of the pointer table 4. Similarly, in the construction in which the coupled class information is held in each object, and the pointers are held in the pointer table 4-1, which is provided outside of the objects as in the construction of FIG. 9, the above scanning and setting operations cam be performed on both the coupled class information in each object and the contents of the pointer table 4-1.

Figure 22:
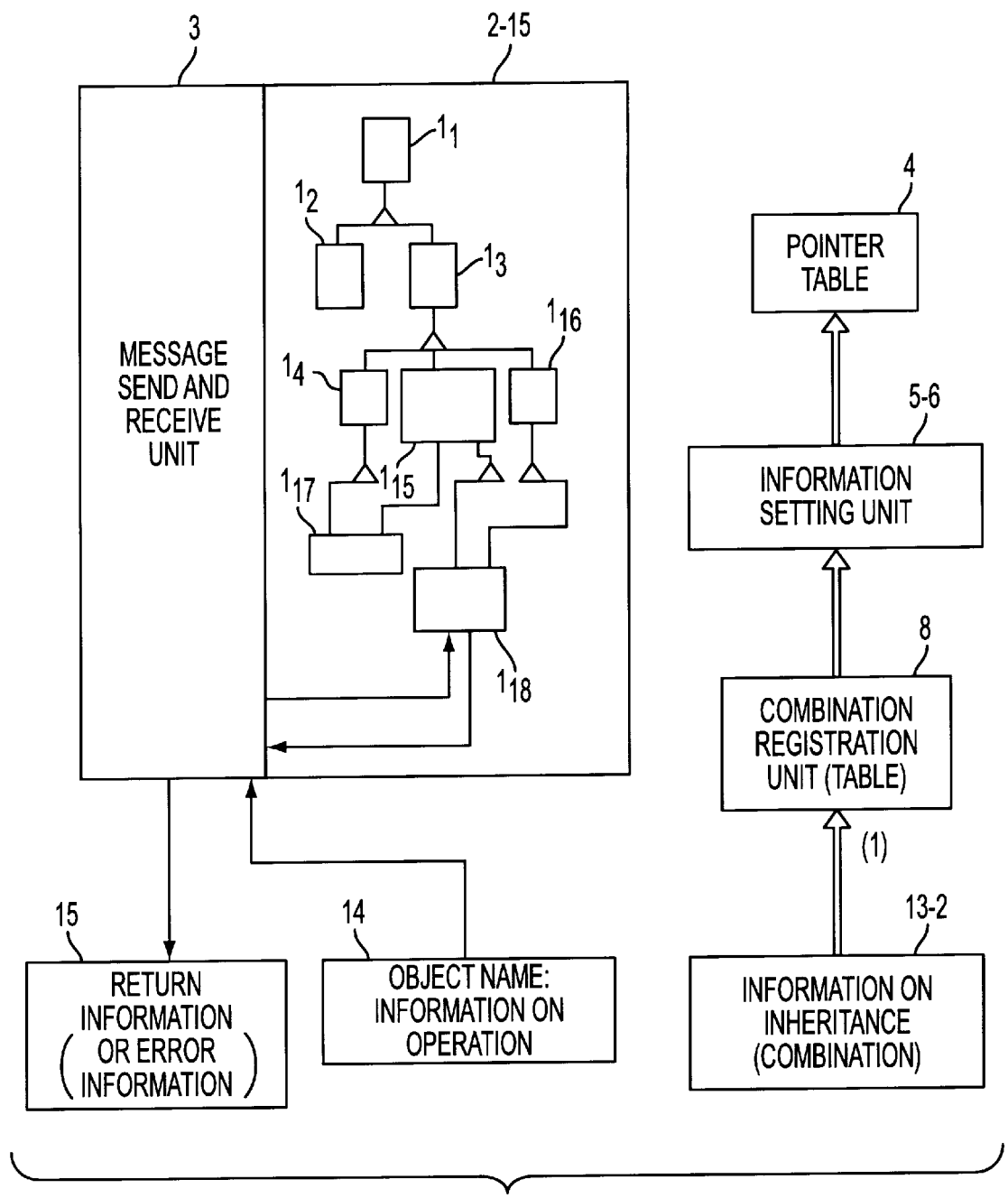
FIG. 22 is diagram illustrating the sixteenth embodiment of the present invention.

Sixteenth Embodiment (FIG. 22)

FIG. 22 is diagram illustrating the sixteenth embodiment of the present invention. The embodiment of FIG. 22, is also useful in the case wherein the information setting unit 5-5 receives inheritance coupling information for more than one inheritance coupling by a request 13-2. The construction indicated in FIG. 22 is also a variation of the construction of FIG. 8.

In the construction of FIG. 22, a combination registration unit 8 is provided in the preceding stage of the information setting unit 5-6. In the combination registration unit 8, a plurality of sets of inheritance coupling information are registered in advance for a plurality of combinations of inheritance couplings so that a set of inheritance coupling information for each combination can be read by inputting a key or code information corresponding to the combination. For example, the combination registration unit 8 may be in the form of a table. Therefore, the request 13-2 can contain only the code to instruct any one of the plurality of sets of the inheritance coupling information. When the combination registration unit 8 receives the code from the request, the combination registration unit 8 outputs one of the plurality of sets of the inheritance coupling information corresponding to the code contained in the request, to the information setting unit 5-6. Thus, the information setting unit 5-6 can set the set of inheritance coupling information in the corresponding entries in the pointer table 4.

Figure 23:
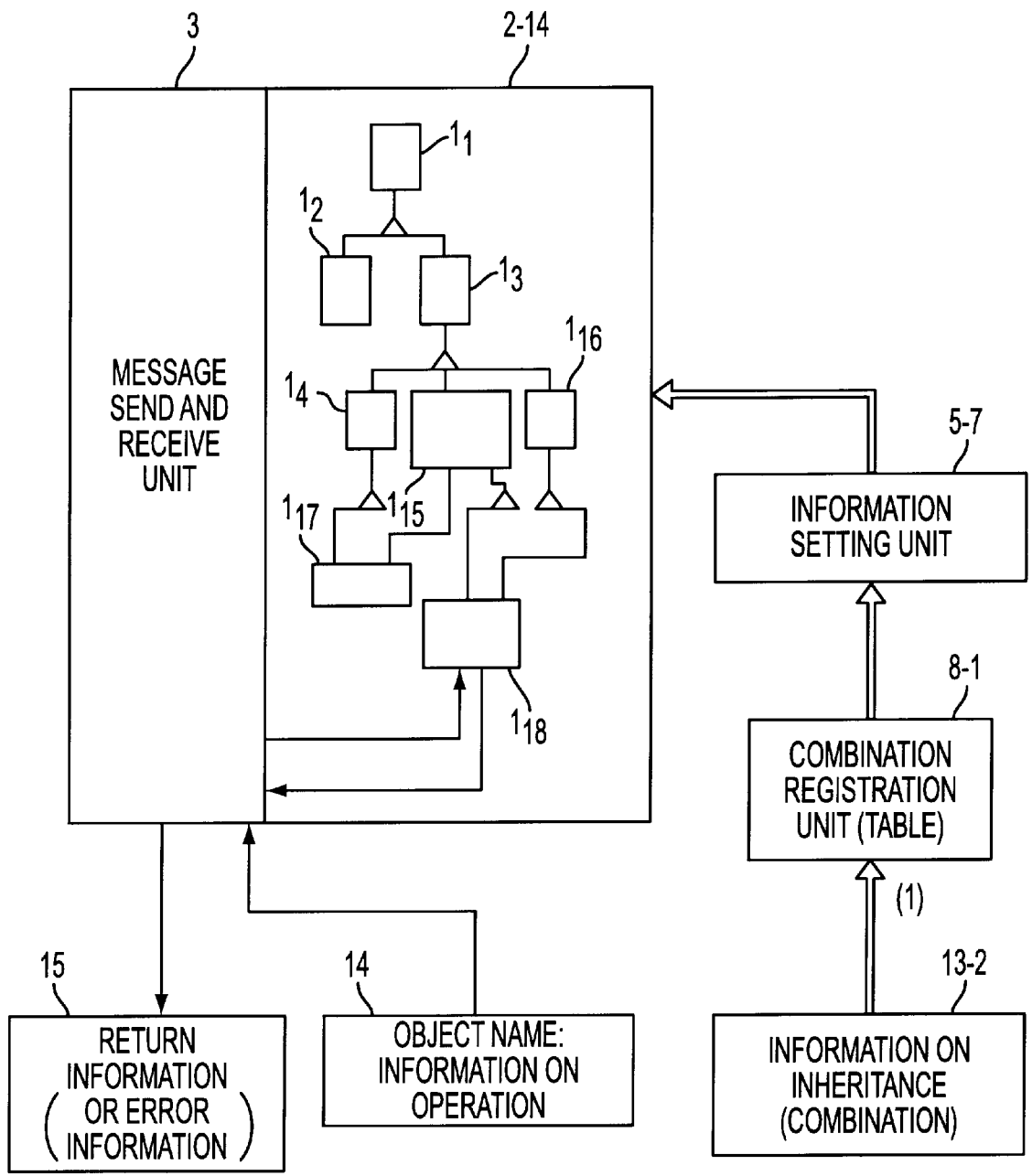
FIG. 23 is diagram illustrating the seventeenth embodiment of the present invention.

Seventeenth Embodiment (FIG. 23)

FIG. 23 is diagram illustrating the seventeenth embodiment of the present invention. In the embodiment of FIG. 23, the above operations of FIG. 22 are applied to the constructions of FIG. 10. In the construction in which all of the inheritance coupling information is hold in the respective objects, as in the construction of FIG. 10, the above setting operations by the information setting unit 5-6 in the corresponding entries in the pointer table 4, are replaced with information setting operations by the information setting unit 5-7 in FIG. 23 in the corresponding objects.

Similarly, although not shown, in the construction in which the coupled class information is held in each object, and the pointers are held in the pointer table 4-1, which is provided outside of the objects as in the construction of FIG. 9, the above setting operation can be performed on both the coupled class information in the corresponding objects and the contents of the pointer table 4-1.

Figure 24:
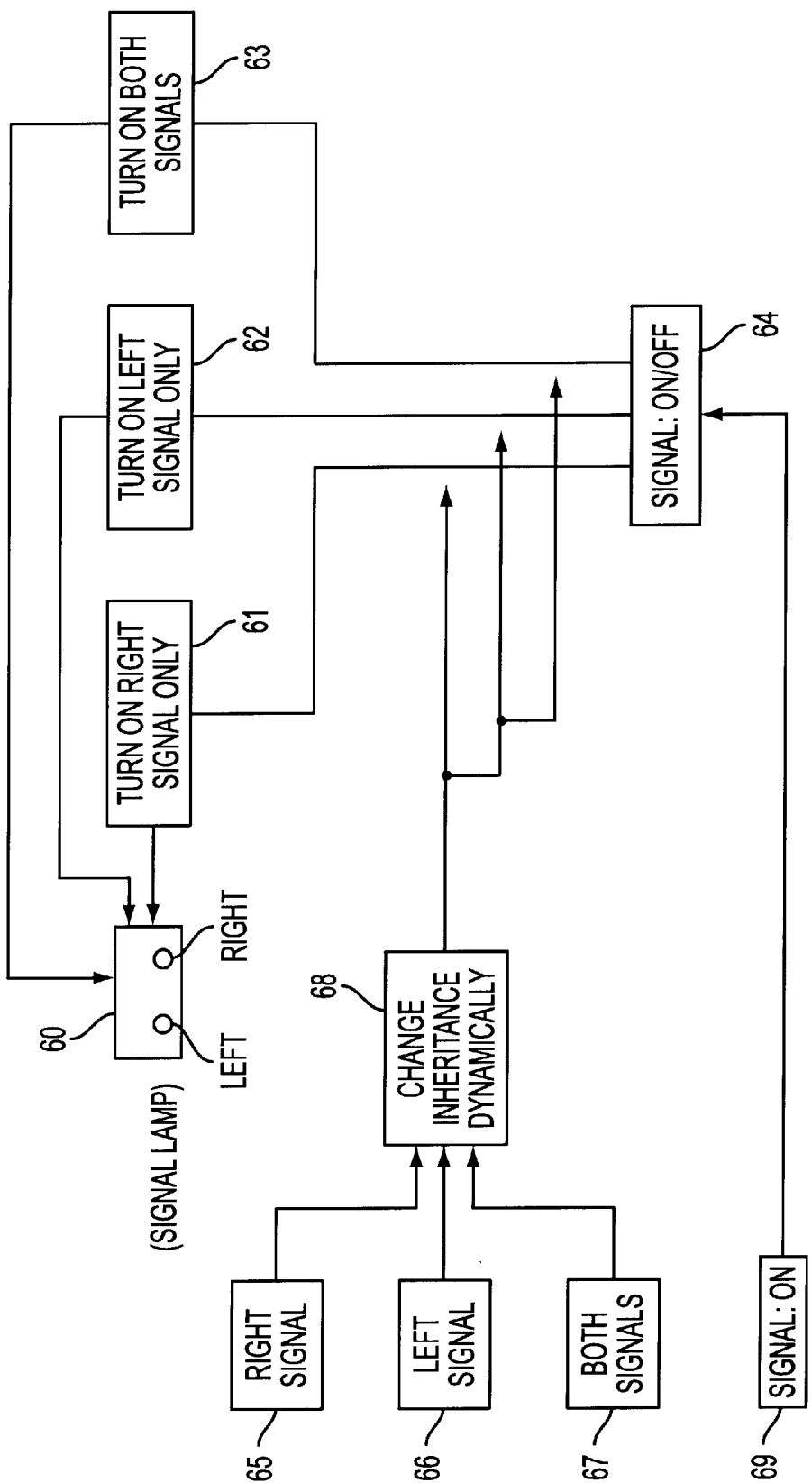
FIG. 24 is a diagram illustrating the construction of an example of an object-oriented system to which the various aspects of the present invention are applied.

Example of an Object-Oriented System (FIG. 24)

FIG. 24 is a diagram illustrating the construction of an example of an object-oriented system to which the various aspects of the present invention are applied. In the example of FIG. 24, reference numeral 60 denotes a signal lamp which comprises right and left signals, 61 denotes an object in which a function of lighting the right signal only is defined, 62 denotes an object in which a function of lighting the left signal only is defined, 63 denotes an object in which a function of lighting both the right and left signals is defined, 64 denotes an object in which a function of generally turning on or off one or more signal, 65 denotes an instruction of lighting the right signal, 66 denotes an instruction of lighting the left signal, 67 denotes an instruction of lighting both the right and left signals, 68 denotes a unit for changing inheritance relationships between the "signal" object 64 and the three objects 61, 62, and 63, and 69 denotes an instruction of generally turning on or off a signal. Hereinafter, each object as an instance of a class is regarded in the same light as the class, for simplicity of explanations.

The unit 68 can establish an inheritance coupling between the "signal" object 64 and one of the three objects 61, 62, and 63 in response to reception of one of the instructions 65, 66, and 67, respectively. When the inheritance coupling is established between the "signal" object 64 and a specific one of the three objects 65, 66, and 67, the function (attribute or feature) of the specific one of the objects 65, 66, and 67 can be performed by sending a request for execution of the function to the "signal" object 64. Therefore, the attribute which the "signal" object 64 inherits can be changed by changing the instruction supplied to the unit 68.

Figure 25:
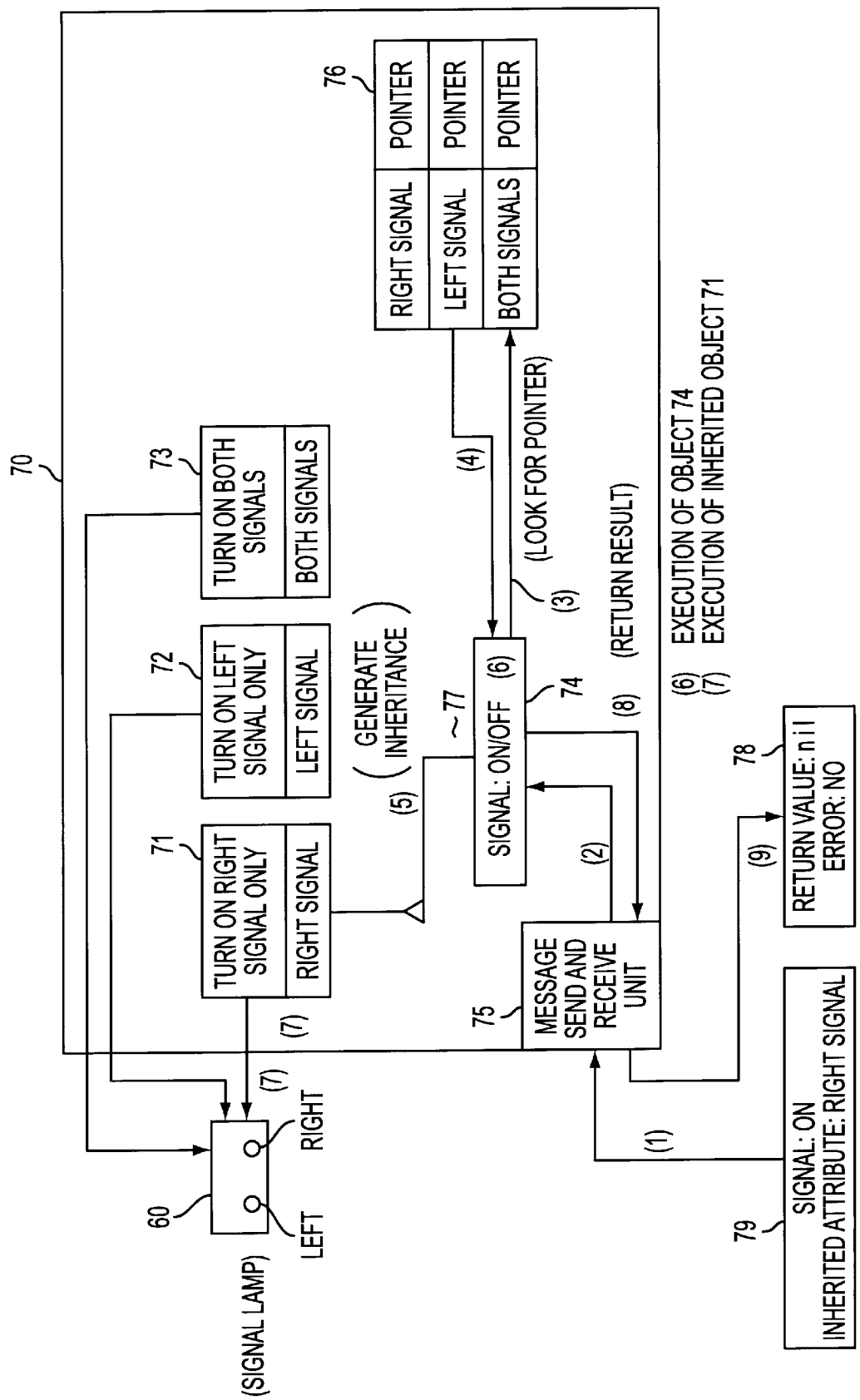
FIG. 25 is diagram illustrating the eighteenth embodiment of the present invention.

Eighteenth Embodiment (FIG. 25)

FIG. 25 is diagram illustrating the eighteenth embodiment of the present invention. In FIG. 25, reference numeral 60 denotes the same signal lamp as that in FIG. 24, 71 denotes an object in which a function of lighting the right signal only is defined, 72 denotes an object in which a function of lighting the left signal only is defined, 73 denotes an object in which a function of lighting both the right and left signals is defined, 74 denotes an object in which a function of generally turning on or off one or more signal, 75 denotes a message send and receive unit, 76 denotes a pointer table, 77 denotes an inheritance coupling between the "signal" object 74 and the "right signal" object 71, 78 denotes a return message, and 79 denotes a message for requesting for an execution of a function.

The message 79 contains an object name, "signal", a function, "ON" of turning on a signal, and information on an attribute to be inherited, "right signal". The message 79 is sent to the "signal" object 74 through the message send and receive unit 75 (steps (1) and (2)). When the "signal" object 74 receives the message 79, the object 74 refers to the pointer in the entry for the "right signal" in the pointer table 76 based on the information on the attribute, "right signal" in the message 79 (steps (3) and (4)). Then, the "signal" object 74 can look up the "right signal" object 71 based on the above pointer. Namely, an inheritance coupling is established between the "signal" object 74 and the "right signal" object 71 (steps (5)). Then, the object 74 executes the function requested by the message 79 (step (6)). When executing the function, the object 74 looks up the "right signal" object 71 with regard to which signal to be lighted, through the established inheritance coupling. Thus, the execution of the function is delegated to the "right signal" object 71, and the "right signal" object 71 lights the right signal only in the signal lamp 60 (steps (7)). When the function is completed, the object 74 returns a return message 78 containing the result of the execution of the function through the message send and receive unit 75 to the origin of the message 79. In this example, the return value "nil" indicates the completion of the function.

Figure 26:
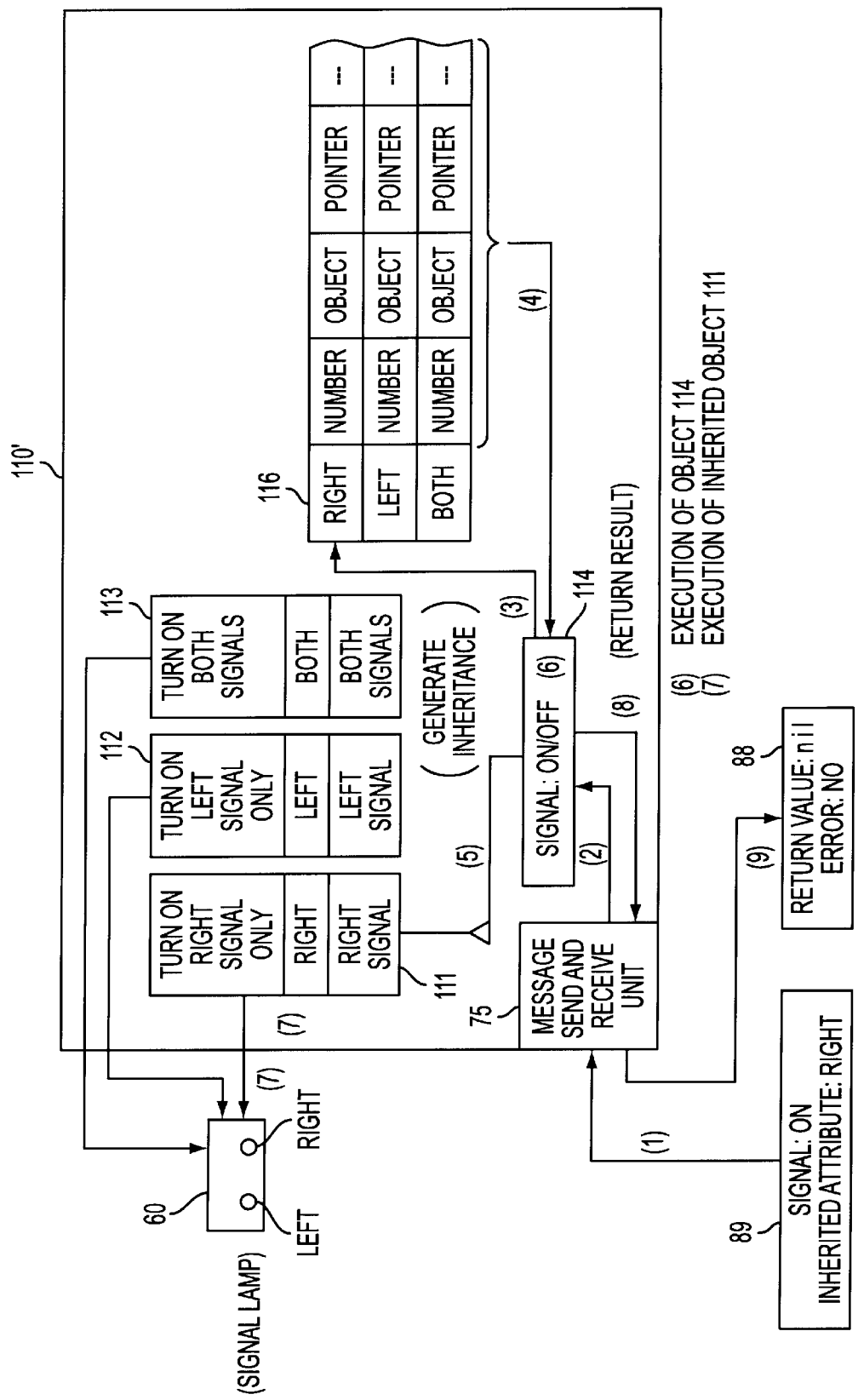
FIG. 26 is diagram illustrating the nineteenth embodiment of the present invention.

Nineteenth Embodiment (FIG. 26)

FIG. 26 is diagram illustrating the nineteenth embodiment of the present invention. In the construction of FIG. 26, the pointer table 116 has three series of entries respectively corresponding to the attributes, "right", "left", and "both", and generally each series of entries can contain a series of pointers successively establishing inheritance couplings leading to a series of objects from the "signal" object 114.

The message 89 can contain one of the three attributes, "right", "left", and "both", as an attribute to be inherited. In the example indicated in FIG. 26, the message 89 contains the object name, "signal", the function "ON" and the attribute "right". When this message 89 is sent to the "signal" object 114 through the message send and receive unit 75, the "signal" object 114 refers to the pointer(s) in the series of the attribute "right" in the table 116 (steps (3) and (4)). By obtaining the series of pointer(s) from the series of entries corresponding to the attribute "right", the "signal" object 114 can look up functions defined in the series of objects having the attribute "right". In the example of FIG. 26, there is only one object, "right signal", "left signal", or "both signals" on each series. Therefore, the "signal" object 114 is coupled to only one of the objects 111, 112, and 113 with an inheritance relationship based on the pointer obtained from the table 116. The other operations in the construction FIG. 26 are the same as those in the construction of FIG. 25.

Figure 27:
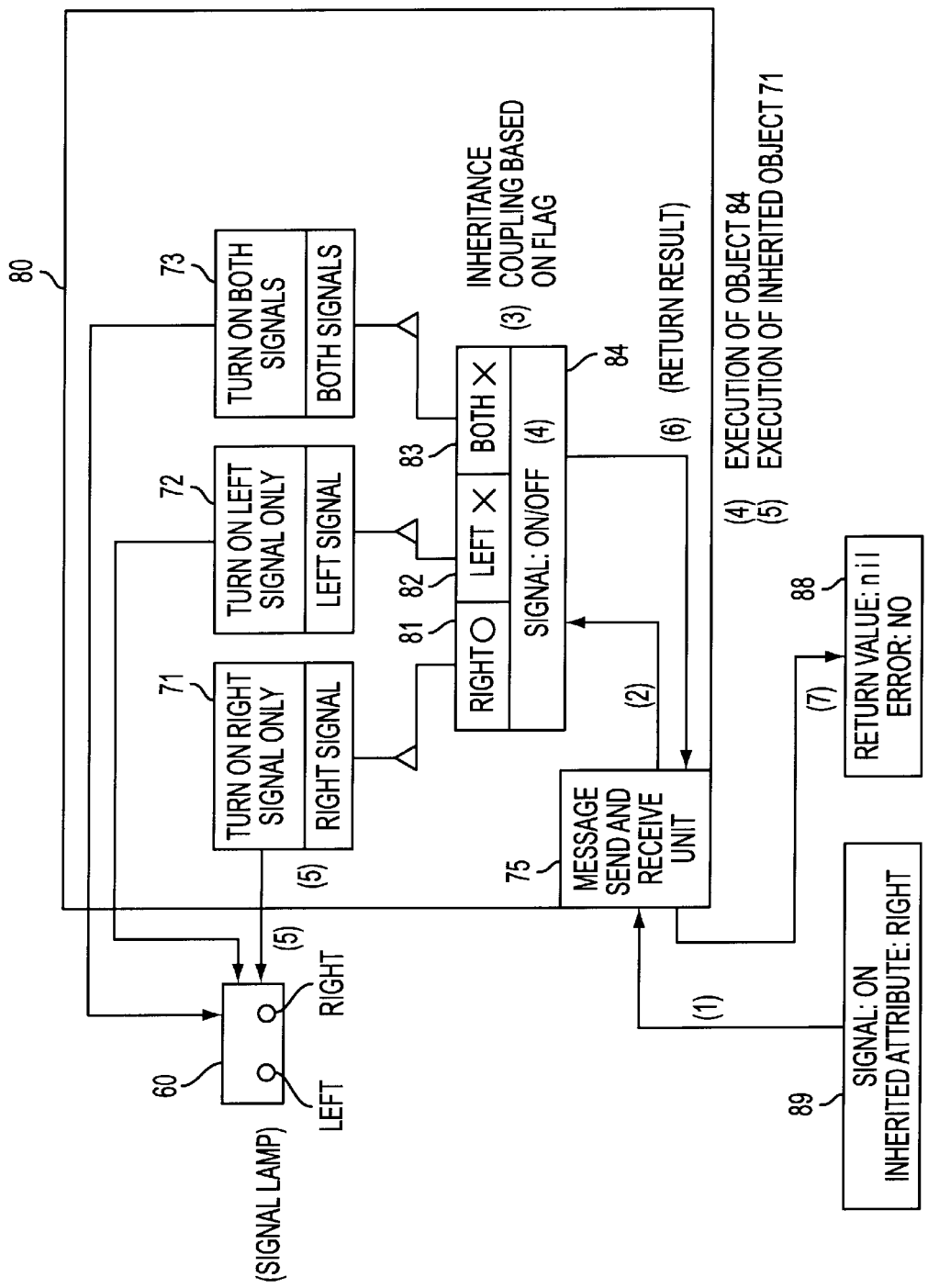
FIG. 27 is diagram illustrating the twentieth embodiment of the present invention.

Twentieth Embodiment (FIG. 27)

FIG. 27 is diagram illustrating the twentieth embodiment of the present invention. In the construction of FIG. 27, the "signal" object 84 has all of the pointers to the three objects 71, 72, and 73, and also has flag areas 81, 82, and 83, corresponding to the three objects 71, 72, and 73. The object 84 recognizes that an inheritance coupling is established to one of the three objects 71, 72, and 73 when the flag corresponding to the object is ON (indicated by a circle O).

The message 89 can contain one of the three attributes, "right", "left", and "both", as an attribute to be inherited. In the example indicated in FIG. 27, the message 89 contains the object name, "signal", the function "ON" and the attribute "right". When this message 89 is sent to the "signal" object 84 through the message send and receive unit 75, the "signal" object 84 sets the flag 81 corresponding to the attribute "right" in the message 89. Thus, an inheritance coupling is established between the "signal" object 84 to the "right signal" object 71. The other operations in the construction FIG. 27 are the same as those in the constructions of FIGS. 25 and 26.

Figure 28:
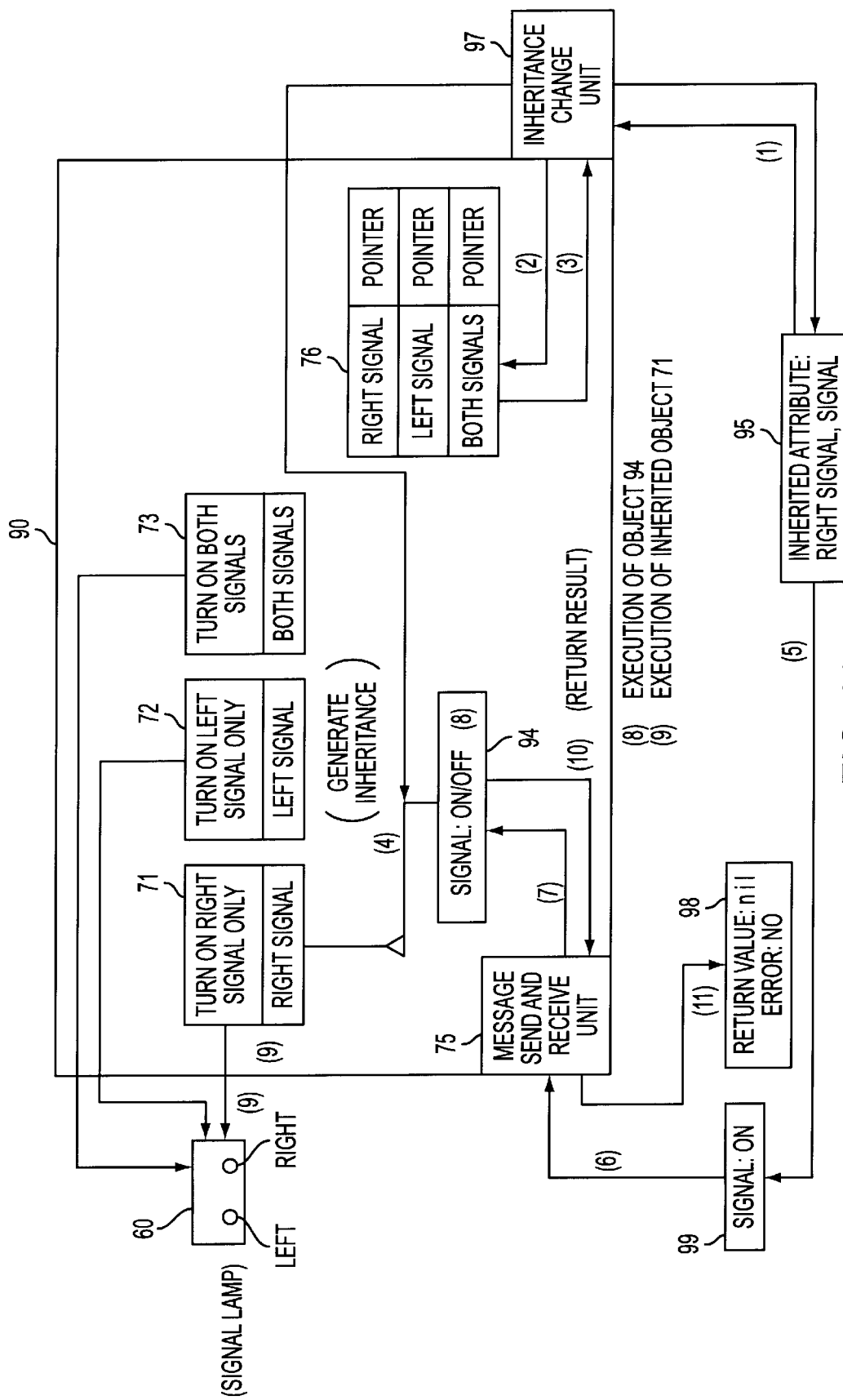
FIG. 28 is diagram illustrating the twenty-first embodiment of the present invention.

Twenty-First Embodiment (FIG. 28)

FIG. 28 is diagram illustrating the twenty-first embodiment of the present invention. In FIG. 28, reference numeral 94 denotes a "signal" object, 95 denotes an instruction or a request for changing or setting an inheritance relationship between the "signal" object 94 and one of the three objects 71, 72, and 73, 97 denotes an inheritance change unit, 98 denotes a return message, and 99 denotes a message for requesting for an execution of a function of generally turning ON a signal.

First, the instruction 95, which contains attributes, "right signal" and "signal", as information on an attribute to be inherited, is supplied to the inheritance change unit 97. In response to the instruction 95, the inheritance change unit 97 refers to a pointer in the entry corresponding to the "right signal" in the table 76 (steps (2) and (3)), and sets the pointer in the "signal" object 94. Thus, an inheritance coupling is established between the "signal" object 94 and the "right signal" object 71 (steps (4)). When the completion of the establishment of the inheritance coupling is informed to a sender of the message 99 (steps (5)), the message 99 containing the object name "signal" and the function "ON, is sent to the "signal" object 94 through the message send and receive unit 75 (steps (6) and (7)). Since the inheritance coupling is already established between the objects 94 and 71, the "signal" object 94 can look up the function defined in the "right signal" object 71. The other operations in the construction FIG. 28 are the same as those in the constructions of FIGS. 25, 26, and 27.

In the above construction, the origin of the instruction 95 may send to the sender of the message 99 a signal indicating that the inheritance relationships are now changing.

Figure 29:
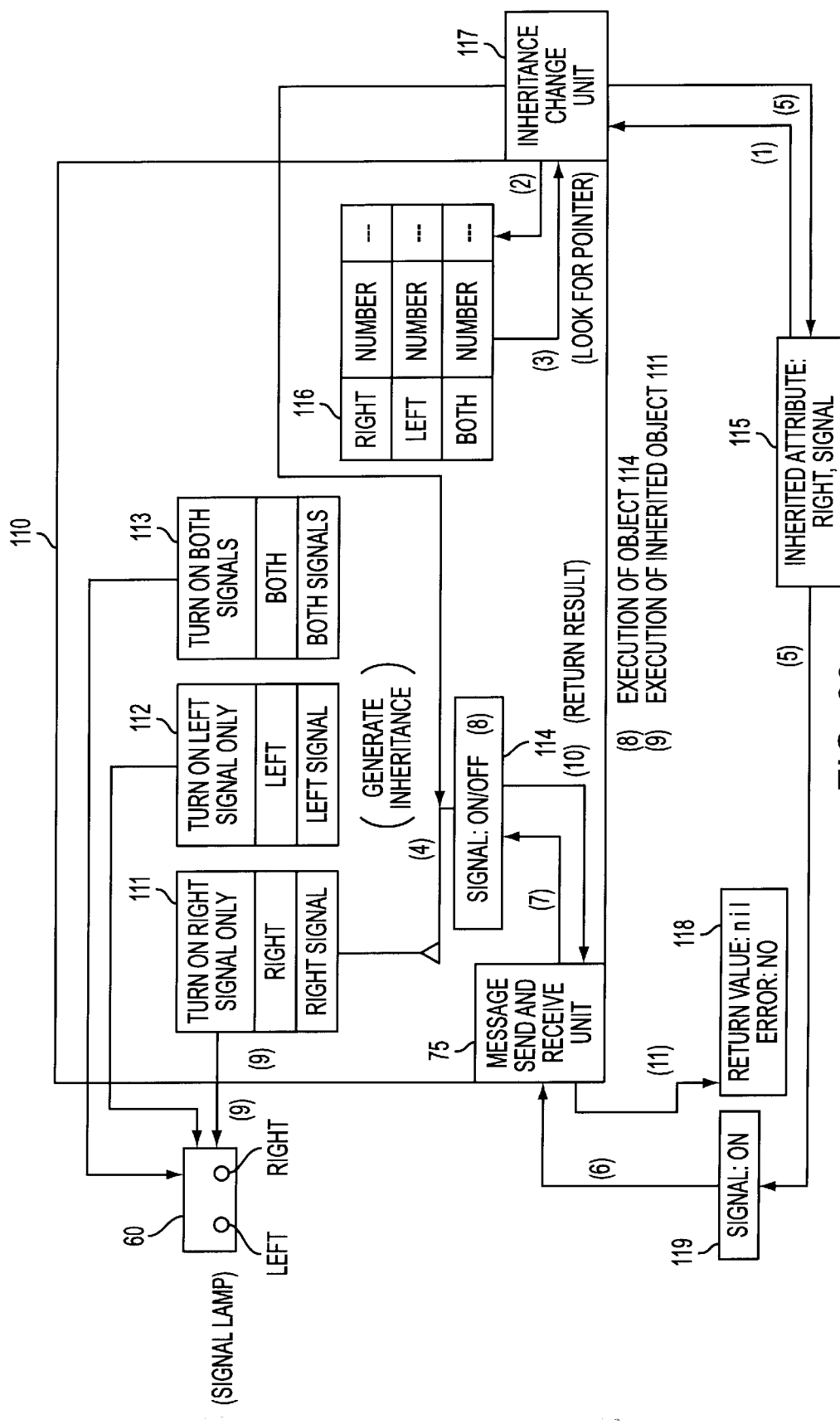
FIG. 29 is diagram illustrating the twenty-second embodiment of the present invention.

Twenty-Second Embodiment (FIG. 29)

FIG. 29 is diagram illustrating the twenty-second embodiment of the present invention. The construction of FIG. 29 comprises the same table 116 as in the construction of FIG. 26. The instruction 115 can generally instruct to select one of the three series of inheritance relationships from the "signal" object 114. In this example, the instruction 115 contains the attribute "right" and the object name "signal" to indicate the attribute to be inherited by the "signal" object 114. When the inheritance change unit 117 receives the instruction 115 (steps (1)), the inheritance change unit 117 refers to one of the series of pointer(a) (steps (2) and (3)) in the series of entries corresponding to the attribute wright" in the table 116 for changing or setting an inheritance relationship from the "signal" object 114. The inheritance change unit 117 sets the series of pointer(s) (only one pointer in this example) in the "signal" object 114. Thus, an inheritance coupling is established between the "signal" object 114 and the "right signal" object 111 (steps (4)). The other operations are the same as those in the construction of FIG. 28.

In the above construction, the origin of the instruction 115 may send to the sender of the message 119 a signal indicating that the inheritance relationships are now changing.

Figure 30:
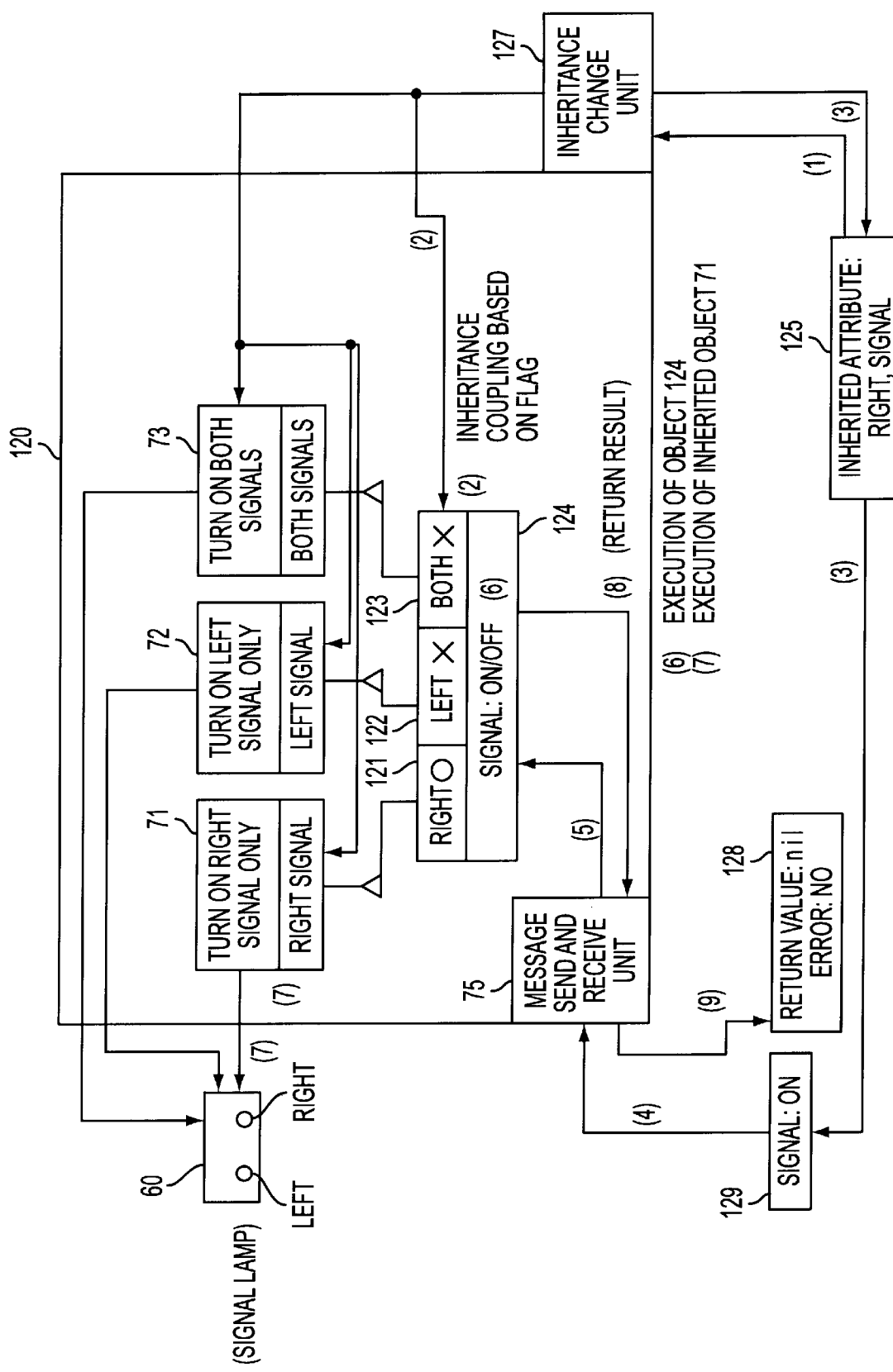
FIG. 30 is diagram illustrating the twenty-third embodiment of the present invention.

Twenty-Third Embodiment (FIG. 30)

FIG. 30 is diagram illustrating the twenty-third embodiment of the present invention. Similar to the "signal" object 84 in the construction of FIG. 27, the "signal" object 124 has all of the pointers to the three objects 71, 72, and 73, and also has flag areas 121, 122, and 123, corresponding to the three objects 71, 72, and 73. The object 124 recognizes that an inheritance coupling is established to one of the three objects 71, 72, and 73 when the flag corresponding to the object is ON (indicated by a circle 0).

In the construction of FIG. 30, the instruction 125, instead of the massage 89 in FIG. 27, contains one of the three attributes, "right", "left", and "both", as an attribute to be inherited. In the example indicated in FIG. 30, the instruction 125 contains the attribute "right" and the object name "signal". When this instruction 125 is sent to the inheritance change unit 127 (steps (1)), the inheritance change unit 127 sets the flag 121 corresponding to the attribute "right" in the instruction 125. Thus, an inheritance coupling is established between the "signal" object 124 to the "right signal" object 71. The other operations in the construction FIG. 30 are the same as those in the constructions of FIG. 27.

In the above construction, the origin of the instruction 125 may send to the sender of the message 129 a signal indicating that the inheritance relationships are now changing.

Figure 31:
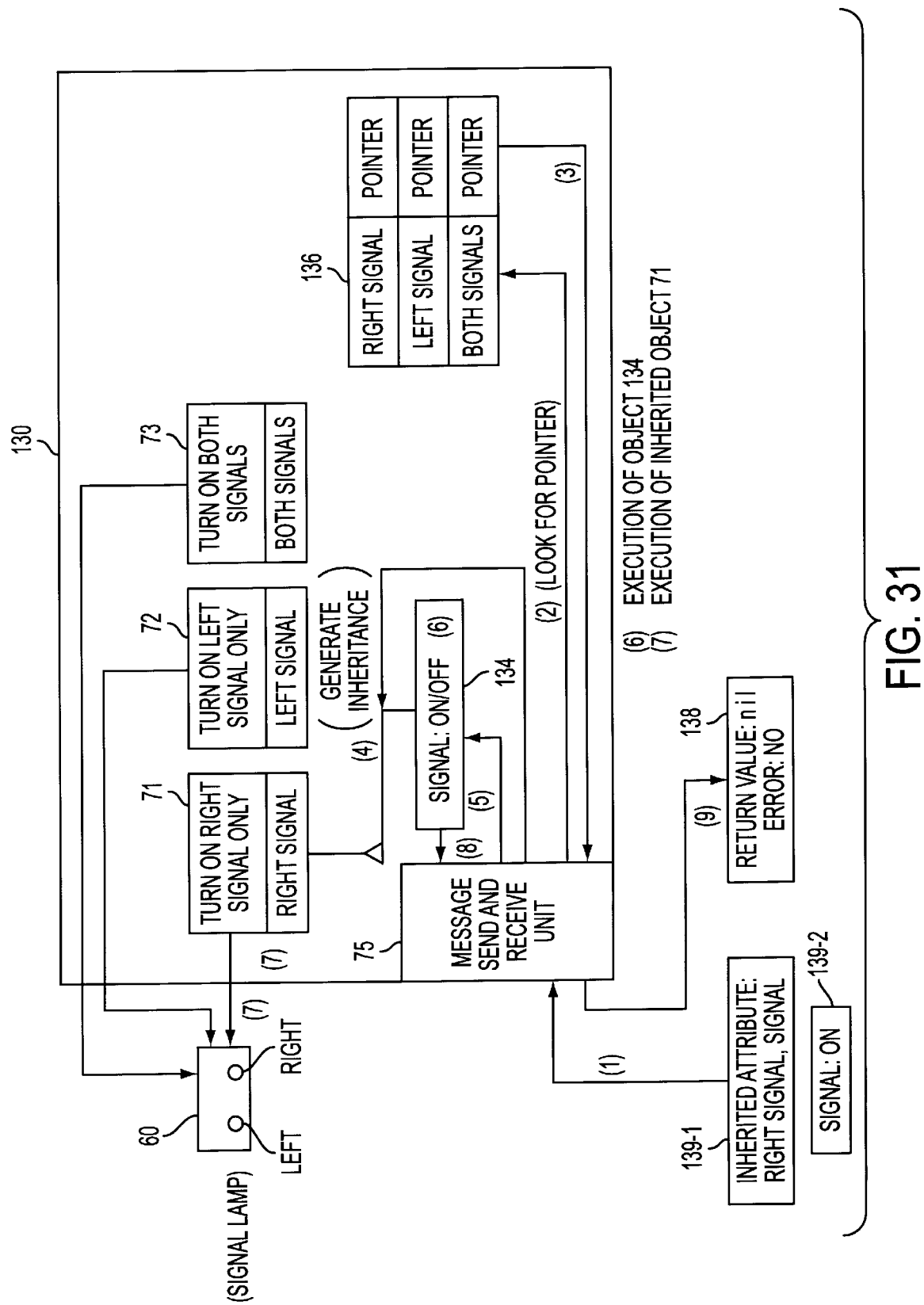
FIG. 31 is diagram illustrating the twenty-fourth embodiment of the present invention.

Twenty-Fourth Embodiment (FIG. 31)

FIG. 31 is diagram illustrating the twenty-fourth embodiment of the present invention. In the construction of FIG. 31, the first message 139-1 contains an instruction for setting or changing an inheritance relationship, and the second message 139-2 contains a request for an execution of a function. In this example, the first message 139-1 contains the attribute "right signal" and the object name "signal". This first message 139-1 is sent to the message send and receive unit 75-1. The message send and receive unit 75-1 in this embodiment contains substantially the same function as the inheritance change unit 97 in the construction of FIG. 28. Namely, this function of the message send and receive unit 75-1 refers to a pointer in the entry corresponding to the "right signal" in the table 136 (steps (2) and (3)), and sets the pointer in the "signal" object 134. Thus, an inheritance coupling is established between the "signal" object 134 and the "right signal" object 71 (steps (4)). After the inheritance coupling is established, the second message 139-2 is sent to the "signal", object 134 through the message send and receive unit 75-1. The second message 139-2 is substantially the same as the message 99 in FIG. 28, and the other operations are the same as those in the construction of FIG. 28. In the above construction of FIG. 28, the message send and receive unit 75-1 can hold the second message 139-2 until the inheritance coupling is established in response to the first message 139-1.

Figure 32:
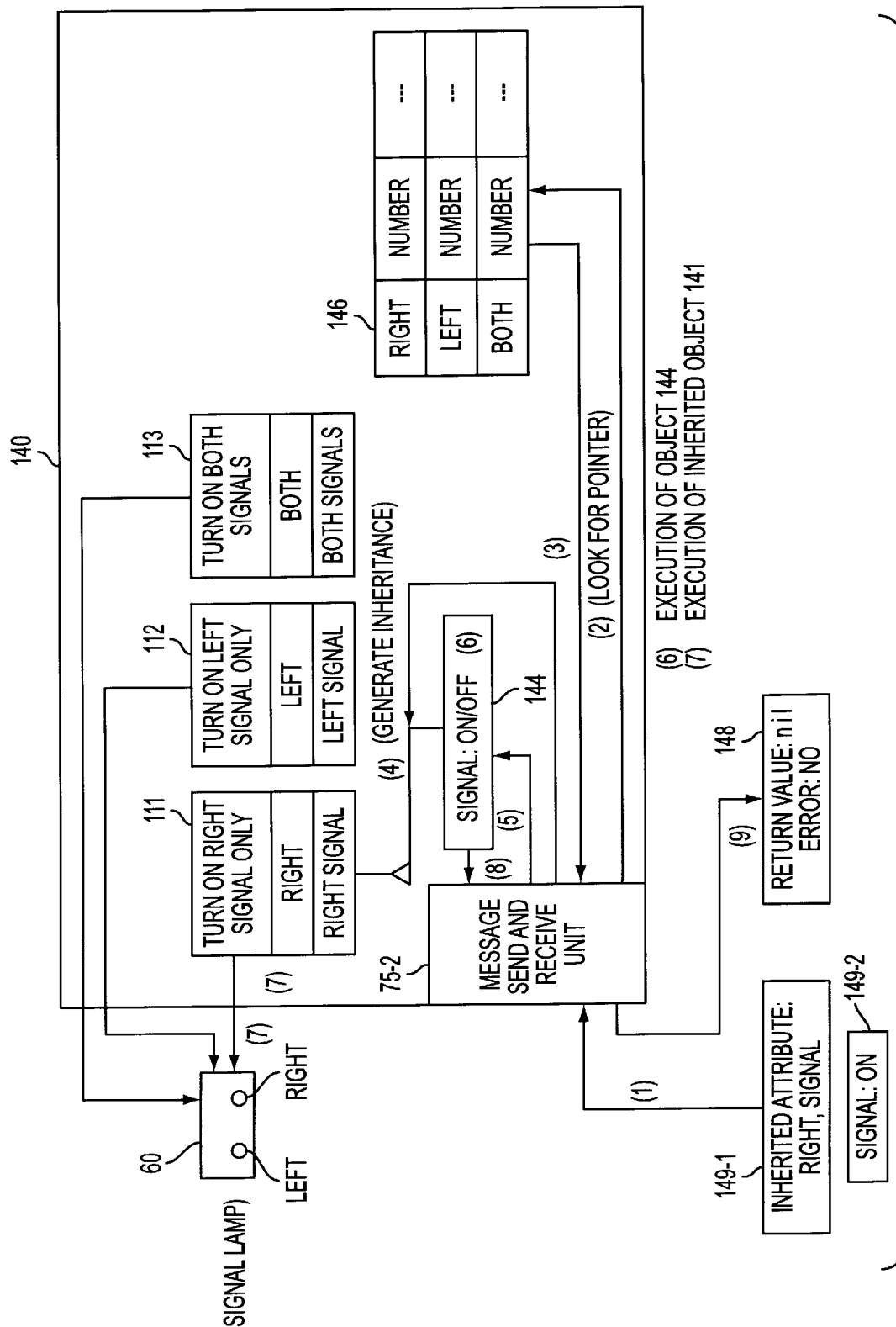
FIG. 32 is diagram illustrating the twenty-fifth embodiment of the present invention.

Twenty-Fifth Embodiment (FIG. 32)

FIG. 32 is diagram illustrating the twenty-fifth embodiment of the present invention. The table 146 in the construction of FIG. 32 is the same as the table 116 in the constructions of FIGS. 26 and 29. The first message 149-1 contains an instruction for selecting one of the three series of inheritance relationships from the "signal" object 144. In this example, the first message 149-1 contains the attribute "right" and the object name "signal" to indicate the attribute to be inherited by the "signal" object 144. The second message 149-2 contains a request for an execution of a function. The first message 149-1 is sent to the message send and receive unit 75-2. The message send and receive unit 75-2 in this embodiment contains substantially the same function as the inheritance change unit 117 in the construction of FIG. 29. This function in the message send and receive unit 75-2 refers to one of the series of pointer(s) (steps (2) and (3)) in the series of entries corresponding to the attribute "right" in the table 146 for changing or setting an inheritance relationship from the "uignalo object 144. The above function in the message send and receive unit 75-2 sets the series of pointer(s) (only one pointer in this example) in the "signal" object 144. Thus, an inheritance coupling is established between the "signal" object 144 and the "right signal" object 111 (steps (4)). The other operations are the same as those in the construction of FIG. 29.

Figure 33:
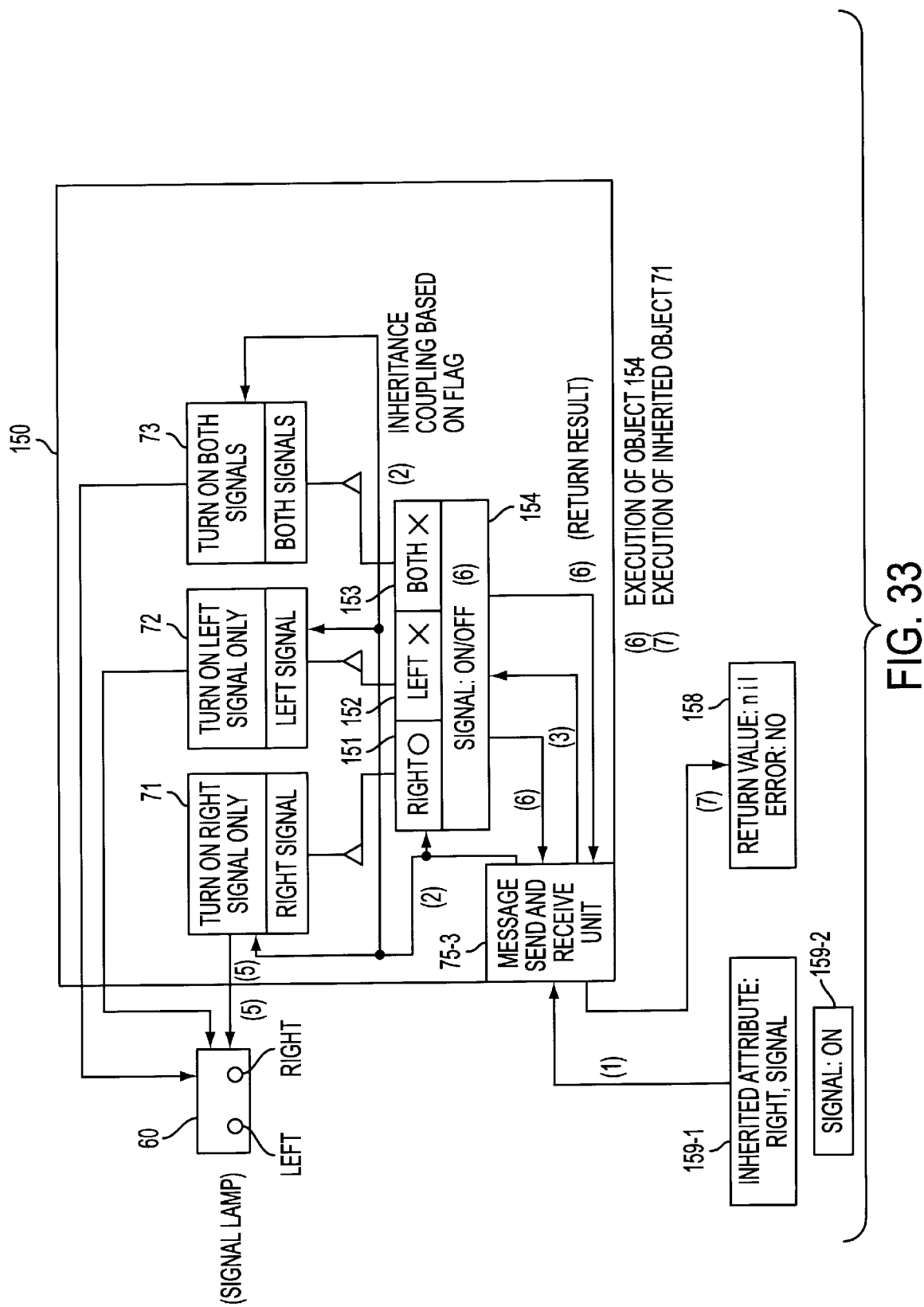
FIG. 33 is diagram illustrating the twenty-sixth embodiment of the present invention.

Twenty-Sixth Embodiment (FIG. 33)

FIG. 33 is diagram illustrating the twenty-sixth embodiment of the present invention. Similar to the "signal" object 124 in the construction of FIG. 30, the "signal" object 154 has all of the pointers to the three objects 71, 72, and 73, and also has flag areas 151, 152, and 153, corresponding to the three objects 71, 72, and 73. The object 154 recognizes that an inheritance coupling is established to one of the three objects 71, 72, and 73 when the flag corresponding to he object is ON (indicated by a circle O).

In the construction of FIG. 33, the first message 159-1 contains the attribute "right" and the object name "signal". The first message 159-1 is sent to the message send and receive unit 75-3. The message send and receive unit 75-3 in this embodiment contains substantially the same function as the inheritance change unit 127 in the construction of FIG. 30. This function in the message se nd and receive unit 75-3 sets the flag 151 corresponding to the attribute "right" in the first message 159-1. Thus, an inheritance coupling is established between the "signal" object 154 to the "right signal" object 71. The other operations in the construction FIG. 33 are the same as those in the constructions of FIG. 30.

Figure 34:
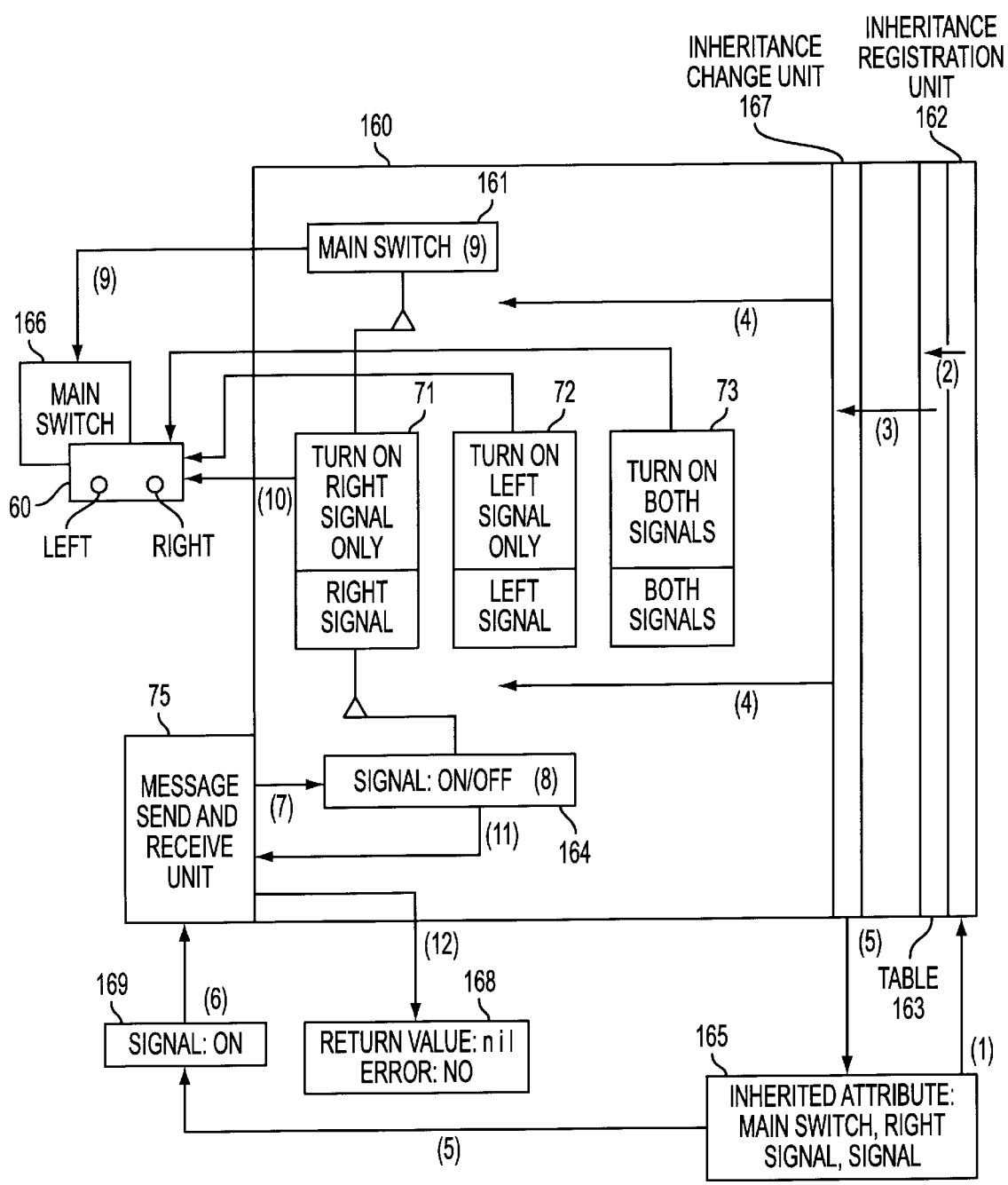
FIG. 34 is diagram illustrating the twenty-seventh embodiment of the present invention.

Twenty Embodiment (FIGS. 34,, 35,, and 361

FIG. 34 is diagram illustrating the twenty-seventh embodiment of the present invention. The construction of FIG. 34 is different from the construction of FIG. 28 In that the construction of FIG. 34 comprises a main switch 166, a "main switch" object 161 in which a function of turning on or of f the main switch 166 is defined, the inheritance registration unit 162, and the table 163 for holding inheritance coupling information for a plurality of inheritance couplings. The inheritance registration unit 162 receives an instruction 165 for establishing a set of one or more inheritance couplings, and sets flags in the table 163 according to the instruction 165.

Figure 35:
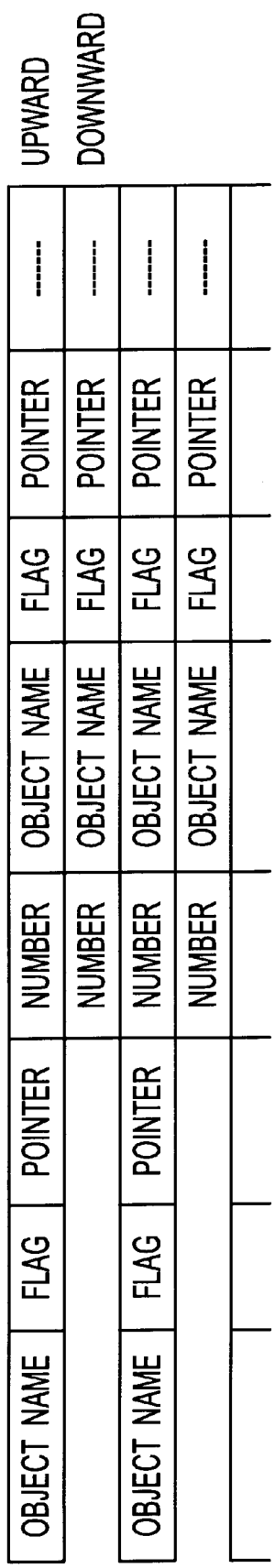
FIG. 35 is diagram illustrating the data structure of the table 163 in the construction of FIG. 34.

FIG. 35 is diagram illustrating the data structure of the table 163 in the construction of FIG. 34. In FIG. 35, the data in each odd-numbered line in the three columns from the left end indicate whether or not each object is used. When the object is used, the flag is set to one. The number in the entry in the same odd-numbered line in the fourth column indicates how many objects exist on the higher level side of the above object indicated at the left end, in the inheritance hierarchy, and the number in the entry in the next even-numbered line in the fourth column indicates how-many objects exist on the lower level side of the above object indicated at the left end, in the inheritance hierarchy. One or more sets of data comprised of an object name, a flag, and a pointer, for the objects located on the higher or lower level side of the above object indicated at the left end, in the inheritance hierarchy, follow the above number on the right side in the table of FIG. 35.

Figure 36:
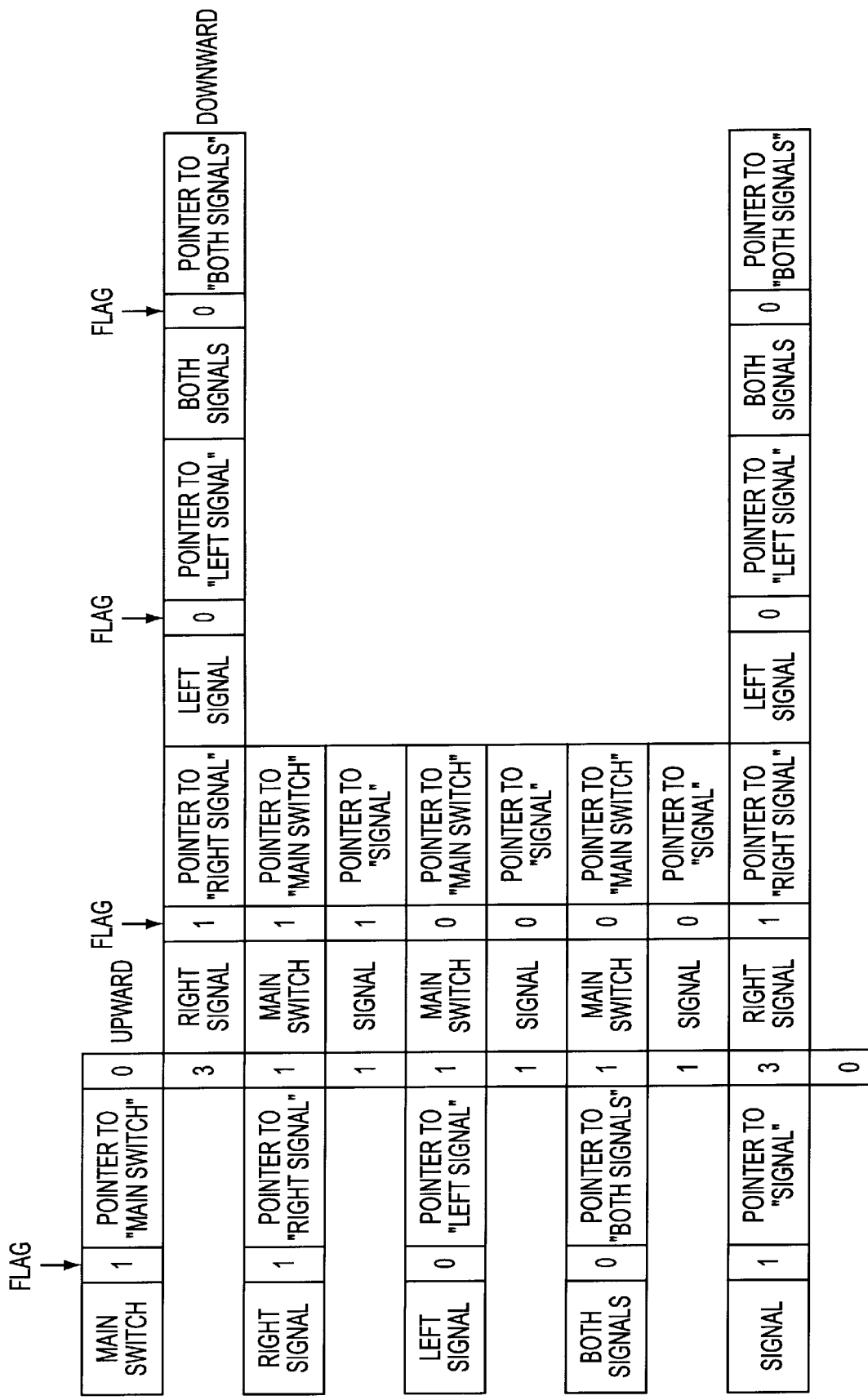
FIG. 36 is diagram illustrating the details of the contents of the table 163 in the construction of FIG. 34.

FIG. 36 is diagram illustrating the details of the contents of the table 163 in the construction of FIG. 34. The flags in the second column from the left end of FIG. 36 indicates that the "main switch" object, the "right signal" object, and the "signal" object are used. The number "0" in the first line in the fourth column indicates that no object is located on the higher level side of the "main switch" object, and the number "0" in the second line in the fourth column indicates that three objects exist on the lower level side of the "main switch" object. The flags in the second line in the sixth, ninth, and twelfth columns indicate that only the "right signal" object is connected to the "main switch" object on the lower level side of the "main switch" object. The number m1" in the third line in the fourth column indicates that one object is located on the higher level side of the "right signal" object, and the number "1" in the fourth line in the fourth column indicates that one object exists on the lower level side of the "right signal" object. The flag in the third line in the sixth column indicates that the "main switch" object is connected to the "right signal" object on the higher level side of the "right signal" object. The flag in the fourth line in the sixth column indicates that the "signal" object is connected to the "right signal" object on the lower level side of the "right signal" object. The number "3" in the second line from the bottom in the fourth column indicates that three objects are located on the higher level side of the "signal" object, and the number "0" in the bottom line in the fourth column indicates that no object exists on the lower level side of the "signal" object. The flags in the second line from the bottom in the sixth, ninth, and twelfth columns indicate that the "signal" object is connected to the "right signal" object only on the higher level side of the "signal" object.

The above flags in the table 163 are set by the inheritance registration unit 162 in response to the instruction 165. The instruction 165 indicated in FIG. 34 contains the attributes, "main switch", "right signal", and "signal". This correspond to the above flag setting indicated in FIG. 36.

Based on the above information in the table 163, the inheritance change unit 167 establishes inheritance couplings by setting the pointers in the relating objects (steps (4)).

Then, the message 169 containing the object name "signal" and the function SONS is sent to the "signal" object 164 through the message send and receive unit 75. The object 164 tries to execute the function (steps (8)), looks up the functions defined in the "right signal" object 71 and the "main switch" object 161, and delegates executions of the functions of the "right signal" object 71 and the "main switch" object 161. When the executions of the functions are completed, the "signal" object 164 returns a return message 168 through the message send and receive unit 75 to the origin of the message 169.

Figure 37:
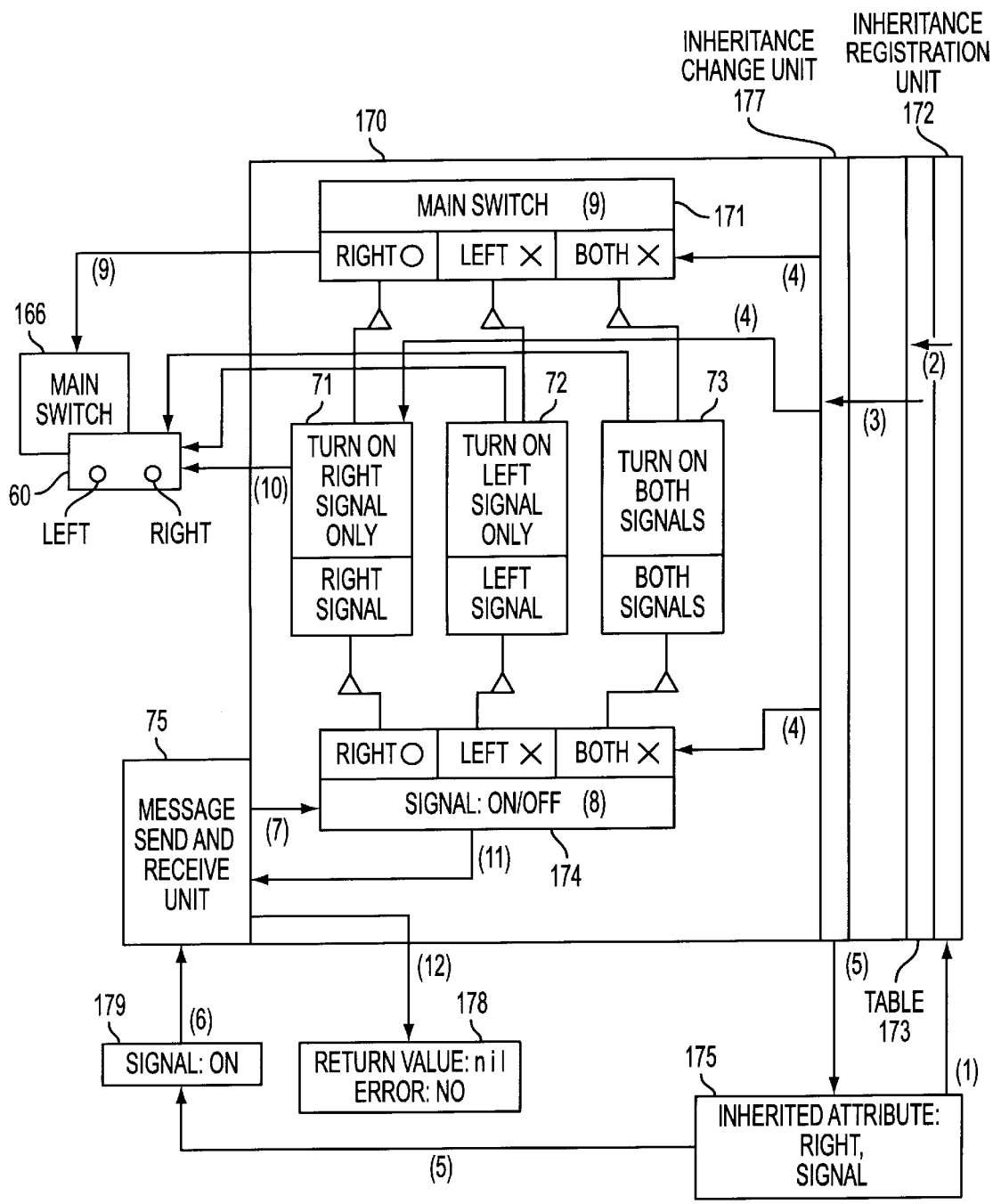
FIG. 37 is diagram illustrating the twenty-eighth embodiment of the present invention.

Twenty-Eighth Embodiment (FIGS. 37, 38, and 39)

FIG. 37 is diagram illustrating the twenty-eighth embodiment of the present invention. In the construction of FIG. 37, the flag areas corresponding to the three attributes, "right", "left", and "both", are provided in the "main switch" object 171 and the "signal" object 174.

FIG. 38 is diagram illustrating the data structure of the table 173 in the construction of FIG. 37, and FIG. 39 is diagram illustrating the details of the contents of the table 173 in the construction of FIG. 37. The table 173 indicated in FIGS. 38 and 39 contains entries for the respective attributes, "right", "left", and "both". The entries in the second column indicate the three attributes. For example, in FIG. 39, the flag "1" in the first line at the left end indicates that the series of inheritance couplings corresponding to the attribute "right" are to be established. This flag is set by the inheritance registration unit 172 in response to the instruction 175 which contains the attribute "right". The number in the entry in each odd-numbered line in the third column, indicates how many objects exist in the series corresponding to the attribute, on the higher level side of the object located at the bottom in the inheritance hierarchy, and the number in the entry in each even-numbered line in the third column, indicates how many objects exist in the series corresponding to the attribute, on the lower level side of the object located at the top in the inheritance hierarchy. The pointers to the objects in the series corresponding to each attribute follow each of the above numbers.

The inheritance change unit 177 can set the pointers obtained from the table 173 in the corresponding objects together with the flags. Thus, inheritance couplings are established in the series corresponding to the instructed attribute.

After the establishment of the inheritance couplings, the functions of the "main switch" object 171 and the "right signal" object 71 are executed in response to the message sending to the "signal" object 174, by using the above established inheritance couplings.

Figure 40:
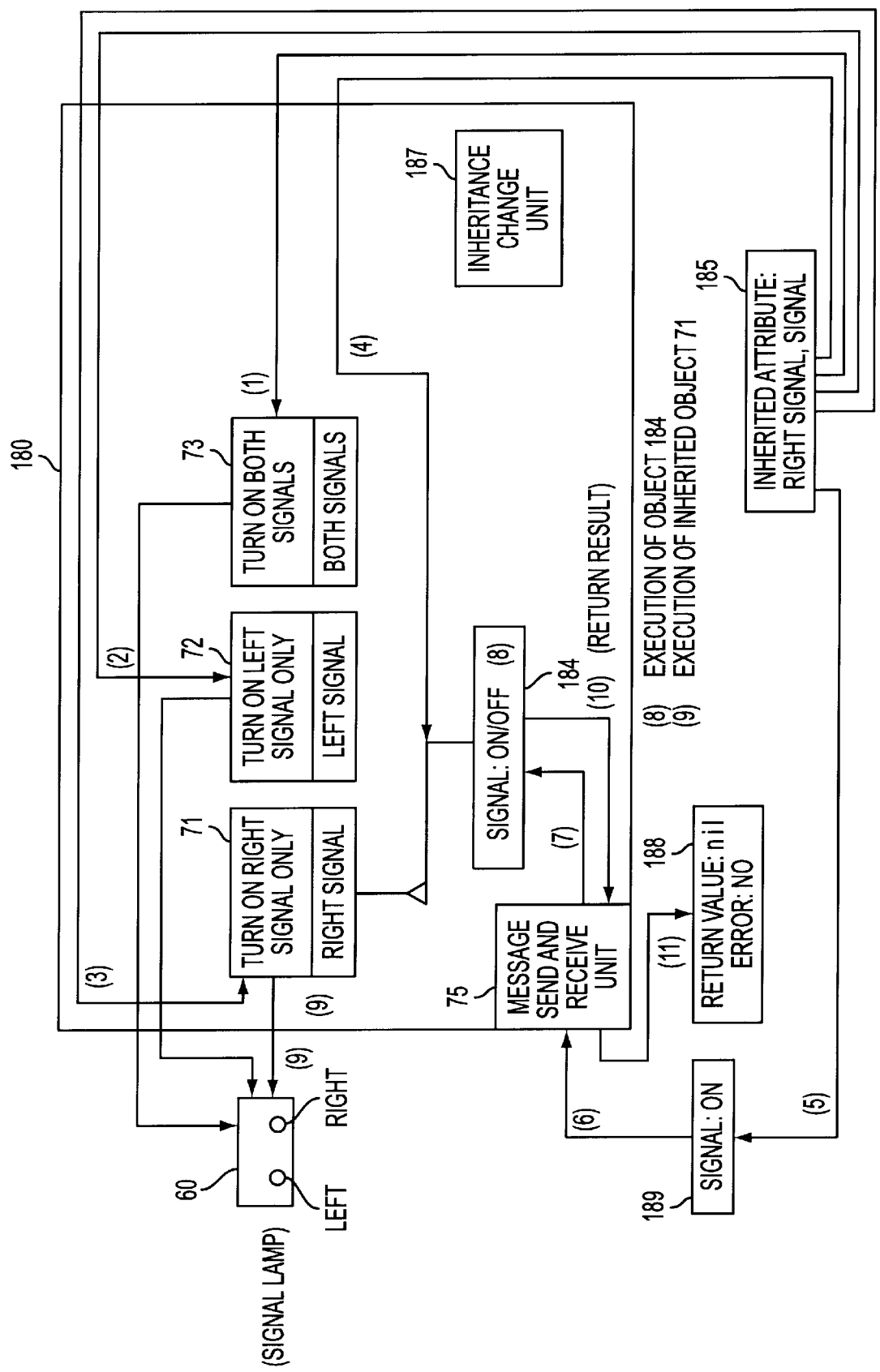
FIG. 40 is diagram illustrating the twenty-ninth embodiment of the present invention.

Twenty-Ninth Embodiment (FIG. 40)

FIG. 40 is diagram illustrating the twenty-ninth embodiment of the present invention.

In the construction of FIG. 40, when the inheritance change unit 187 receives the instruction 185 containing the attribute "right signal" and the object name "signal", the inheritance change unit 187 scans the set of the objects in an inheritance hierarchy from the highest level to the lowest level one object by one object (steps (1), (2), and (3)), along the inheritance relationships. When the scanned location reaches the inheritance coupling corresponding to the attribute "right signal" contained in the instruction 185, the inheritance change unit 187 sets the inheritance coupling information (pointers and/or flags) in at least one of the "right signal" object 71 and the "signal" object 184. Thus, the inheritance coupling information for all of the inheritance couplings can be set in the corresponding objects, respectively.

Figure 41:
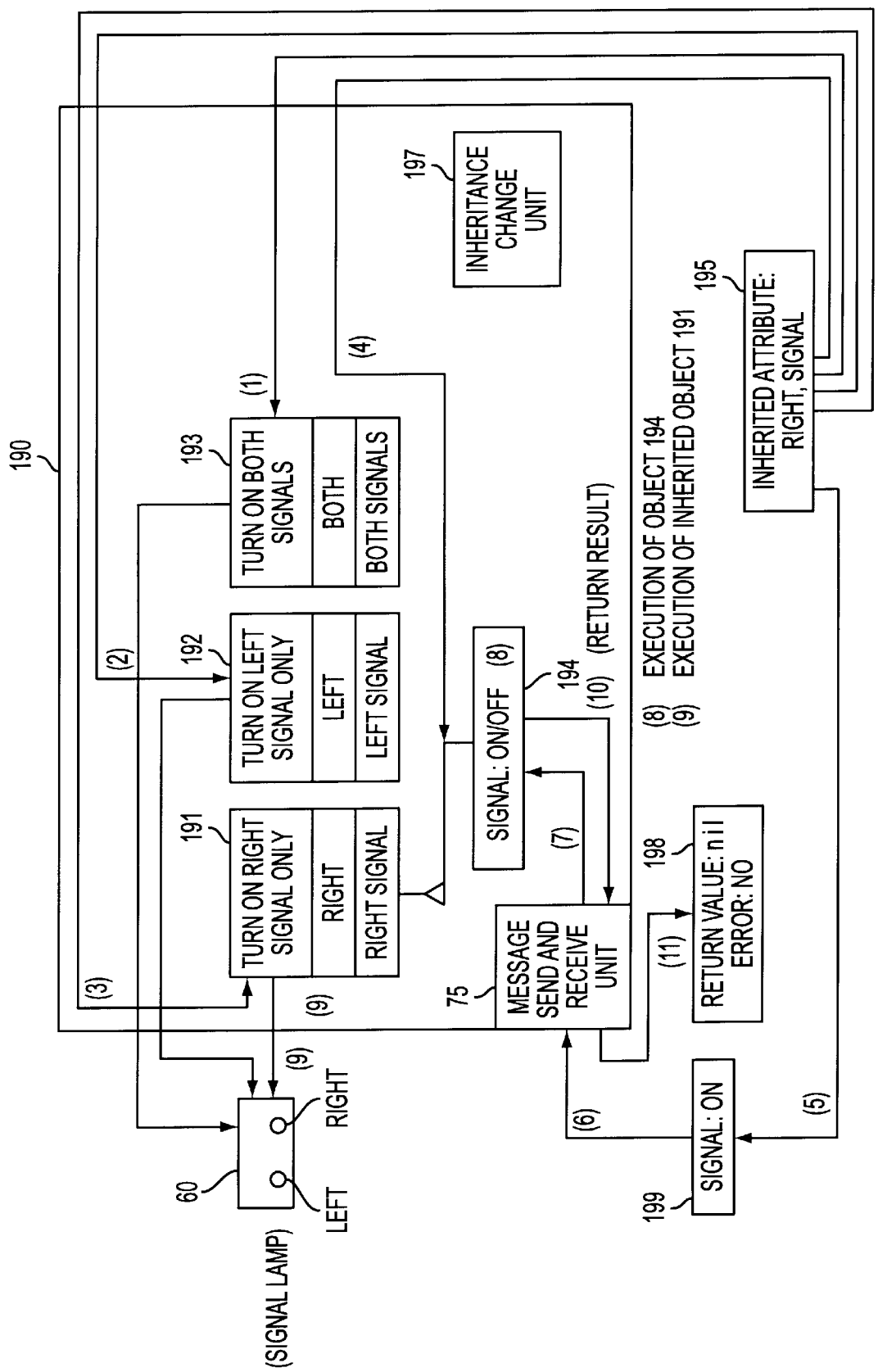
FIG. 41 is diagram illustrating the thirtieth embodiment of the present invention.

Thirtieth Embodiment (FIG. 41)

FIG. 41 is diagram illustrating the thirtieth embodiment of the present invention. In the construction of FIG. 41, the inheritance change unit 197 receives the instruction 195 containing the attribute "right" and the object name "signal". When the inheritance change unit 197 receives this instruction 195, the inheritance change unit 197 scans the set of the objects in an inheritance hierarchy from the highest level to the lowest level one object by one object (steps (1), (2), and (3)), along the inheritance relationships. When the inheritance change unit 197 finds the inheritance coupling corresponding to the attribute "right" contained in the instruction 195, the inheritance change unit 197 sets the inheritance coupling information (pointers and/or flags) in at least one of the "right signal" object 191 and the "signal" object 194. Thus, the inheritance coupling information for all of the inheritance couplings can be set in the corresponding objects, respectively.

Figure 42:
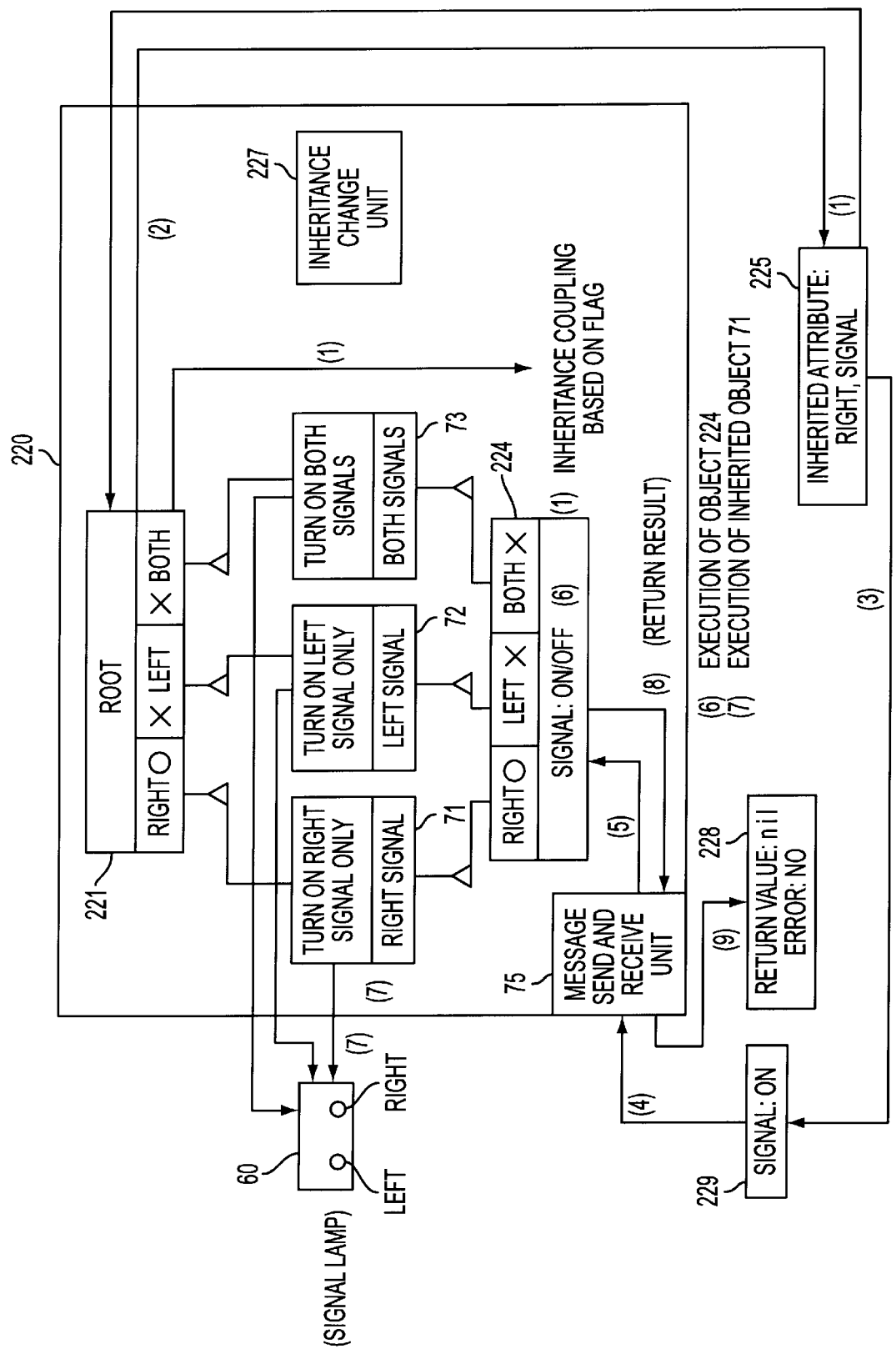
FIG. 42 is diagram illustrating the thirty-first embodiment of the present invention.

Thirty-First Embodiment (FIG. 42)

FIG. 42 is diagram illustrating the thirty-first embodiment of the present invention. In the construction of FIG. 42, an object 221 of the name "root" is provided at the top level of the inheritance hierarchy, and a series of inheritance couplings can be established from the "root" object 221 for each of the attributes, "right", "left", and "both". In the example of FIG. 42, flag areas are provided corresponding to the three attributes in each of the "root" object 221 and the "signal" object 224. In the construction of FIG. 42, the inheritance change unit 227 receives the instruction 225 containing the attribute "right" and the object name "signal". When the inheritance change unit 227 receives this instruction 225, the scanning by the inheritance change unit 227 begins from the "root" object 221. Since the "root" object 221 provides a route (inheritance coupling) to each series of inheritance couplings corresponding to each attribute, the inheritance change unit 227 sets the flag of the attribute "right" in the "root" object 221, and scanning can be performed on the route only. When the inheritance change unit 227 finds the inheritance coupling between the "right signal" object 71 and the "signal" object 224, the inheritance change unit 227 sets the inheritance coupling information (pointers and/or flags) in at least one of the "right signal" object 71 and the "signal" object 224. Thus, the inheritance coupling information for all of the inheritance couplings can be set in the corresponding objects, respectively.

Figure 43:
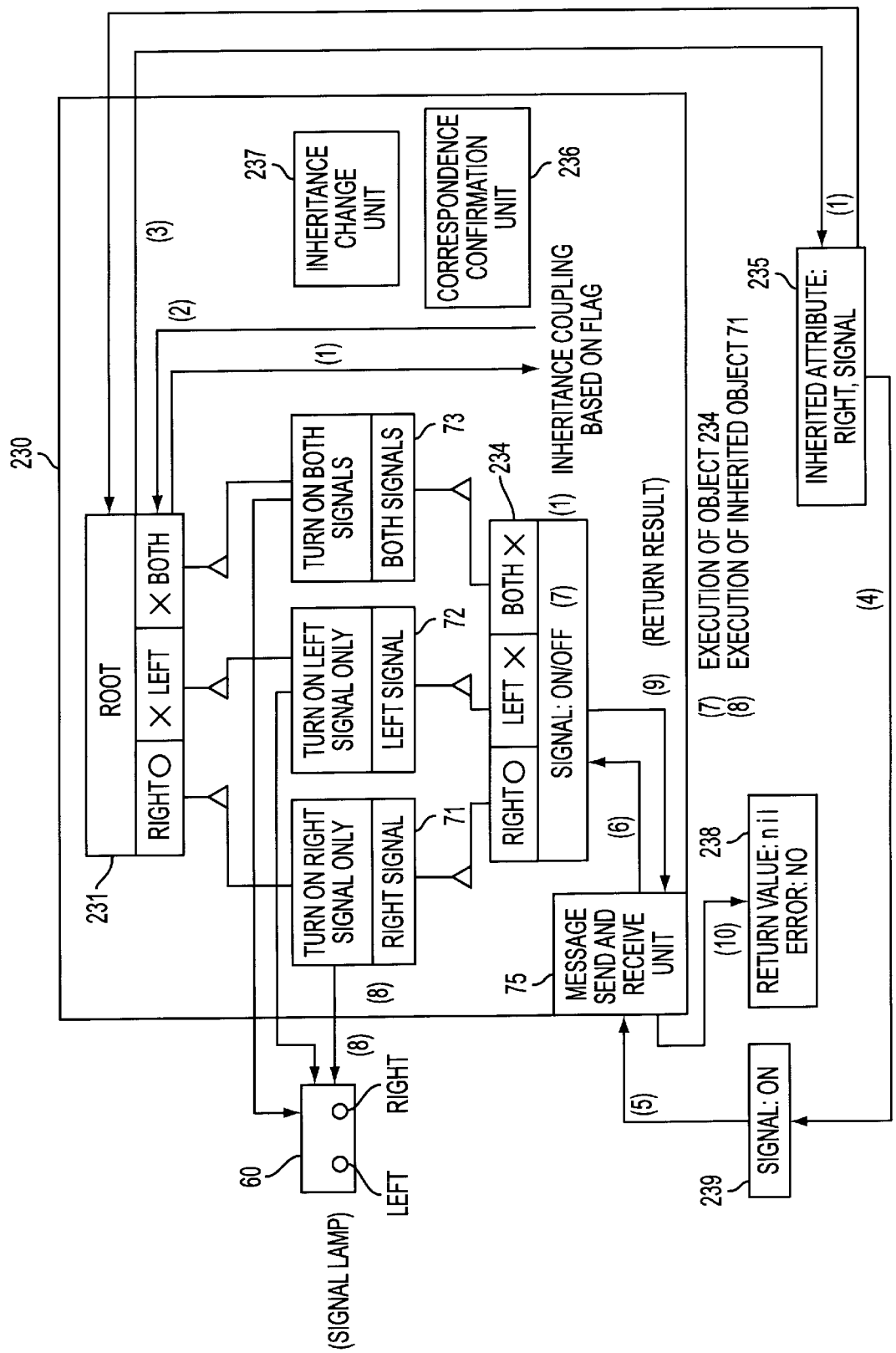
FIG. 43 is diagram illustrating the thirty-second embodiment of the present invention.

Thirty-Second Embodiment (FIG. 43)

FIG. 43 is diagram illustrating the thirty-second embodiment of the present invention. In the construction of FIG. 43, in addition to the above construction of FIG. 42, a correspondence confirmation unit 236 is provided for confirming that there is no error in the inheritance couplings established in the set of objects in FIG. 43. The construction of FIG. 43 corresponds to the construction of FIG. 6.

In the example of FIG. 43, after the inheritance couplings are established as explained with reference to FIG. 42, the correspondence confirmation unit 236 scans the above route in the opposite direction to confirm that there is no error in the inheritance couplings on the route.

Figure 44A:
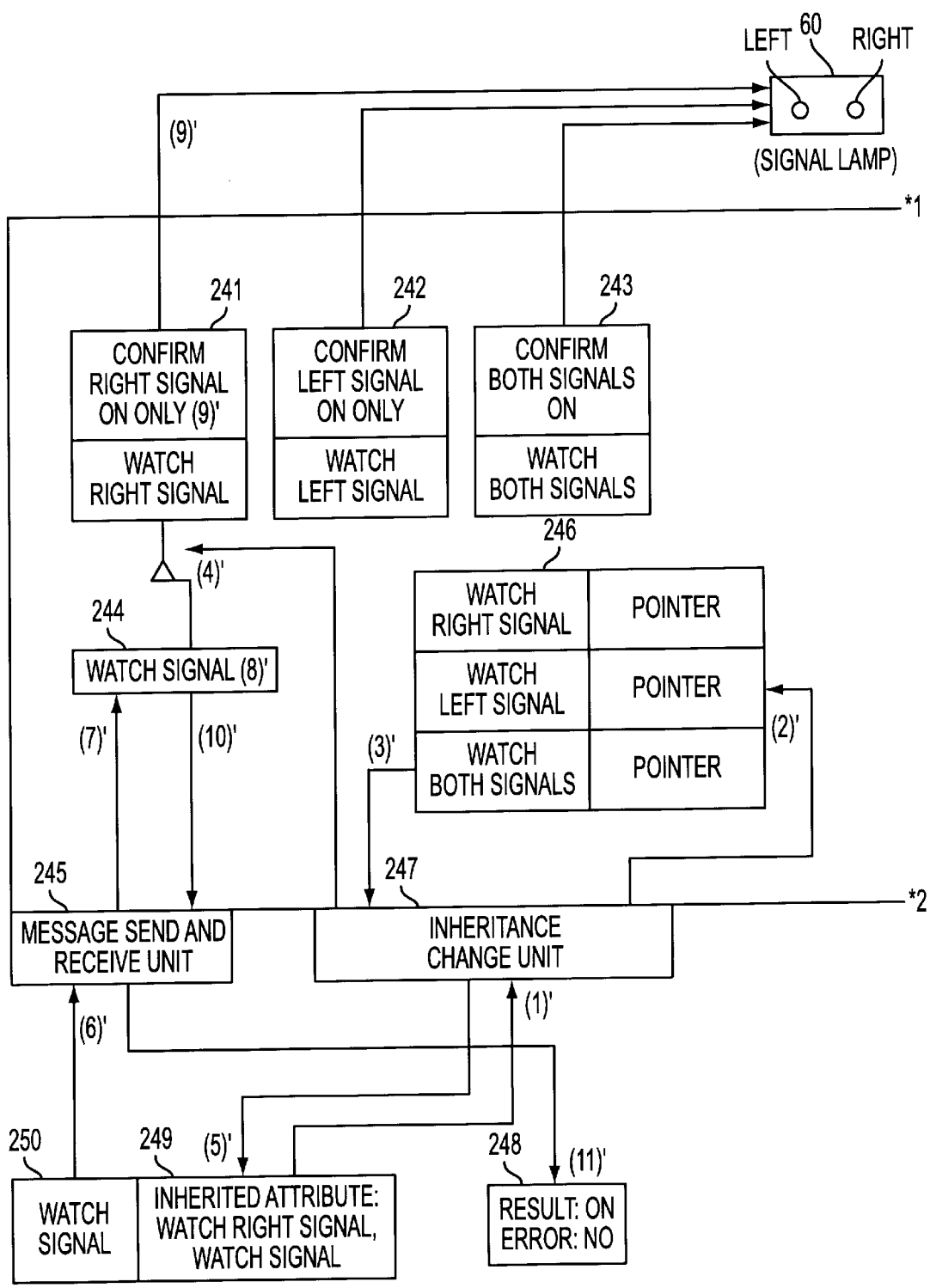
FIGS. 44A and 44B are diagrams illustrating the thirty-third embodiment of the present invention.
Figure 44B:
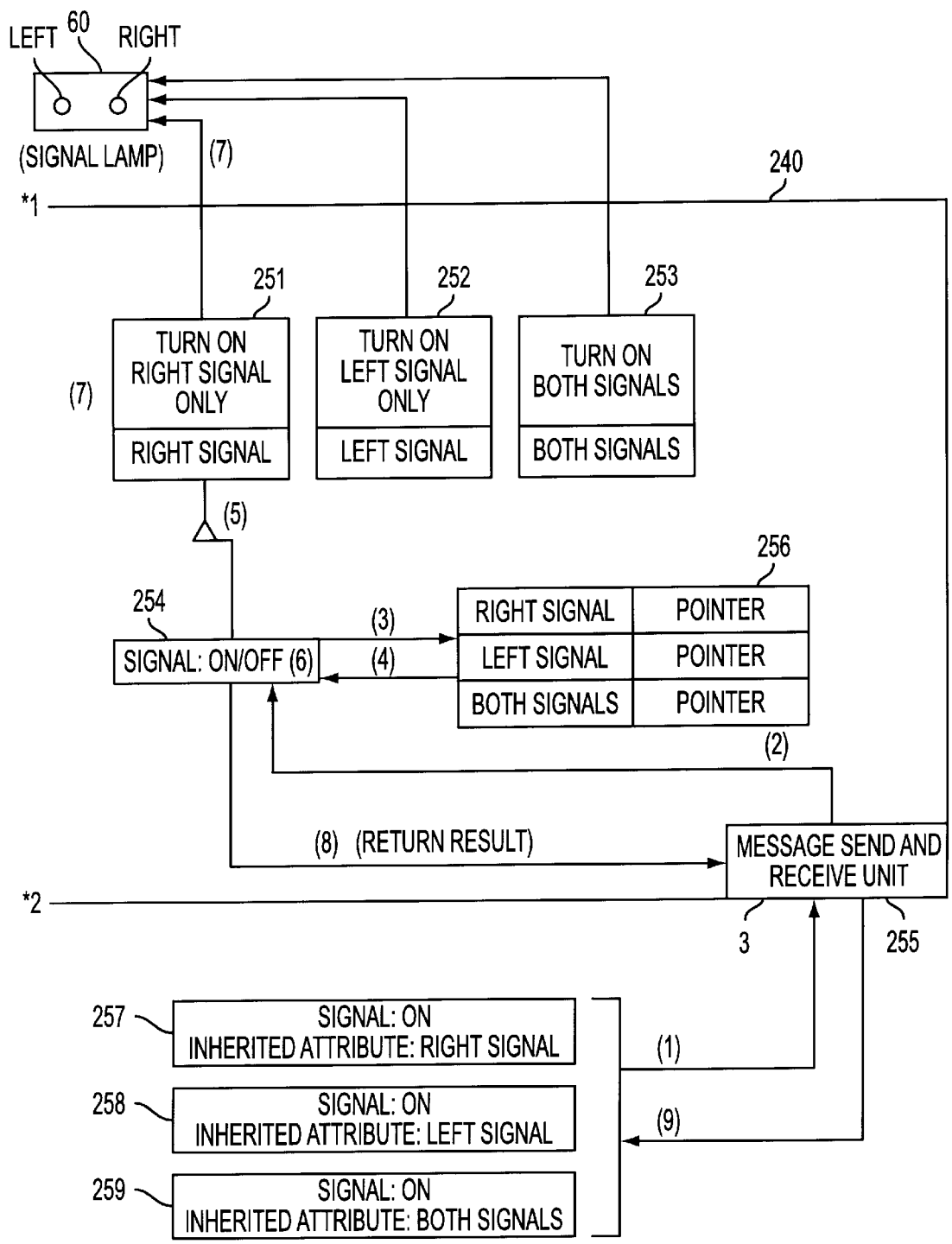

Thirty-Third Embodiment (FIGS. 44A and 44B)

FIGS. 44A and 44B are diagrams illustrating the thirty-third embodiment of the present invention. In the construction of the thirty-third embodiment, the portion of the construction which is indicated in FIG. 44B, is provided for periodically establishing the inheritance relationship between the "signal" object 254 and the three objects 251, 252, and 253, in turn, and thus periodically lighting the right signal, the left signal, or both signals, in turn. This portion, indicated in FIG. 44B, is the same as the construction of FIG. 25. only the difference is that the three messages 257, 258, and 259 are periodically and cyclically supplied to the message send and receive unit 225 in turn, where the message 257 contains the attribute "right signal", the message 258 contains the attribute "left signal", and the message 259 contains the attribute "both signals". Therefore, in response to the reception of these messages, the inheritance coupling is periodically and cyclically established between the "signal" object 254 and the "right signal" object 251, between the "signal" object 254 and the "left signal" object 252, or between the "signal" object 254 and the "both signals" object 253, in turn, and thus, the right signal, the left signal, or both signals are lighted periodically and cyclically by the functions executed by the "right signal" object 251, the "left signal" object 252, or the "both signals" object 253, in turn.

The other portion of the construction, which is indicated in FIG. 44A, is provided for periodically confirming the operation of the signal lamp 60, which is driven by the above portion of FIG. 44B. This portion indicated in FIG. 44A has the same configuration as the construction of FIG. 28 although the functions executed therein are different from those in the construction of FIG. 28. In the construction of FIG. 44A, the "watch signal" object 244 is an object in which a function of generally watching a signal is defined, the "watch right signal" object 241 is an object in which a function of watching the right signal is defined, the "watch left signals object 242 is an object in which a function of watching the left signal is defined, and the "watch both signals" object 243 is an object in which a function of watching both the right and left signals is defined. The instruction 249, which contains the attribute "watch right signal", is supplied to the inheritance change unit 247. In response to the instruction 249, the inheritance change unit 247 refers to the pointer in the entry corresponding to the attribute "watch right signal". in the table 246, and sets the pointer in the "watch signal" object 244 to establish an inheritance coupling to the "watch right signal". Thus, when a message 250 requesting for an execution of the function of "watch signal" is sent to the "watch signal" object 244 through the message send and receive unit 245, the "watch signal" object 244 looks up the function "watch right signal" in the "watch right signal" object 241 through the established inheritance coupling, and delegates the execution of the function to the "watch right signal" object 241. When the ON state of the right signal in the signal lamp 60 is confirmed by the function of the "watch right signal" object 241, the "watch signal" object 244 returns a return message 248 through the message send and receive unit 247, where the return message contains the result of the confirmation, "ON".

Figure 45:
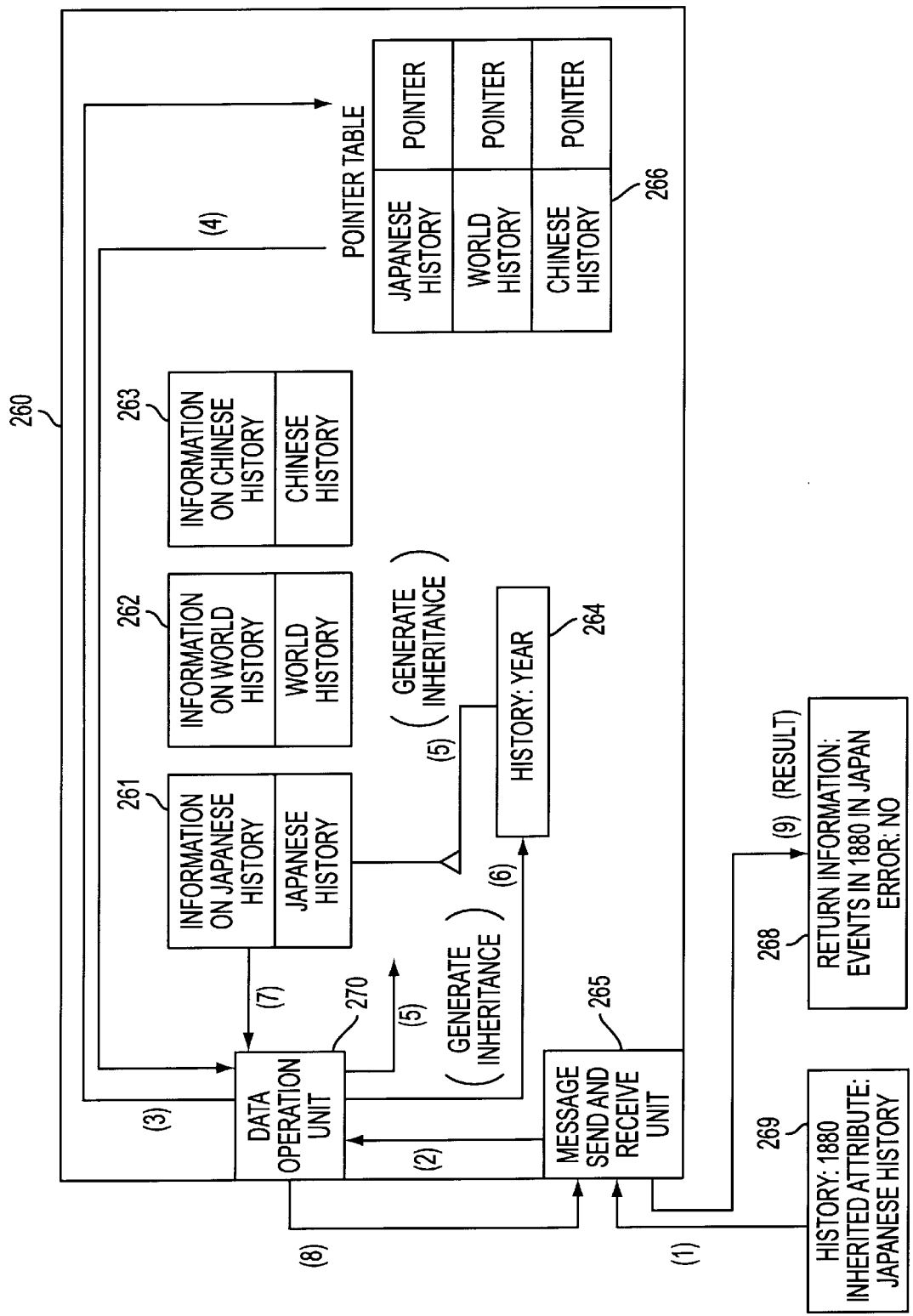
FIG. 45 is diagram illustrating the thirty-fourth embodiment of the present invention.

Thirty-Fourth Embodiment (FIG. 45)

FIG. 45 is diagram illustrating the thirty-fourth embodiment of the present invention. The construction of FIG. 45 is a data search system, which outputs one or more historical events in response to an input of a message containing a year and a genre. In the construction of FIG. 45, reference numerals 261, 262, and 263 each denote a data object, 264 is an object in which a search function "history is defined, and 270 is a data operation unit. Each of the data object contains data only, and does not contain a function, Therefore, rigorously, these are not called an object in the field of object-oriented programming. However, when a pointer to one of these data objects is set in the "history" object 264, the "history" object 264 can look up the data in the data object only. Therefore, the construction of FIG. 45 is analogous to the construction of the object-oriented system of FIG. 31, as explained below.

When the message 269, which contains the year "1880" as the mode of operation and the genre "Japanese history" as the attribute, is sent to the message send and receive unit 265 (steps (1)), the message send and receive unit 265 transfers the message 269 to the data operation unit 270 (steps (2)). The data operation unit 270 refers to the pointer in the entry corresponding to the attribute "Japanese history", in the table 266 (steps (3) and (4)), and sets the obtained pointer in the "history" object 264 to establish a variation of inheritance coupling between the "history" object 264 and the data object 261 (steps (5)). Then, the data operation unit 270 sends to the "history" object 264 a request for executing the function of searching for one or more historical events, together with the year "1880" as the operation mode (steps (6)). Receiving this request and the operation mode "1880", the "history" object 264 searches for one or more historical events in 1880, in the data contained in the data object 261 which is coupled to the "history" object 264 by the above variation of inheritance coupling. When one or more historical events in 1880 are found in the data object 261 by the execution of the above search function, the data on the one or more historical events in 1880 is read out from the data object 261, and is supplied to the data operation unit 270 (steps (7)). The data operation unit 270 transfers the data to the message send and receive unit 265 (steps (8)). In response to the transfer of the data, the message send and receive unit 265 forms and outputs a return message 268 containing the data on the one or more historical events in 1880 (steps (9)).

Figure 46:
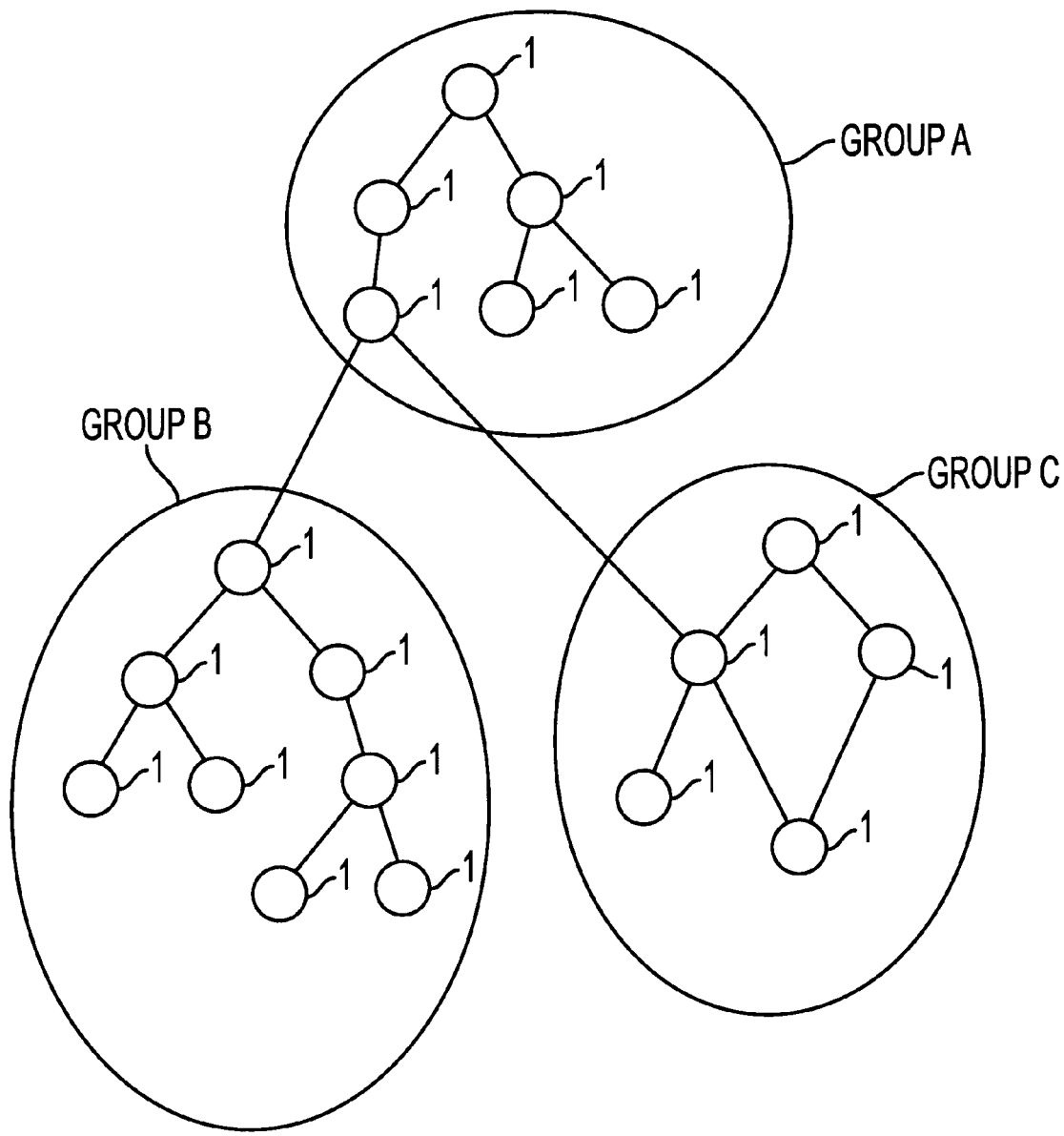
FIG. 46 is diagram illustrating the construction of another example of an object-oriented system to which the various aspects of the present invention can be applied.

Extension of Inheritance Coupling (FIG. 46)

Figure 47:
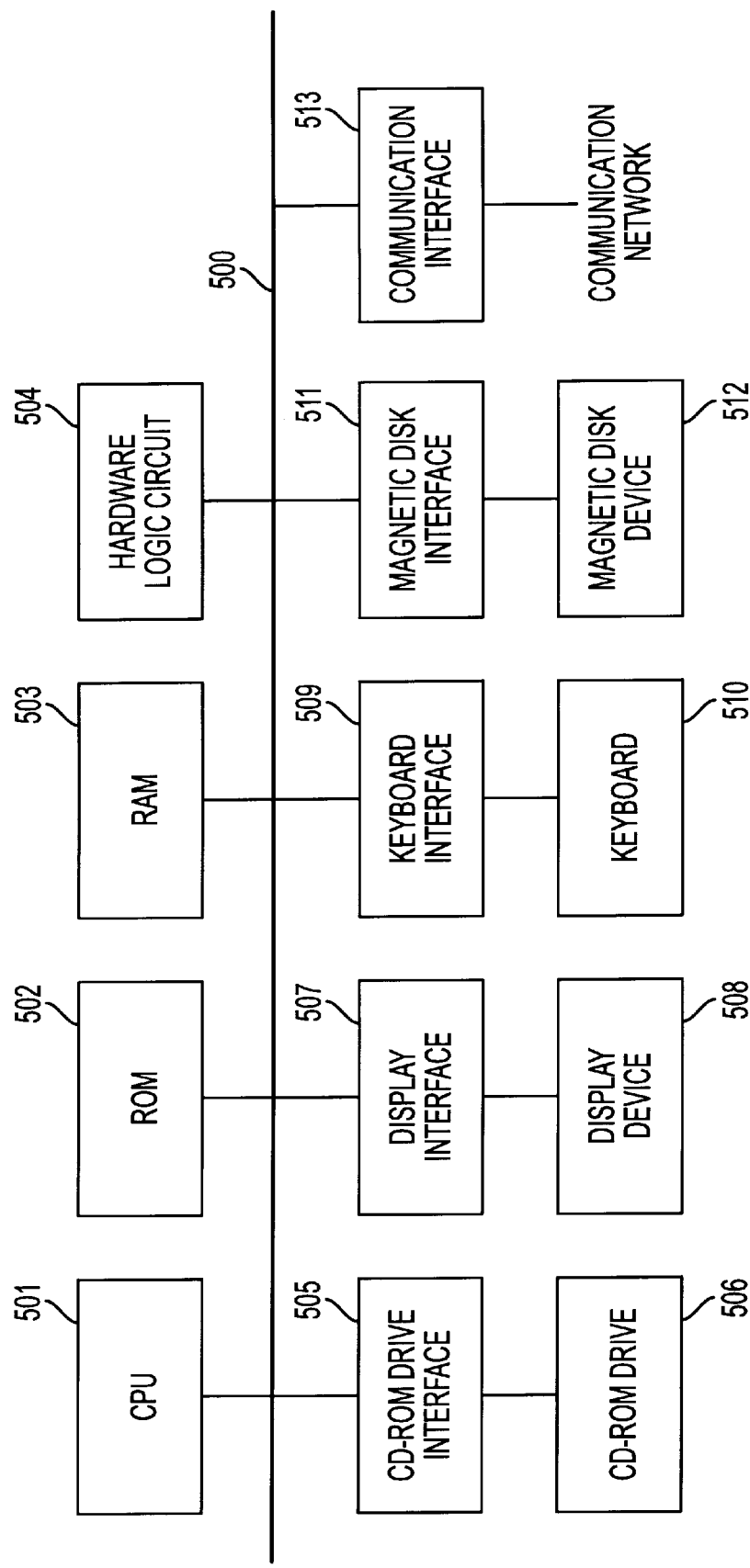
FIG. 47 is diagram illustrating an example of the hardware construction of the embodiments of the present invention.

FIG. 46 is diagram illustrating the construction of another example of an object-oriented system to which the various aspects of the present invention can be applied. Although the above explanations are provided for establishment and changes of inheritance couplings among a predetermined set of a plurality of objects, the inheritance coupling may be established between objects belonging to different groups, as indicated in FIG. 47. It will be apparent that all of the above provisions according to the present invention can also be to such an object-oriented system containing more than one group of objects as indicated in FIG. 47.

Other Matters

As understood from the above explanations, the establishment or change of an inheritance coupling can be performed independently from the execution of a function of each object as long as it is arranged that the execution of a function and the establishment or change of an inheritance coupling are not performed at the same time, i.e., an exclusive control must be performed between the above two independent operations.

In addition, the establishment or change of an inheritance coupling according to the present invention includes a disconnection of an inheritance coupling. For example, in some of the above embodiments, a disconnection can be performed by setting a flag to zero, instead of one.

Figure 48:
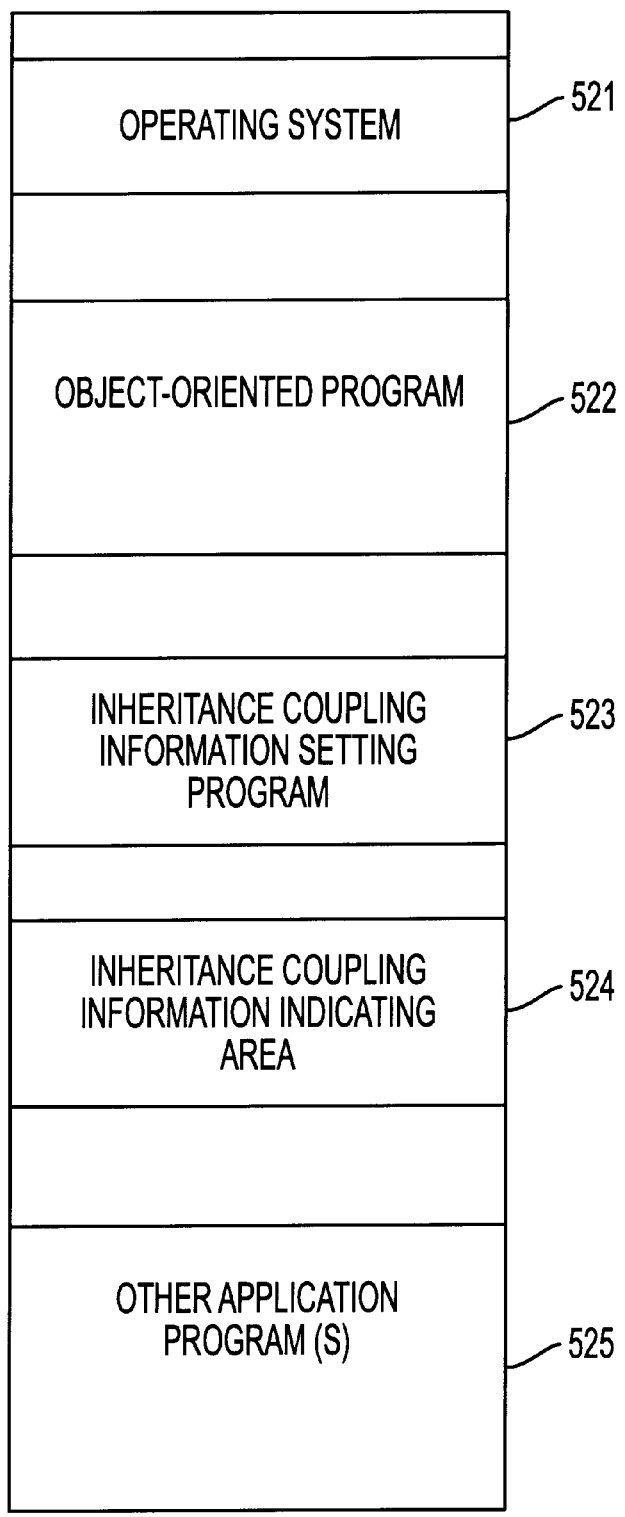
FIG. 48 is diagram illustrating an example of use of the RAM area in the constructions of the embodiments of the present invention.

Hardware Construction (FIGS. 47 and 48)

FIG. 47 is diagram illustrating an example of the hardware construction of the embodiments of the present invention. The present invention can be realized as a data processing system. The data processing system may be a computer or other programmable apparatus, and can be constructed by hardware logic circuits which may include programmable logic circuits, a programmable computer in which software is installed, and a combination of the hardware logic circuits and the programmable computer. For example, the hardware construction of the system may be as indicated in FIG. 46. The construction of FIG. 46 contains a CPU 501, a read-only memory (ROM) 502, a random access memories (RAM) 503, a hardware logic circuit 504, a CD-ROM drive interface 505, a CD-RON drive device 506, a display interface 507, a display device 508, a keyboard interface 509, a keyboard 510, a magnetic disk interface 511, a magnetic disk device 512, and a communication interface 513. All of the operations explained above can be realized by software or hardware logic circuitry, or any combination thereof, and all or any portion of the software can be stored in any kind of product which can store data, such as a CD-ROM, an IC memory card, a ROM, a floppy disk, and the like.

FIG. 48 is diagram illustrating an example of use of the RAM area in the constructions of the embodiments of the present invention.

What is claimed is:

1. A data processing system at least a portion of which operates under control of an object-oriented program, said data processing system comprising:

an object-oriented system, in which a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

an inheritance coupling information indicating unit for holding therein inheritance coupling information, where the inheritance coupling information held in the inheritance coupling information indicating unit indicates one or more of the plurality of optional inheritance relationships selected for use, and can be referred to by at least one of said plurality of objects; and an inheritance coupling information setting unit for receiving a first request which contains selection information indicating that at least one of said plurality of predetermined optional inheritance relationships is selected for use, and setting at least one piece of the inheritance coupling information indicating the selected at least one of said plurality of predetermined optional inheritance relationships, in the inheritance coupling information indicating unit.

2. A data processing system according to claim 1, wherein each of the plurality of objects contains, as program units realized by the object-oriented program, a message receiving unit for receiving a message which contains a second request for an execution of a function, and a message executing unit for executing the function requested by the second request when the function is defined in one of the plurality of classes to which said each of the plurality of objects belongs.

3. A data processing system according to claim 2, wherein the operation of the inheritance coupling information setting unit is defined in said one of the plurality of classes by the object-oriented program, as a function which can be performed by instances of the one of the plurality of classes.

4. A data processing system according to claim 2, wherein, when said one of the plurality of classes is the descendent of another of the plurality of classes, instances of said one of the plurality of classes comprise a function lookup unit for looking up functions defined in one or more classes which are coupled to said one of the plurality of classes on the ancestor side of said one of the plurality of classes, based on the inheritance coupling information indicated in the inheritance coupling information indicating unit, and delegating the execution of the function requested by the second request, to one of the one or more classes which are coupled on the ancestor side when the function requested by the second request is defined in said one of the one or more classes coupled on the ancestor side.

5. A data processing system according to claim 2, wherein said message can contain both the first and second requests.

6. A data processing system according to claim 2, wherein said inheritance coupling information setting unit can receive said first request separately from one the plurality of objects which receives said message.

7. A data processing system according to claim 2, wherein said message receiving unit can receive a message which contains said first request.

8. A data processing system according to claim 1, wherein said inheritance coupling information indicating unit comprises, an ancestor information indicating unit for holding therein and indicating the inheritance coupling information with regard to ancestors of each class, and a descendent information indicating unit for holding therein and indicating the inheritance coupling information with regard to descendents of each class.

9. A data processing system according to claim 1, wherein said inheritance coupling information setting unit can receive said first request separately from the plurality of objects.

10. A data processing system according to claim 1, wherein said inheritance coupling information indicating unit comprises, a coupled class indicating unit for holding coupled class information which indicates, for each of the plurality of classes, one of the plurality of classes as a coupled class to which said each of the plurality of classes is to be coupled based on an inheritance relationship, and a pointer indicating unit for indicating pointers to predetermined classes among the plurality of classes which are candidates of the coupled class of said each of the plurality of classes, so that one of the pointers which points to said coupled class can be determined based on said coupled class information.

11. A data processing system according to claim 1, wherein said inheritance coupling information indicating unit is provided outside of the plurality of objects.

12. A data processing system according to claim 1, wherein said inheritance coupling information indicating unit is provided in at least one of the plurality of objects.

13. A data processing system according to claim 1, wherein said inheritance coupling information indicating unit is comprised of a plurality of sub-units corresponding to the plurality of classes, respectively, and the plurality of sub-units are contained in the respective objects which are instances of the corresponding classes, respectively.

14. A data processing system according to claim 5, further comprising a request separating unit for receiving said message containing both the first and second requests, and separating the first request from the second request to supply the first request to said inheritance coupling information setting unit.

15. A data processing system according to claim 8, wherein the inheritance coupling information setting unit comprises a correspondence confirming unit for confirming that there is no contradiction between the inheritance coupling information for the ancestors held in the ancestor information indicating unit and the inheritance coupling information for the descendents held in the descendent information indicating unit.

16. A data processing system according to claim 10, wherein said first request contains said coupled class information, and said at least one piece of inheritance coupling information is the coupled class information.

17. A data processing system according to claim 10, wherein said coupled class information is comprised of flag indications provided for the options, respectively.

18. A data processing system according to claim 10, wherein said coupled class indicating unit is comprised of a plurality of sub-units corresponding to the plurality of classes, respectively, and the plurality of sub-units are contained in the respective. objects which are instances of the corresponding classes, respectively.

19. A data processing system according to claim 15, said correspondence unit operates when one of the plurality of objects receives said first request, and returns a result of the confirmation to the one of the plurality of objects.

20. A data processing system according to claim 18, wherein said first request contains said coupled class information, and said at least one piece of inheritance coupling information is the coupled class information, each of the plurality of objects further comprises a correspondence confirming unit for communicating with another of the plurality of objects which is an instance of the coupled class, and confirming whether or not the sub-unit, in the coupled class, of the coupled class indicating unit indicates said each of the plurality of objects as a coupled class.

21. A data processing system containing an object-oriented system and an inheritance coupling information setting system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said inheritance coupling information setting system comprises:

an inheritance coupling information indicating unit for holding therein inheritance coupling information, where the inheritance coupling information held in the inheritance coupling information indicating unit indicates one or more of the plurality of optional inheritance relationships selected for use, and can be referred to by at least one of said plurality of objects; and an inheritance coupling information setting unit for receiving a first request which contains selection information indicating that at least one of said plurality of predetermined optional inheritance relationships is selected for use, and setting at least one piece of the inheritance coupling information indicating the selected at least one of said plurality of predetermined optional inheritance relationships, in the inheritance coupling information indicating unit.

22. A data processing system containing an object-oriented system and an inheritance coupling information setting system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said inheritance coupling information setting system comprises:

a data holding area for holding therein inheritance coupling information, where the inheritance coupling information held in the data holding area indicates one or more of the plurality of optional inheritance relationships selected for use, and can be referred to by at least one of said plurality of objects; and a programmed logic circuit for receiving a first request which contains selection information indicating that at least one of said plurality of predetermined optional inheritance relationships is selected for use, and setting at least one piece of the inheritance coupling information indicating the selected at least one of said plurality of predetermined optional inheritance relationships, in the inheritance coupling information indicating unit.

23. A data processing system containing an object-oriented system and an inheritance coupling information setting system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said inheritance coupling information setting system comprises:

a data holding area for holding therein and indicating said inheritance coupling information, where the inheritance coupling information held in the data holding area indicates one or more of the plurality of optional inheritance relationships selected for use, and can be referred to by at least one of said plurality of objects; and an inheritance coupling information setting unit, configured to execute a program which is stored in the at least one computer-usable memory, so that th e data holding area receives a first request which contains selection information indicating that at least one of said plurality of predetermined optional inheritance relationships is selected for use, and sets at least one piece of the inheritance coupling information indicating the selected at least one of said plurality of predetermined optional inheritance relationships, in the inheritance coupling information indicating unit.

24. A process for setting inheritance coupling information in a data processing system containing an object-oriented system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said data processing system further comprising a data storage area which can be accessed by at least one of said plurality of objects;

said process comprising the steps of:

(a) receiving a first request which contains selection information indicating that at least one of said plurality of predetermined optional inheritance relationships is selected for use; and (b) setting said at least one piece of the inheritance coupling information indicating the selected at least one of said plurality of predetermined optional inheritance relationships in said data storage area.

25. An apparatus for setting inheritance coupling information in a data processing system containing an object-oriented system, wherein said object-oriented system is configured to execute an object-oriented program which is stored in at least one computer-usable memory, and in the object-oriented system a plurality of objects are defined by said object-oriented program, each of the plurality of objects belong to a corresponding one of a plurality of classes as an instance of the corresponding one of the plurality of classes, and a plurality of optional inheritance relationships are predefined at least among a group of classes included in the plurality of classes;

said apparatus comprising:

a data storage area which can be accessed by at least one of said plurality of objects;

a request receiving unit for receiving a first request which contains selection information indicating that at least one of said plurality of predetermined optional inheritance relationships is selected for use; and an information setting unit for setting said at least one piece of the inheritance coupling information indicating the selected at least one of said plurality of predetermined optional inheritance relationships, in said data storage area.

26. An article of manufacture which, when used with a computer, directs the computer to execute a process for setting inheritance coupling information in a data processing system containing an object-oriented system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said data processing system further comprising a data storage area which can be accessed by at least one of said plurality of objects;

said process comprising the step s of:
(a) receiving a first request which contains selection information indicating that at least one of said plurality of predetermined optional inheritance relationships is selected for use; and
(b) setting said at least one piece of the inheritance coupling information indicating the selected at least one of said plurality of predetermined optional inheritance relationships, in said data storage area.

27. A data processing system at least a portion of which operates under control of an object-oriented program, said data processing system comprising:

an object-oriented system, in which a plurality of objects are de fined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes based on inheritance coupling information, wherein each of the plurality of objects contains, as program units realized by the object-oriented program, a message receiving unit for receiving a message which contains a request for execution of a function, and selection information indicating that at least one of said plurality of predetermined optional inheritance relationships is selected for use as an inheritance relationship between a first class which said each of the plurality of objects belongs to, and a second class as a parent of the first class, a message executing unit for executing the function requested by the request when the function is defined in said first class, and a function delegating unit for said function requested by the request, in at least one of said second class and one or more third classes coupled on the ancestor side of said second class, by using the inheritance coupling information, delegating the execution of the function requested by the request, to said second class when the function requested by the request is not defined in said first class, and is defined in said second class, and delegating the execution of the function requested by the request, to one of said one or more third classes when the function requested by the request is not defined in said first and second classes, and is defined in said one of the one or more third classes.

28. A data processing system according to claim 27, further comprises a pointer indicating unit for indicating pointers to predetermined options of the parent class of the second class, so that said each object can refer to one of the pointers which points to said first class based on said at least one piece of the inheritance coupling information.

29. A data processing system according to claim 27, said at least one piece of inheritance coupling information indicates a pointer to the first class.

30. A data processing system containing an object-oriented system and an inheritance coupling information setting system for setting and changing inheritance coupling information, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes, wherein each of the plurality of objects contains, as program units realized by the object-oriented program, said inheritance coupling information setting system for setting and changing inheritance coupling information comprises:

a message receiving unit for receiving a message which contains a request for an execution of a function, and selection information indicating that at least one of said plurality of predetermined optional inheritance relationships is selected for use as an inheritance relationship between a first class which said each of the plurality of objects belongs to, and a second class as a parent of the first class, a message executing unit for executing the function requested by the request when the function is defined in said first class, and a function delegating unit for looking for said function requested by the request, in at least one of said second class and one or more third classes coupled on the ancestor side of said second class, by using the inheritance coupling information, delegating the execution of the function requested by the request, to said second class when the function requested by the request is not defined in said first class, and is defined in said second class, and delegating the execution of the function requested by the request, to one of said one or more third classes when the function requested by the request is not defined in said first and second classes, and is defined in said one of the one or more third classes.

31. A process for executing a function in a data processing system containing an object-oriented system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said process comprising the steps of:
(a) receiving, by one of the plurality of objects, a message which contains a request for an execution of a function, and selection information indicating that at least one of said plurality of predetermined optional inheritance relationships is selected for use as an inheritance relationship between a first class which said one of the plurality of objects belongs to, and a second class as a parent of the first class;

(b) executing the function requested by the request, in said one of the plurality of objects, when the function is defined in said first class;

(c) looking for said function requested by the request, in at least one of said second class and one or more third classes coupled on the ancestor side of said second class, by using the inheritance coupling information, where said one or more third classes are coupled to said second class on the ancestor side thereof, when the function requested by the, request is not defined in said first class; and (d) delegating the execution of the function requested by the request, to said second class when the function requested by the request is not defined in said first class, and is defined in said second class, and delegating the execution of the function requested by the request, to one of said one or more third classes when the function requested by the request is not defined in said first and second classes, and is defined in said one of the one or more third classes.

32. An article of manufacture which, when used with a computer, directs the computer to execute a process for setting and changing inheritance coupling information in a data processing system containing an object-oriented system, wherein said object-oriented system is configured to execute an object-oriented program which is stored in at least one computer-usable memory, and in the object-oriented system a plurality of objects are defined by said object-oriented program, each of the plurality of objects belongs to a corresponding one of a plurality of classes as an instance of the corresponding one of the plurality of classes, and a plurality of optional inheritance relationships are predefined at least among a group of classes included in the plurality of classes;

said process comprising the steps of:

(a) receiving, by one of the plurality of objects, a message which contains a request for an execution of a function, and selection information indicating that at least one of said plurality of predetermined optional inheritance relationships is selected for use as an inheritance relationship between a first class which said one of the plurality of objects belongs to, and a second class as a parent of the first class;

(b) executing the function requested by the request, in said one of the plurality of objects, when the function is defined in said first class:

(c) looking for said function requested by the request, in at least one of said second class and one or more third classes coupled on the ancestor side of said second class, by using the inheritance coupling information, where said one or more third classes are coupled to said second class on the ancestor side thereof, when the function requested by the, request is not defined in said fist class; and (d) delegating the execution of the function requested by the request, to said second class when the function requested by the request is not defined in said first class, and is defined in said second class, and delegating the execution of the function requested by the request, to one of said one or more third classes when the function requested by the request is not defined in said first and second classes, and is defined in said one of the one or more third classes.

33. A data processing system at least a portion of which operates under control of an object-oriented program, said data processing system comprising:

an object-oriented system, in which at least one object is defined by said object-oriented program;

a plurality of data units, where a plurality of possible coupling relationships can be defined between the plurality of data units and the at least one object, and said each of at least one object can access the coupled one of the plurality of data units based on coupling information, and;

a coupling information indicating unit for holding therein said coupling information, where the coupling information held in the coupling information indicating unit indicates one or more of the plurality of possible coupling relationships selected for use, and can be referred to by at least one of said at least one object; and a coupling information setting unit for receiving a request which contains selection information indicating that at least one of said plurality of possible coupling relationships is selected for use, and setting at least one piece of the coupling information indicating the selected at least one of said plurality of possible coupling relationships, in the coupling information indicating unit.

* * * * *

UNITED STATES PATENT AND TRADEMARK OFFICE
CERTIFICATE OF CORRECTION

PATENT NO. : 6,182,156 B1
DATED : January 30, 2001
INVENTOR(S) : Yoshifusa Togawa It is certified that error appears in the above-identified patent and that said Letters Patent is hereby corrected as shown below:

Column 38,
Line 16, change "th e" to -- the --.

Column 39,
Line 35, change "de fined" to --defined --.

Column 42,
Line 12, change "fist" to -- first --.

Signed and Sealed this

Seventh Day of August, 2001

Attest:

NICHOLAS P. GODICI
Attesting Officer
Acting Director of the United States Patent and Trademark Office